(12) United States Patent
Ide et al.

(10) Patent No.: US 8,704,447 B2
(45) Date of Patent: Apr. 22, 2014

(54) LIGHT SOURCE DEVICE

(75) Inventors: Masafumi Ide, Saitama (JP); Toru Takizawa, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 225 days.

(21) Appl. No.: 13/305,428

(22) Filed: Nov. 28, 2011

(65) Prior Publication Data

US 2012/0068609 A1 Mar. 22, 2012

Related U.S. Application Data

(63) Continuation of application No. PCT/JP2010/059023, filed on May 27, 2010.

(30) Foreign Application Priority Data

May 28, 2009 (JP) ................................. 2009-129608

(51) Int. Cl.
H05B 37/02 (2006.01)
(52) U.S. Cl.
USPC .......................................... 315/152; 359/326
(58) Field of Classification Search
None
See application file for complete search history.

(56) References Cited

U.S. PATENT DOCUMENTS

| | | | |
|---|---|---|---|
| 5,465,149 A * | 11/1995 | Strandjord et al. | ........... 356/461 |
| 5,802,222 A | 9/1998 | Rasch et al. | |
| 2003/0025926 A1 | 2/2003 | Fuchigami et al. | |
| 2003/0128365 A1 * | 7/2003 | Strandjord et al. | ........... 356/460 |
| 2003/0219201 A1 | 11/2003 | Arimoto et al. | |
| 2004/0021214 A1 | 2/2004 | Badehi et al. | |
| 2006/0022289 A1 | 2/2006 | Badhei et al. | |
| 2006/0145279 A1 | 7/2006 | Badehi et al. | |
| 2007/0008609 A1 * | 1/2007 | Ohtsuki et al. | ................ 359/326 |
| 2009/0154873 A1 | 6/2009 | Badehi et al. | |

FOREIGN PATENT DOCUMENTS

| | | |
|---|---|---|
| JP | 56-027846 A | 3/1981 |
| JP | 59-168414 A | 9/1984 |
| JP | 61-250607 A | 11/1986 |
| JP | 6-160920 A | 6/1994 |
| JP | 6-208030 A | 7/1994 |
| JP | 9-109353 A | 4/1997 |

(Continued)

OTHER PUBLICATIONS

Notification concerning Transmittal of international preliminary report on patent ability of International Application No. PCT/JP2010/059023 mailed Dec. 8, 2011 with Forms PCT/IB/373 and PCT/ISA/237.

(Continued)

Primary Examiner — Crystal L Hammond
(74) Attorney, Agent, or Firm — Westerman, Hattori, Daniels & Adrian, LLP

(57) ABSTRACT

In a light source device for combining light waves with at least three wavelengths and outputting thus combined light waves, an optical system element and an electrical system element are formed on a semiconductor substrate, thereby eliminating the necessity of optical members such as an optical connector, and saving space to place the optical members as well as reducing arrangement spacing. In addition, the space necessary for wiring in an electrical circuit is reduced. Therefore, an integration degree of each of the elements, the optical system element and the electrical system element, is enhanced. The optical system element and the electrical system element are formed in layers on the same conductor substrate, thereby reducing the area that is required in configuring a parallel establishment of the optical system element and the electrical system element.

20 Claims, 65 Drawing Sheets

(56) References Cited

FOREIGN PATENT DOCUMENTS

| | | |
|---|---|---|
| JP | 9-512353 A | 12/1997 |
| JP | 10-041529 A | 2/1998 |
| JP | 11-006931 A | 1/1999 |
| JP | 11-064793 A | 3/1999 |
| JP | 11-211924 A | 8/1999 |
| JP | 2000-009952 A | 1/2000 |
| JP | 2000-040714 A | 2/2000 |
| JP | 2002-101051 A | 4/2002 |
| JP | 2002-311270 A | 10/2002 |
| JP | 2004-093884 A | 3/2004 |
| JP | 2004-096299 A | 3/2004 |
| JP | 2005-523466 A | 8/2005 |
| JP | 2005-241897 A | 9/2005 |
| JP | 2007-5857 A | 1/2007 |
| JP | 2007-534987 A | 11/2007 |
| JP | 2008-003116 A | 1/2008 |
| JP | 2008-261942 A | 10/2008 |

OTHER PUBLICATIONS

Notification of Transmittal of Translation of the International Preliminary Report on Patentability (Form PCT/IB/338) of International Application No. PCT/JP2010/059023 mailed Dec. 22, 2011 with Forms PCT/IB/373 and PCT/ISA/237.

International Search Report of PCT/JP2010/059023, mailing date Jul. 27, 2010.

Written Opinion of PCT/JP2010/059023, mailing date Jul. 27, 2010.

Japanese Office Action dated Apr. 1, 2013, issued in corresponding Japanese Patent Application No. 2011-516059, w/English translation.

\* cited by examiner

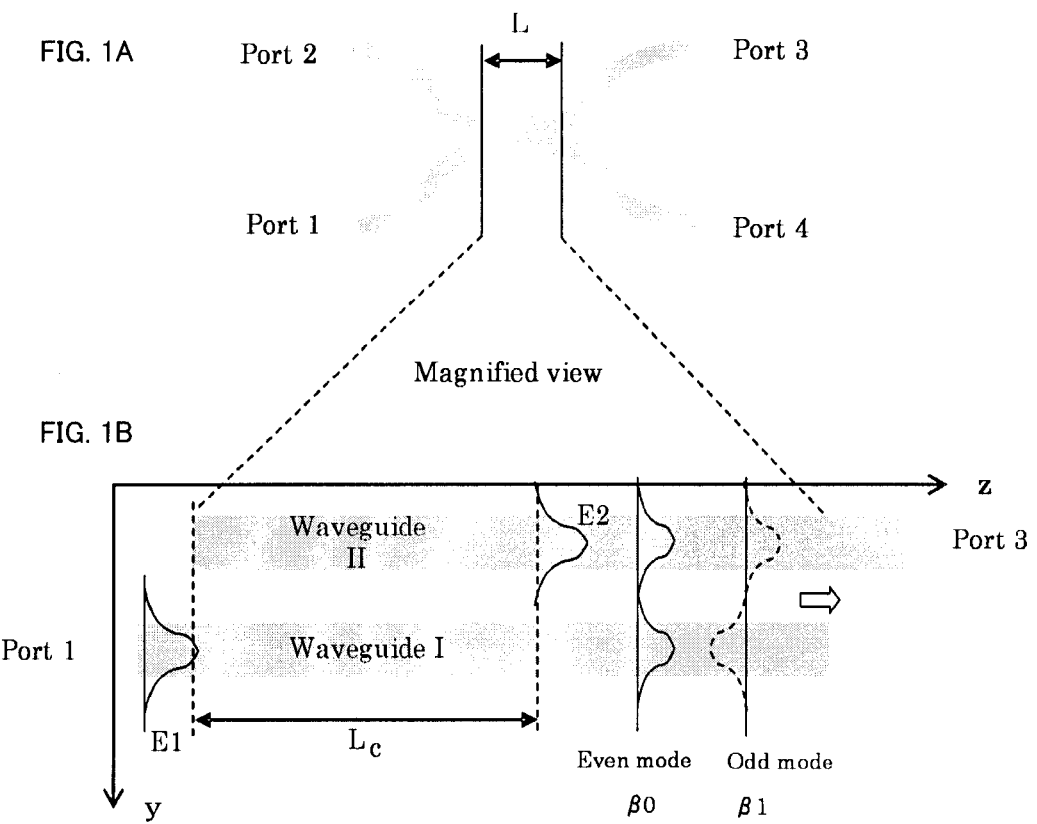

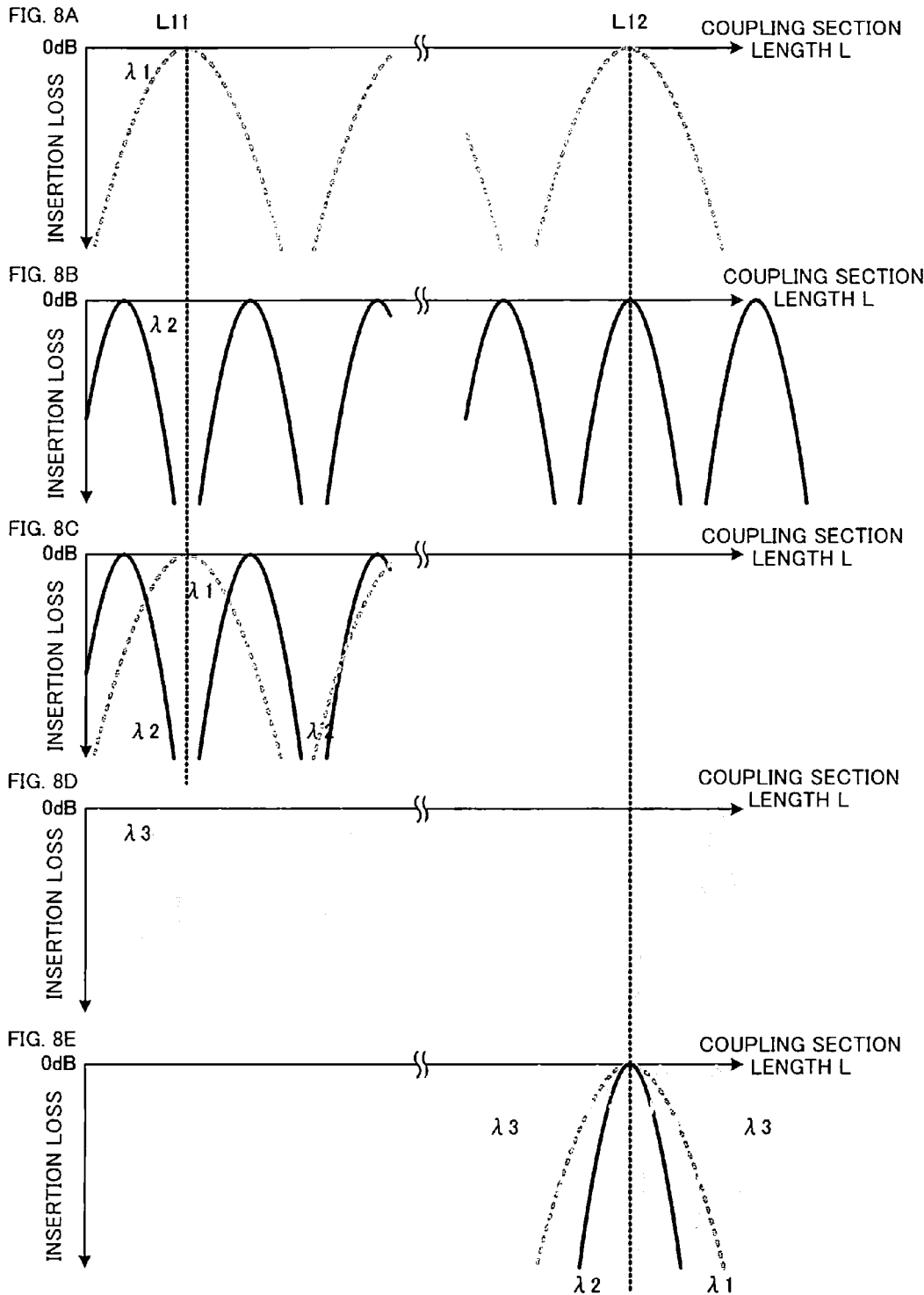

Cross sectional view of a waveguide and the light intensity of a y-polarized fundamental mode at 460nm Effective refractive indices (real) of Ex and Ey polarization modes BPM analysis of a directional coupler Structure of an MgO 5%:CLN waveguide Refractive indices of congruently grown LiNbO3 doped with 5-mol. % MgO TIR mirror schematic Index ellipsoid and several parameters Wavelength vs. Reflection Angle FIG. 37A
FIG. 37B
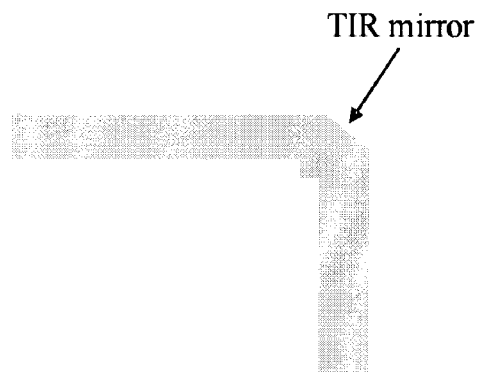
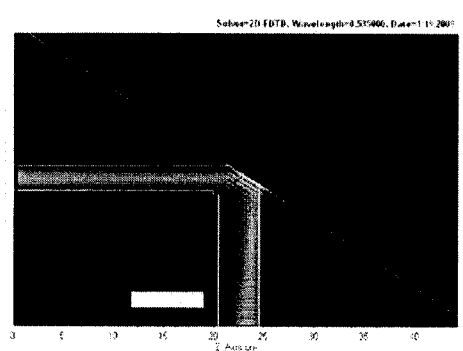
90 deg bend schematic and an example of the FDTD analysis Fondamental Ex mode in x -z plane of output waveguides at 532 nm Fondamental Ex mode in x · y plane at 532 nm

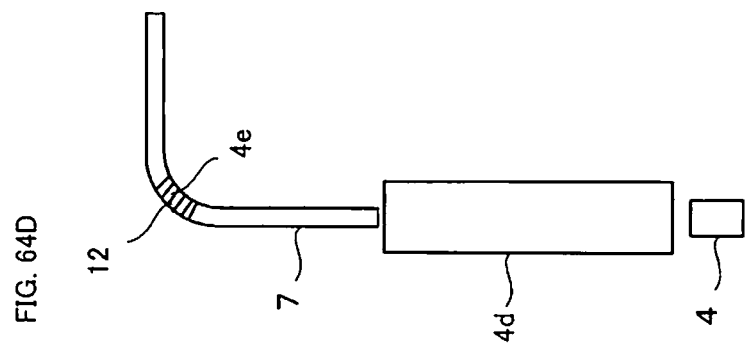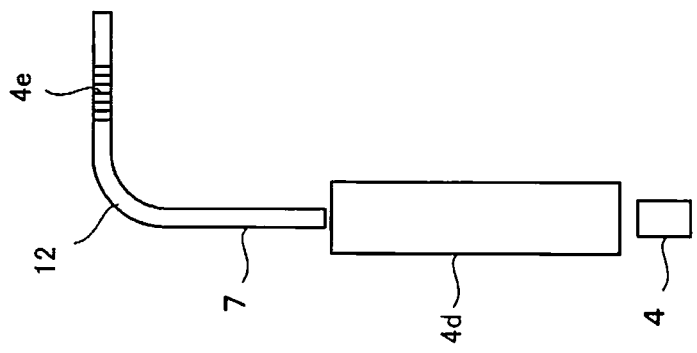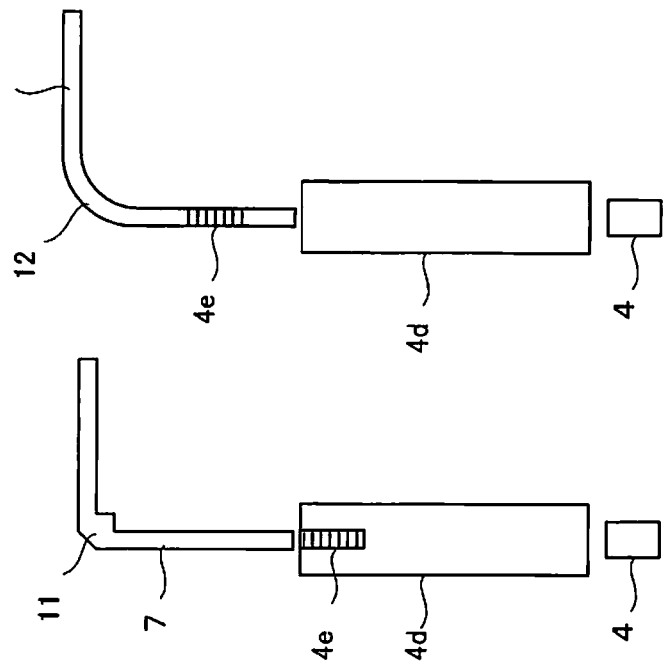

LIGHT SOURCE DEVICE

TECHNICAL FIELD

The present invention relates to a light source device which is suitable, for example, for a small-sized projector.

BACKGROUND ART

In a projector which projects light in the R wavelength range, G wavelength range, and B wavelength range for displaying a color image on a screen, it is necessary to project the light beams in the respective wavelength ranges onto one point so as to form the color image. As a configuration for projecting light beams in the respective wavelength ranges onto one point, there is known a technique which scans light beams in the respective wavelength ranges by a mirror mechanism employing MEMS (Micro Electro Mechanical Systems).

This configuration has following problems; when the mirror scans the light beams in the respective wave lengths, integrated in the horizontal direction, the timings when the light beams in the respective wavelength ranges are projected are different from one another, and scan-angle ranges of the respective wavelength ranges are various.

As a prior art for solving the problems above, there is known a technique described in the Patent Document 1. The Patent Document 1 describes that the RGB light beams are combined by using a beam combiner which is made up of a combination of four rectangular prisms referred to as "x-cube", or a dichroic prism such as a beam combiner made up of three optical portions with which problems held by the x-cube are solved. In addition, it is also known that a typically used projector employs a cross prism to combine the RGB light beams.

By way of example, according to the Patent Documents 2 and 3, there is known a technique which employs a prism to combine laser beams outputted from a semiconductor laser.

The Patent Documents 4 and 5, for instance, suggest a device that employs a directional coupler to perform optical multiplexing and branching in optical communication. The Patent Documents 4 and 5 disclose a technique that uses a waveguide to constitute the directional coupler for multiplexing or branching two wavelengths.

PRIOR ART DOCUMENT

Patent Document

Patent Document 1: Japanese Unexamined Patent Application Publication (Translation of PCT Application) No. 2007-534987 (paragraphs 0002 to 0005 and paragraphs 0017 to 0022)
Patent Document 2: Japanese Unexamined Patent Application Publication No. 9-109353 (paragraph 0028)
Patent Document 3: Japanese Unexamined Patent Application Publication No. 11-64793 (paragraph 0014)
Patent Document 4: Japanese Unexamined Patent Application Publication No. 11-6931 (paragraphs 0027 and 0028)
Patent Document 5: Japanese Unexamined Patent Application Publication No. 2000-9952 (paragraphs 0053 to 0057)
Patent Document 6: Japanese Examined Patent Application Publication No. 56-27846 (the second column)
Patent Document 7: Japanese Unexamined Patent Application Publication No. 2008-261942 (paragraphs 0045 and 0046)

DISCLOSURE OF THE INVENTION

Problem to be Solved by the Invention

As discussed above, the combiner in a spatial optical system using a dichroic prism and a cross prism, requires a three-dimensional alignment as to each of the RGB light emitting devices, and there is a problem that this three-dimensional alignment may complicate a process of alignment. It further requires optical elements such as a lens for coupling each of the beams at a low loss, and this may cause another problem that the number of components is increased.

In the field of optical communication, it is known that a directional coupler is employed, instead of the combiner in the spatial optical system using a prism. Therefore, it is expected that application of this directional coupler to a projector may solve the problems such as the requirement of alignment process and the increase of the number of components.

However, the Patent Documents 4 and 5 suggest a directional coupler which performs multiplexing of two wavelengths or branching thereof and there is no specific description as to a method for combining three specific wavelengths in a wide range, which are required at least for full-color display necessary for the projector.

On the other hand, the Patent Document 6 suggests a directional coupler type branching filter which selects only an optical wave with a specific central wave length, out of the optical waves with multiple center wavelengths entered from one of three ports, takes the selected wave out into another pitch converter, and takes out remaining optical waves from another port.

However, this directional coupler type branching filter has a configuration which utilizes wavelength selectivity according to N directional couplers and optical power coupling according to (N−1) Y-shaped optical branching circuit. This means that the Y-shaped optical branching circuit is required in addition to the directional coupler. Accordingly, this complicates the configuration and causes a problem that the number of components is increased.

Typically, for solving the foregoing problems, there is considered a configuration to arrange optical devices such as a light emitting device and a directional coupler. However, in order to form an actual light source device by arranging each of the optical devices, a light guiding body such as an optical fiber and an optical connector for establishing optical connection are required, so as to optically connect the light-emitting devices with the directional coupler. Therefore, members and space are necessary for this optical connection, and there are still a problem such as the increase of the number of components and a problem of upsizing.

In addition, there is suggested a light source device which is provided with a light combining means for combining light beams and outputting them, the light beams being outputted from multiple light sources. This light combining means indicates a configuration which makes two optical waveguides closer in a predetermined section, thereby combining the light (e.g., see Patent Document 7).

The light source device provided with this light combining path allows the optical system to be a small size, by integrating the light source and the light combining means on a device mount surface. However, as for electrical devices such as a semiconductor laser device and a photo acceptance unit, they are configured to be mounted on a sub-mount or a mounting member, and electrical connection is established by wire. This kind of configuration may be a disincentive for downsizing a light source device and a projector provided with the light source device, and therefore, this causes a problem that an effect of downsizing and integration of the optical system is not sufficiently produced.

In light of the foregoing, an object of the present invention is to solve the aforementioned problems, aiming to enhance an integration degree of an optical system element and an electrical system element in the light source device that combines at least three wavelengths light waves and outputs them, and also aiming to achieve downsizing.

Means to Solve the Problem

In order to achieve the foregoing object, the present invention forms an optical system element and an electrical system element on a semiconductor substrate, thereby rendering optical members such as an optical connector unnecessary, eliminating space used for those optical members to reduce spacing in the arrangement, further narrowing space used for electrical circuit wiring, and enhancing the integration degree between the optical system element and the electrical system element.

In the configuration for coupling the optical system element with the electrical system element, being separately arranged, coupling space is necessary for coupling the optical system element and the electrical system element, in addition to the space for placing each of the optical system element and the electrical system element, and further, straddling the coupling space, wiring is necessary for electrically connecting the optical system element and the electrical system element. On the other hand, in the present invention, the optical system element and the electrical system element are formed on the same semiconductor substrate, thereby eliminating the use of the coupling space for coupling the optical system element and the electrical system element, and further allowing the wiring to be formed on the semiconductor substrate, thereby eliminating the necessity of the wiring which is straddling the coupling space for electrically connecting the optical system element and the electrical system element.

In the present invention, the optical system element and the electrical system element are formed on the semiconductor substrate, and as for the optical system element, there are formed on the semiconductor substrate, a multi-wavelength combiner for combining light emission from the light emitting device, and a waveguide for optically connecting the light emitting device and the multi-wavelength combiner, thereby rendering unnecessary the optical members such as the optical connector, and eliminating the space required for those optical members, allowing the spacing in the arrangement to be reduced. As for the electrical system element, there is formed on the semiconductor substrate, wiring for electrically connecting a detector, a control unit, and the like, for detecting the light emitting device and a light emitting amount, thereby allowing the electrical connection to be established without providing an external wiring.

In addition, the optical system element and the electrical system element are formed in a layered manner on the same semiconductor substrate, thereby reducing the area which is required by the configuration where the optical system element and the electrical system element are established in parallel with each other.

The light source device of the present invention is provided with a semiconductor substrate on which wiring is formed, an electrode terminal formed on the semiconductor substrate for electrically connecting the wiring with the outside, multiple laser devices different in wavelength being mounted on the semiconductor substrate and also connected with the wiring, multiple waveguides formed on the semiconductor substrate and guiding light waves emitted from each of the laser devices, and a multi-wavelength combiner formed on the semiconductor substrate and having a waveguide type directional coupler for combining the light waves guided by the respective waveguides.

Assuming the semiconductor substrate as the optical element substrate, the waveguide and the multi-wavelength combiner are formed thereon, assuming the semiconductor substrate as the electrical system element substrate, the wiring is formed thereon, and further on this semiconductor substrate, the light emitting device, the detector, the control unit, and the like, are mounted, thereby arranging the light emitting device, the detector, the control unit, and the waveguide, and the multi-wavelength combiner on the semiconductor substrate. It is further possible to configure such that electrical circuits of the detector and the control unit are formed in the semiconductor substrate. The semiconductor substrate may be made of silicon, for instance.

Furthermore, on the semiconductor substrate, the light emitting devices are arranged in opposed manner on one end of the waveguide, thereby guiding the light wave emitted from the light emitting device towards the waveguide, without using the optical connector. Since on the semiconductor substrate serving as the optical element substrate, the waveguide and the multi-wavelength combiner are formed in such a manner that the optical axes thereof are aligned with each other, it is possible to introduce the light wave introduced from the light emitting device into the waveguide, further into the multi-wavelength combiner without using the optical connector. The multi-wavelength combiner combines multiple light waves with different wavelengths, being introduced via the waveguide, and outputs the combined light waves.

The present invention has a configuration such that the light emitting device, the waveguide, and the multi-wavelength combiner are arranged on the common semiconductor substrate, thereby rendering unnecessary, the optical members such as the optical connector, allowing the number of components to be reduced, and eliminating the space required for those optical members. Therefore, the spacing in the arrangement is reduced, achieving a downsized the light source device.

In the multi-wavelength combiner provided in the light source device of the present invention, a pitch of the waveguide type directional coupler is different from the pitch of the light emitting device. Typically, the light emitting device is formed as a light emitting device of a semiconductor being different from the waveguide, such as a laser device, and therefore, the pitch of the light emitting device becomes wider than the pitch of the waveguide type directional coupler. In the case where a single device constitutes the light emitting device of each wavelength, each of the light emitting devices is mounted on the semiconductor substrate, and therefore, it is necessary to arrange each of the light emitting devices with a predetermined spacing in arrangement.

Therefore, it is necessary to match the pitch of the light emitting device to the pitch of the waveguide type directional coupler. In order to match the pitch of the light emitting device to the pitch of the waveguide type directional coupler, typically, there is provided a waveguide which optically connects the light emitting device with the waveguide type directional coupler. Then, the waveguide is curved and thereby narrowing the pitch gradually. Since the radius of curvature for curing the waveguide is limited, considering light leakage or the like, it is necessary to put a predetermined distance between the light emitting device and the waveguide type directional coupler, in order to match the pitch. A distance between the light emitting device and the waveguide type directional coupler may be a factor causing an upsize of the light source device.

The light source device of the present invention is provided with a pitch converter which matches the pitch of the light emitting device to the pitch of the waveguide type directional coupler. The pitch converter is an optical device which matches the pitch of the light emitting device to the pitch of the waveguide type directional coupler. By setting the pitch converter between the light emitting device and the waveguide type directional coupler, it is possible to reduce the distance between the light emitting device and the waveguide type directional coupler, thereby further downsizing the light source device.

The pitch converter is formed together with the waveguide and the waveguide type directional coupler on the semiconductor substrate serving as the optical element substrate, using an anisotropic medium which is the same as an SHG (Second Harmonics Generation) wavelength conversion device, thereby reducing the number of coupling portions and downsizing the multi-wavelength combiner.

It is also possible to configure such that the pitch converter is made up of a bend device for bending an optical axis direction, and in particular, it employs a 90 degree bend converter made up of a total internal reflection (TIR) mirror which changes the optical axis direction by 90 degrees, thereby reducing the length of the multi-wavelength combiner. The 90 degree bend converter changes the orientation of the waveguide by 90 degrees.

The TIR mirror using the anisotropic medium may constitute the 90 degree bend converter. The angle of the TIR mirror reflecting surface, with respect to an incident wave, is determined using as parameters, two refraction indexes held by the anisotropic medium with respect to a wavelength of the incident wave.

By way of example, the angle $\theta$ of the TIR mirror reflecting surface when the reflecting angle is 90 degrees, is obtained by the following formula, assuming that the refraction indexes of the anisotropic medium are $n_o$ and $n_e$:

$$n_e^2 + n_o^2 - \sin 2\theta (n_o^2 - n_e^2) - 2n_o^2 \tan \theta = 0$$

By obtaining the angle $\theta$ of the reflecting surface using the refraction indexes $n_o$ and $n_e$ of the anisotropic medium as parameters, it is possible that the angle which the optical axis of the incident wave forms with the optical axis of an outgoing wave is made to be 90 degrees.

With the configuration of the light source device according to the present invention, it is possible to arrange constitutional elements provided in the light source device and mount components thereon, without upsizing the light source device. Here, as the components to be mounted, there are a laser device serving as a light emitting device, a control unit for controlling emission from the light emitting device, and an electrode terminal for electrically connecting wiring formed on the semiconductor substrate with the outside.

The semiconductor substrate of the light source device according to the present invention is configured to be a quadrilateral shape, and multiple light emitting devices are mounted on one side of the quadrilateral shape. Then, on the other side which makes a right angle with the side on which the light emitting devices are mounted, there is provided an outgoing end for outputting the light combined by the multi-wavelength combiner.

The length of each side of the quadrilateral shape is determined approximately based on the size of the waveguide type directional coupler. Therefore, the light emitting devices and the outgoing end are respectively provided on two sides having an orthogonal relationship of the quadrilateral shape, thereby suppressing size expansion caused by the mounted light emitting devices and the outgoing end.

By providing the light emitting devices and the outgoing end on the different sides of the quadrilateral shape, the mounting positions are distributed, thereby suppressing expansion of mounting area caused by mounting the two mounting components on the same position.

The light source device according to the present invention is provided with a control unit for controlling emission from multiple light emitting devices, and an electrode terminal for electrically connecting wiring formed on the semiconductor substrate with the outside, wherein the control unit is mounted on one side of the semiconductor substrate on which the light emitting devices are mounted, and the electrode terminal is formed on the other side of the semiconductor substrate on which the light emitting devices are mounted.

The control unit may incorporate a drive circuit for driving the light emitting devices and a control circuit for controlling current supplied from the drive circuit, and an IC circuit may constitute the control unit. The control unit may be mounted on the semiconductor substrate, and alternatively, it may be formed according to an integrated circuit forming process (IC process) within the semiconductor substrate.

As for the control unit and the electrode terminal, similar to the aforementioned light emitting devices and the outgoing end, they are provided respectively on the two sides having the orthogonal relationship of the quadrilateral shape, thereby suppressing size expansion caused by the control unit and the electrode terminal.

The multi-wavelength combiner of the present invention connects the waveguide type directional couplers for combining two incident waves, in multiple stages. The multi-wavelength combiner is configured in such a manner that the waveguide type directional coupler of each stage combines multiple incident waves with different wavelengths gradually, and the waveguide type directional coupler of the last stage combines multiple incident waves which have been combined by the waveguide type directional coupler on each of the previous stages.

The multi-wavelength combiner of the present invention has a simple configuration which connects the waveguide type directional couplers merely in multiple stages, and the waveguide type directional couplers on the respective stages couple the light waves with different wavelengths sequentially, thereby combining multiple incident waves gradually. With this configuration, it is possible to combine light waves with multiple different wavelengths, without using a device of spatial optical system such as a prism, and therefore increase of the number of components is suppressed, achieving a downsizing.

Each of the waveguide type directional couplers provided in the multi-wavelength combiner of the present invention has wavelength selectivity as to the wavelengths to be combined. The waveguide type directional couplers on the respective stages in the multi-wavelength combiner according to the present invention dissimilate the wavelengths of the light waves to be combined on each stage according to the wavelength selectivity on each stage, a combination of the wavelengths is made to be selected and combined on each stage, and those wavelengths are combined gradually, thereby enabling multiple light waves of different wavelengths to be combined.

Here, two waveguides arranged in parallel constitute the waveguide type directional couplers. The wavelength selectivity of the waveguide type directional coupler is determined based on a coupling section length in which the two parallel waveguides are made closer.

The coupling section length of the waveguide type directional couplers is determined using as parameters, typically, propagation constants of the zero-order mode and first-order mode of the wavelength and the wavelengths. When a length where the two waveguides are adjacent matches the coupling section length, the light wave of one waveguide shifts to the other waveguide. On the other hand, when the adjacent length is different from the coupling section length, shifting of the light wave is not carried out.

The present invention utilizes a property of coupling section length periodicity and a property of wavelength dependence in shifting the light waves in the waveguide type directional coupler; the coupling section length periodicity is a property that a state of light wave shifting between waveguides varies periodically depending on the coupling section length, and the wavelength dependence is a property that the coupling section length periodicity varies depending on a wavelength. By combining the coupling section length periodicity and the wavelength dependence, the wavelength selectivity is given to the waveguide type directional coupler, and by utilizing the wavelength selectivity, multiple light waves with different wavelengths are combined gradually, according to the waveguide type directional couplers which are configured in multiple stages.

In the present invention, according to the coupling section length periodicity and the wavelength dependence, it is found that, among the combinations of multiple coupling section lengths of each wavelength, there is a part where the coupling section lengths are equal. Therefore, by rendering the coupling section length of the waveguide type directional coupler to be the same length, light waves with multiple different wavelengths are combined.

In order to combine the light waves with multiple different wavelengths by one waveguide type directional coupler, it is necessary to select a coupling section length suitable for the light waves to be combined. The waveguide type directional coupler suggested conventionally has a configuration that combines the light waves typically having only one wavelength, by shifting the light waves between the waveguides. Therefore, a coupling section length associated with the wavelength to be shifted is selected. As in the aforementioned case, if the light waves with more than one different wavelength are tried to be combined by using only the coupling section length associated with only one wavelength, it is not possible to combine the light wave with the wavelength which is not associated with the common coupling section length.

Therefore, in the configuration where the waveguide type directional couplers are just dependently connected, when the waveguide type directional coupler on a subsequent stage tries to further combine the light wave with a different wavelength, with the light wave combined in the previous waveguide type directional coupler, the wavelength component combined in the previous stage branches to another waveguide, resulting in failing to combine multiple wavelengths.

The waveguide type directional coupler of the present invention selects a combination of wavelengths having the same coupling section length in cycles of multiple wavelengths combined on each stage, thereby combining multiple wavelengths. This combining of the wavelengths by the waveguide type directional coupler is carried out in multiple stages, therefore it is possible to combine desired multiple wavelengths.

In one configuration of the waveguide type directional coupler according to the present invention, two waveguides are disposed, in such a manner as being adjacent to each other in parallel, across a length of the coupling section length. Multiple incident waves with at least two different wavelengths are incident from two input ports and multiple incident waves are combined, the incident waves being selected based on the wavelength selectivity from the multiple incident waves, and outputs the combined light waves from one output port. From the other port, there is outputted the light wave with the wavelength that has not been combined.

The waveguide type directional coupler of the present invention renders the combined light waves to be visible light having visible light region wavelength, and the multi-wavelength combiner provided with the waveguide type directional coupler projects the combined visible light on the screen of the projector, allowing the light to be displayed.

In the waveguide type directional coupler, the incident light is visible light with different visible light region wavelengths, and it contains R wavelength component, G wavelength component, and B wavelength component. In order to combine these R wavelength component, G wavelength component, and B wavelength component, the multi-stage waveguide type directional couplers are formed on two stages. The waveguide type directional coupler on the first stage combines two wavelength components selected from the three wavelength components, and the waveguide type directional coupler on the second stage combines the light waves combined by the first-stage waveguide type directional coupler, with the light wave with the remaining one wavelength component. With this configuration, the light waves obtained by combining the three wavelength components, the R wavelength component, G wavelength component, and B wavelength component, are outputted from the output port of the second-stage waveguide type directional coupler.

Here, the light emitting device of a semiconductor laser or a second harmonic generation laser (SHG laser) is capable of emitting the visible light. By way of example, the light emitting device of the semiconductor laser is capable of emitting the R wavelength component and the B wavelength component of the visible light, and the light emitting device of the second harmonic generation laser (SHG laser) is capable of emitting the G wavelength.

The waveguide of the present invention is formed by patterning a film made of a material having the optical waveguiding property established on the semiconductor substrate. As the material having the optical waveguiding property, it is possible to employ a silicon nitride film, a germanium-doped silicon oxide film, a resin film, or the like. Patterning of the silicon nitride film or the germanium-doped silicon oxide film can be carried out by dry etching using plasma. Patterning of the resin film can be carried out by UV light exposure, when the resin film is made of a UV sensitive resin; and by $O_2$ plasma processing when the resin film is made of a non UV sensitive resin. It is also possible to carry out the patterning using the nanoimprint technique which presses a mold onto a thermosetting resin or a UV curing resin.

There is more than one example in forming the waveguide, assuming that an independent wave guiding mode is assumed as a single mode.

A first example of the waveguide is a planar-type waveguide which is obtained by forming a core using a thin film on the semiconductor substrate which constitutes the optical element substrate, and two cores are made adjacent to each other in parallel or integrated, for a distance corresponding to a coupling section length, whereby the waveguide is formed.

A second example of the waveguide is a ridge type waveguide obtained by forming a ridge portion on the semiconductor substrate constituting the optical element substrate, and two ridge portions are made adjacent to each other in parallel or integrated, for a distance corresponding to a coupling section length, whereby the waveguide is formed.

A third example of the waveguide is an optical fiber fixed on the semiconductor substrate constituting the optical element substrate, and two optical fiber cores are made adjacent to each other in parallel or integrated, for a distance corresponding to a coupling section length, whereby the waveguide is formed.

According to the present invention, a light source device is configured in such a manner that the aforementioned multi-wavelength combiner and multiple light emitting devices for generating incident waves in respective wavelength ranges are formed on the same semiconductor substrate.

The light source device has a configuration provided with; a detector for detecting light intensity of an outgoing wave from an output port other than the output port for outputting waves being combined by the waveguide type directional couplers, except the directional coupler on the last stage, out of the multiple waveguide type directional couplers connected in multiple stages, an another detector for detecting light intensity of incident waves coupled in the waveguide type directional coupler on the first stage, and a control unit for controlling the intensity of the incident wave generated by the light emitting device.

The control unit gets feedback of the light intensity detected by each of the detectors and controls the light emitting device, thereby allowing the outgoing light amount to be kept constant.

Further in the light source device, multiple light emitting devices for generating incident waves in the respective wavelength ranges; the R wavelength range, G wavelength range, and B wavelength range, are provided on the same semiconductor substrate, thereby configuring the RGB light source device.

This RGB light source device may have a configuration being provided with a first detector for detecting an incident wave in the R wavelength range, an another detector for detecting optical intensity of leaked output from the waveguide type directional coupler on the first stage, a third detector for detecting light intensity of leaked output from the waveguide type directional coupler on the second stage, and a control unit for controlling the intensity of the incident wave generated from the light emitting device. The control unit gets feedback of the light intensity detected by each of the detectors and controls the light emitting device.

According to the waveguide type directional coupler of the present invention, it is possible to form a directional coupler integrally, by using waveguides or optical fibers formed on the semiconductor substrate which constitutes the optical element substrate.

Furthermore, according to waveguide type directional coupler of the present invention, a combination of combined waves is appropriately selected, being coupled by each of the waveguide type directional couplers based on periodicity of the coupling section length, thereby shortening the total length of the multi-wavelength combiner.

According to the light source device of the present invention, the length of the multi-wavelength combiner is reduced, and thereby the total length is shortened. In addition, by providing a 90 degree bend converter between the light emitting device and the waveguide type directional coupler, thereby shortening the total length of the light source device.

The wiring provided on the semiconductor substrate according to the present invention is formed by patterning a metallic film that is placed on the semiconductor substrate. In addition, according to the patterning of the metallic film, a joint is formed together with the wiring. A laser device is connected to the joint. The metallic film may be a film made of Au.

Effect of the Invention

According to the present invention, it is possible to enhance a degree of integration of the optical system element and the electrical system element and to achieve downsizing in the light source device which combines light waves with multiple different wavelengths and outputs the combined waves.

BRIEF DESCRIPTION OF DRAWINGS

FIG. 1 illustrates a basic concept and a principle of operation of a typical waveguide-type directional coupler;

FIG. 8 illustrates states of combined waves in the example that two waveguide type directional couplers are connected in two stages for the three waveguides, according to the present invention;

FIG. 37 illustrates a structure of a 90 degree bend waveguide according to the present invention, and an analysis example according to the FDTD method;

FIG. 64 illustrates arrangement of the SBG; and

EXPLANATION OF REFERENCES

Figure 2A:
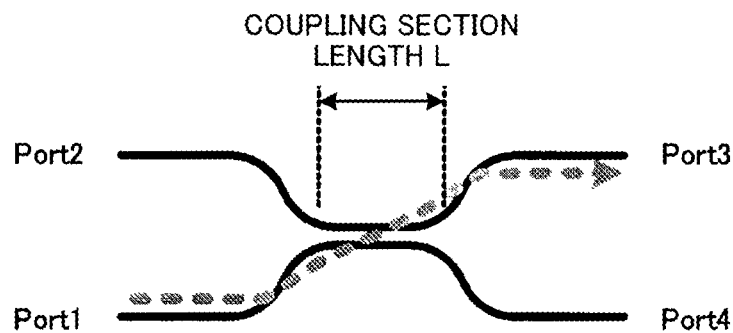
FIG. 2 illustrates periodicity of coupling section length, when one light wave shifts between the waveguides.

1 MULTI-WAVELENGTH COMBINER
2 WAVEGUIDE TYPE DIRECTIONAL COUPLER
2A, 2B, 2C WAVEGUIDE TYPE DIRECTIONAL COUPLER
2a, 2b WAVEGUIDE TYPE DIRECTIONAL COUPLER
3 PITCH CONVERTER
3A, 3B, 3C PITCH CONVERTER
4 LASER DEVICE
4a BLUE LIGHT EMITTING DEVICE
4b RED LIGHT EMITTING DEVICE
4c GREEN LIGHT EMITTING DEVICE
5, 5a, 5b, 5c, 5n DETECTOR
6, 6A, 6B CONTROL UNIT
7 OPTICAL WAVEGUIDE

8 OPTICAL ELEMENT SUBSTRATE
9 WIRING SUBSTRATE
10, 10A, 10B, 10C, 10D, 10E LIGHT SOURCE DEVICE
11A, 11B, 11C 90 DEGREE BEND WAVEGUIDE
11a WAVEGUIDE
11b MIRROR PART
11c MIRROR BACKSIDE
11d UNDER CLAD SURFACE
11e RIDGE LOWER PART
12 WAVEGUIDE
20 PROJECTOR
21 CONTROLLER
22 LIGHT SOURCE DEVICE
23 DEFLECTOR
24 PROJECTOR LENS
31 IMAGE SIGNAL
32 CONTROL SIGNAL
33 CONTROL SIGNAL
34 LIGHT FLUX
35 DEFLECTED LIGHT FLUX
100 SUBSTRATE
101 SiO$_2$ FILM
102 SiN FILM
103 RESIST FILM
105 MOLD FOR NANOIMPRINT
106 Au FILM
107 RESIST FILM
108 INTEGRATED CIRCUIT SECTION
109 PROTECTIVE FILM
110 PHOTOSENSITIVE RESIN MATERIAL
111 NON PHOTOSENSITIVE RESIN MATERIAL
112 CURED RESIN MATERIAL
113 THERMOSETTING RESIN MATERIAL
122 VIA HOLE
200 CLAD
201 UNDER CLAD

BEST MODE FOR CARRYING OUT THE INVENTION

Embodiments of the present invention will be explained, with reference to the accompanying drawings.

Hereinafter, firstly, with reference to FIG. 1 to FIG. 6, an explanation will be made as to the coupling section length and the wavelength selectivity in the waveguide type directional coupler according to the present invention; with reference to FIG. 7 to FIG. 13, an explanation will be made as to the multiple-stage connection of the waveguide type directional couplers according to the present invention; with reference to FIG. 14 to FIG. 16, an explanation will be made as to the configuration of the multi-wavelength combiner and the RGB light source device according to the present invention; with reference to FIG. 17 to FIG. 64, an explanation will be made as to embodiments of the multi-wavelength combiner configuration according to the present invention; and with reference to FIG. 65, an explanation will be made as to a configuration example of the projector employing the light source device.

Firstly, with reference to FIG. 1 to FIG. 6, an explanation will be made as to the coupling section length and the wavelength selectivity in the waveguide type directional coupler of the present invention.

FIG. 1 illustrates a basic concept of a typical waveguide-type directional coupler and a principle of operation thereof; FIG. 1A illustrates an overall schematic configuration of the waveguide type directional coupler, and FIG. 1B illustrates the principle of operation in the coupling section length part.

Two optical waveguides (Waveguide I and Waveguide II in the figure) are arranged in parallel being adjacent to each other in the section length Lc as shown in FIG. 1, assuming that two waveguides have the same structure. When the two waveguides perform wave guiding independently, it is assumed as a single mode. In the part where the two waveguides are arranged in parallel being adjacent to each other, the modes of the respective waveguides interfere with each other and combined, and therefore they are not in the single mode any more.

The electric field within the directional coupler can be approximated by superimposing two progressive waves one on another; even mode $E_{even}(y)$ (zero-order mode) and odd mode $E_{odd}(y)$ (first-order mode), if it is not necessary to consider reflection. Here, when it is assumed that a propagation constant of the even mode is $\beta 0$ (equivalent refractive index "n even"), a propagation constant of the odd mode is $\beta 1$ (equivalent refractive index "n odd"), and a direction of propagation is z-axis, the electric field E(y, z) at the position z can be expressed by the following formula:

$$E(y,z)=E_{even}(y)\exp(-j\beta_{even}z)+E_{odd}(y)\exp(-j\beta_{odd}z) \quad (1)$$

Incident electric field E1(y) at the position z=0, which is joined to one waveguide (Waveguide I in the figure), is expressed by:

$$|E(y,0)|=|E_{even}(y)+E_{odd}(y)|=E_1(y) \quad (2)$$

Here, the incident electric field E1 (y) is inherent mode of the waveguide I (Waveguide I in the figure).

On the other hand, the incident electric field E1(y) at the position of $z=\pi/(\beta_{even}-\beta_{odd})$ is expressed by:

$$|E(y,z)|=|E_{even}(y)-E_{odd}(y)|=E_2(y) \quad (3)$$

The electric field E2 (y) on this occasion (it is assumed that z=L) is inherent mode of the waveguide II (Waveguide II in the figure), and the incident electric field E1 (y) of the waveguide I (Waveguide I in the figure) completely shifts to the electric field E2 (y) of the waveguide II (Waveguide II in the figure) within the coupling section length Lc as expressed by the formula (4). Therefore, in FIG. 1B, the light wave incident from the port 1 of the waveguide I shifts from the waveguide I to the waveguide II in the coupling section length L, and it is outputted from the port 3 of the waveguide II.

$$L_c = \frac{\pi}{\beta_{even} - \beta_{odd}} = \frac{0.5\lambda}{n_{even} - n_{odd}} \quad (4)$$

$$\kappa = \frac{\pi}{2L_c} = \frac{\beta_e - \beta_o}{2} \quad (5)$$

Here, the coupling section length Lc is a function of the equivalent refractive index (effective refractive index) of each mode and the wavelength (in vacuum) $\lambda$. Furthermore, the equivalent refractive index varies, depending on wavelength dispersion of the refractive index inherent to a material forming the waveguide, and also varies since the inherent mode is changed depending on a shape of the waveguide.

It is to be noted that in the foregoing, an example has been explained where adjacent two waveguides constitute the directional coupler. However, a combined-type multimode waveguide (or multimode interference type coupler) formed by integrating two waveguides may also configure the directional coupler.

Next, an explanation will be made as to the wavelength selectivity of the coupling section length, with reference to FIG. 2 to FIG. 6.

Initially, with reference to FIG. 2 to FIG. 4, periodicity of the coupling section length will be explained. It is to be noted that the periodicity of the coupling section length as shown in the figure is schematically illustrated, for the sake of convenience, and it does not represent an actual periodicity.

Figure 2B:
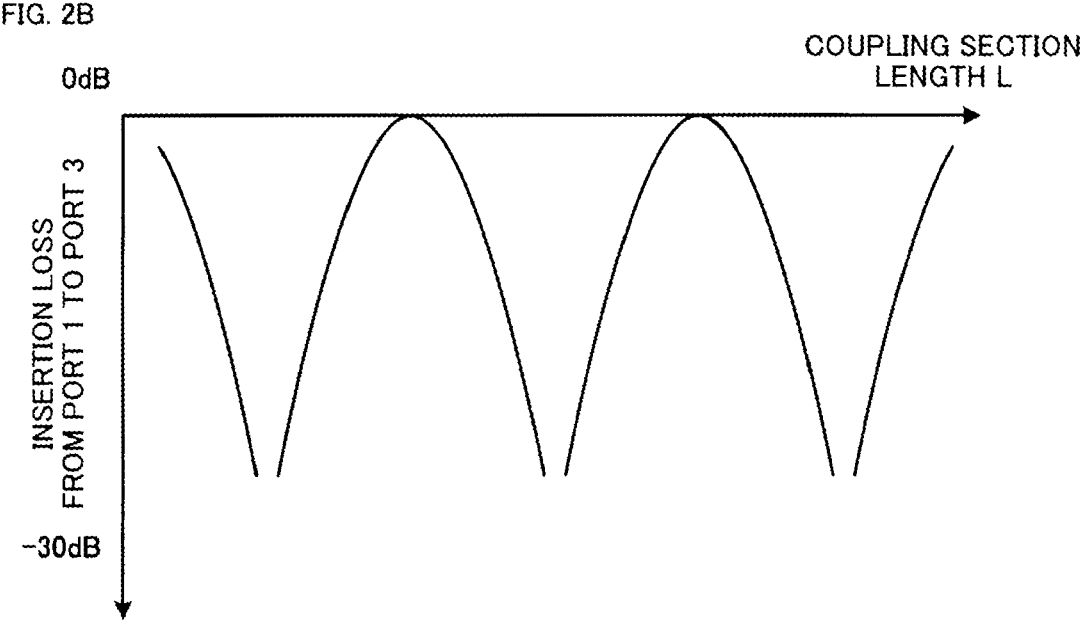

The coupling section length Lc when one light wave shifts between the waveguides is expressed by the formula (4) described above, and also the coupling section length has periodicity. FIG. 2 illustrates the periodicity of the coupling section length when one light wave shifts between the waveguides. In FIG. 2, FIG. 2A illustrates a schematic configuration of the waveguide type directional coupler made up of two waveguides, and FIG. 2B illustrates periodic variation of insertion loss from the port 1 to the port 3, caused by the coupling section length.

If it is assumed that individual degenerating propagation constants of the two waveguides are equivalent, an optical power flow $P_{1-3}$ from the port 1 to the port 3 may be expressed by the formula (6). On the other hand, the optical power flow $P_{1-4}$ from the port 1 to the port 4 may be expressed by the formula (7). In an actual directional coupler, the coupling is not under the ideal condition due to scattering from the waveguides and a loss because of undesired coupling status of the two waveguides, but here in this example, such loss and the like are not considered for simplification.

$$P_{1-3} = \sin^2(\kappa z) \quad (6)$$

$$P_{1-4} = 1 - \sin^2(\kappa Z) = \cos^2(\kappa z) \quad (7)$$

It is to be noted that κ is a function of a signal wavelength which propagates in the waveguide. The function κ shown in the formula (7) is equivalent to the mode coupling coefficient shown in the formula (5).

In FIG. 2A, the waveguide type directional coupler is made up of two waveguides which are adjacent to each other in parallel. One waveguide has the port 1 on the incident side and the port 4 on the output side; the other waveguide has the port 2 on the incident side and the port 3 on the output side.

Light wave with a single wavelength incident from the port 1 of one waveguide (indicated by the dashed line in the figure) shifts to the other waveguide in the coupling section length L, and it is outputted from the port 3, as expressed by the formula (6). Here, if the coupling section length L is changed, the insertion loss from the port 1 to the port 3 fluctuates periodically as shown in FIG. 2B. This periodicity of the coupling section length varies depending on the wavelength of the light wave.

The coupling section length of the waveguide type directional coupler can be selected from multiple coupling section lengths L, by utilizing that the coupling section length periodicity is dependent on the wavelength.

Next, with reference to FIG. 3 and FIG. 4, an explanation will be made as to the periodicity of the coupling section length and the wavelength selectivity, when the light waves (λ1<λ2) having the two wavelengths (λ1, λ2) are coupled.

Figure 3A:
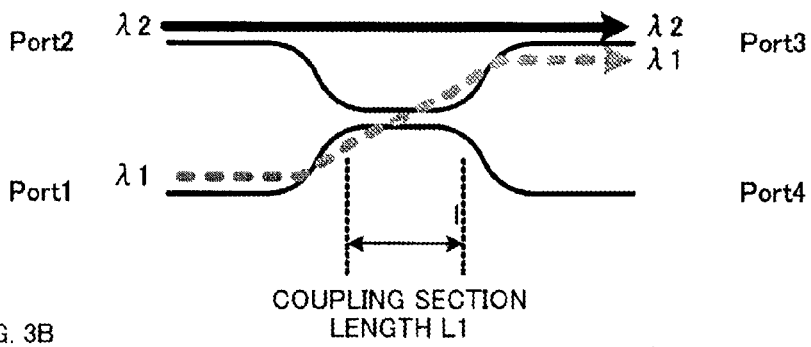
FIG. 3 illustrates the case where a light wave with wavelength $\lambda 2$ is coupled to a light wave with wavelength $\lambda 1$.
Figure 3B:
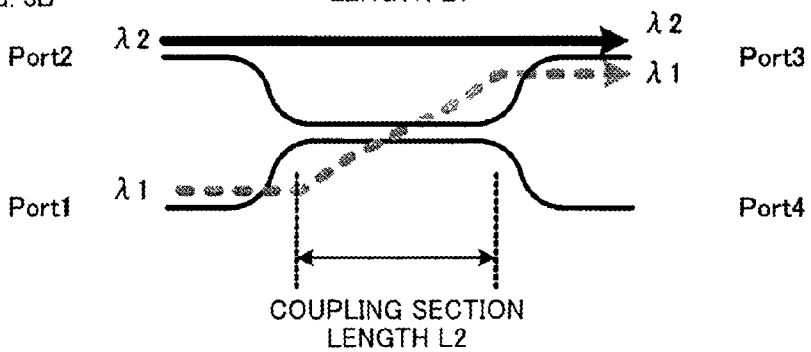
Figure 3C:
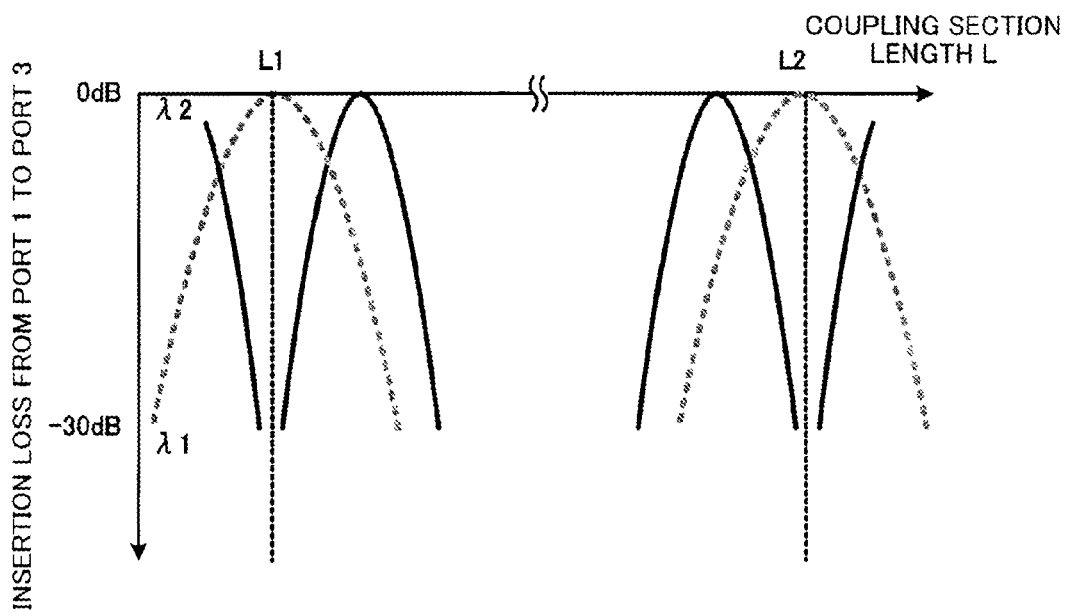

FIG. 3 illustrates the case where the light wave with the wavelength λ2 is coupled to the light wave with the wavelength λ1. FIG. 3 illustrates the periodicity of the coupling section length when the light waves with two different wavelengths shift between the waveguides; FIG. 3A and FIG. 3B illustrate shifting status when the coupling section lengths of the waveguide type directional coupler are different, and FIG. 3C illustrates periodic variation of the insertion loss between the waveguides, depending on the coupling section length, for instance, from the port 1 to the port 3.

In FIG. 3C, the insertion loss from the port 1 to the port 3 of the two different wavelengths (λ1, λ2) varies depending on the coupling section length L of the light waves. The periodic variation of the insertion loss depending on the coupling section length has dependence on the wavelength, and the shorter is the wavelength, the longer becomes the cycle which is expressed by the formulas (6) and (7). By way of example, when the coupling section length is L1 or L2, the insertion loss of the wavelength λ1 (indicated by the dashed line) is small, and the insertion loss of the wavelength λ2 (indicated by the solid line) is large.

FIG. 3A illustrates the case where the coupling section length is L1, and FIG. 3B illustrates the case where coupling section length is L2. According to these coupling section lengths L1 and L2, the light wave with the wavelength λ1 incident from the port 1 shifts to the port 3, because the insertion loss from the port 1 to the port 3 is small. On the other hand, the light wave with the wavelength λ2 incident from the port 2 proceeds to the port 3 without shifting, because the insertion loss between the waveguides is large. Therefore, the periodicity of the coupling section length provides the waveguide type directional coupler with the wavelength selectivity, when the light waves are combined.

Figure 4A:
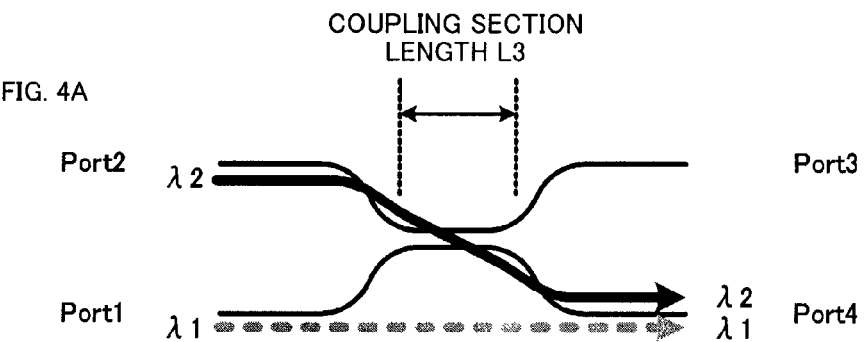
FIG. 4 illustrates the case where a light wave with wavelength $\lambda 1$ is coupled to a light wave with wavelength $\lambda 2$.
Figure 4B:
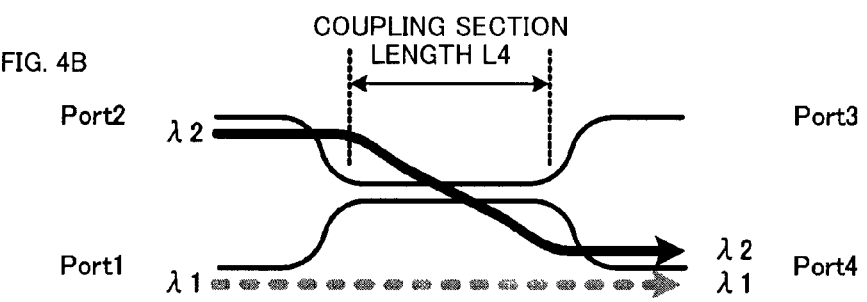
Figure 4C:
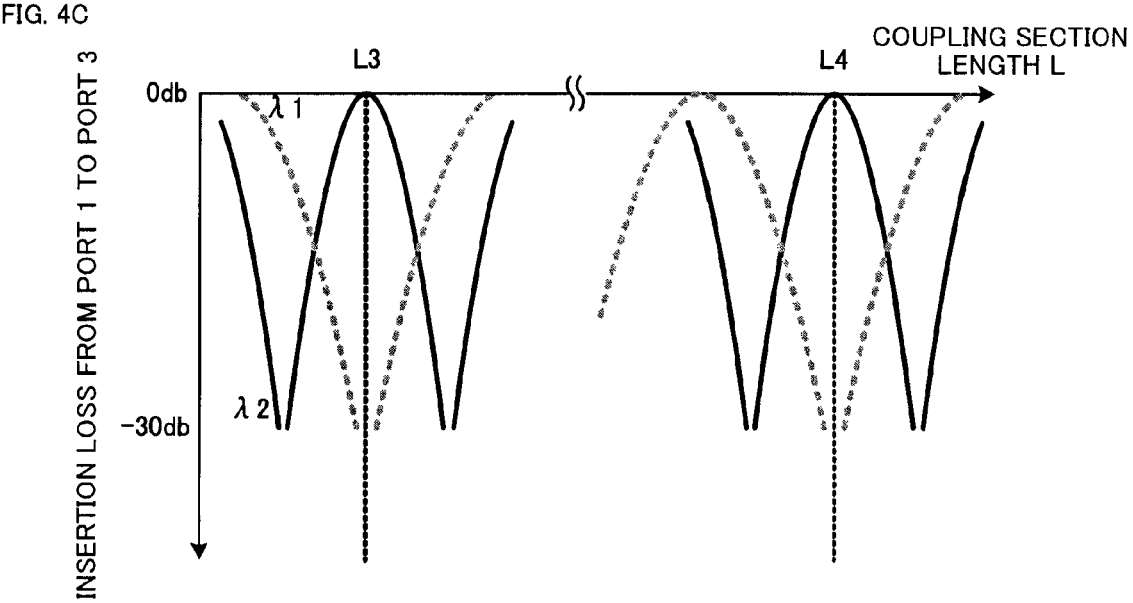

FIG. 4 illustrates the case where the light wave with the wavelength λ1 is coupled to the light wave with the wavelength λ2. Similar to the case of FIG. 3, FIG. 4 illustrates the periodicity of the coupling section length when the light waves with two different wavelengths shift between the waveguides; FIG. 4A and FIG. 4B illustrate the shifting status when the coupling section lengths of the waveguide type directional coupler are different, and FIG. 4C illustrates periodic variation of the insertion loss between the waveguides depending on the coupling section length.

In FIG. 4C, the insertion loss of the two different wavelengths (λ1, λ2) between the waveguides varies depending on the coupling section length L of the light waves. This periodic variation of the insertion loss depending on the coupling section length has dependence on the wavelength, and when the coupling section length is L3 or L4, the insertion loss of the wavelength λ1 (indicated by a dashed line) is large and the insertion loss of the wavelength λ2 (indicated by a solid line) is small.

FIG. 4A illustrates the case where the coupling section length is L3, and FIG. 4B illustrates the case where the coupling section length is L4. According to these coupling section lengths L3 and L4, the light wave with the wavelength λ2 incident from the port 2 shifts to the port 4 since the insertion loss between the waveguides is small, and the light wave with the wavelength λ1 proceeds to the port 4 without shifting since the insertion loss between the waveguides is large. This periodicity of the coupling section length provides the waveguide type directional coupler with the wavelength selectivity when the light waves are combined.

Next, with reference to FIG. 5 and FIG. 6, combining of light waves will be explained, as to the light waves including multiple wavelengths.

Figure 5A:
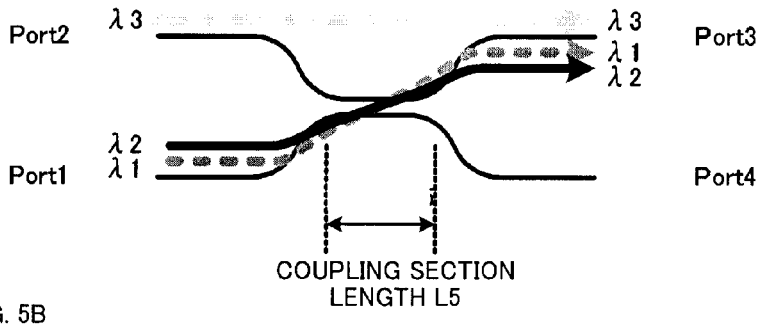
FIG. 5 illustrates the case where a combination of the wavelength $\lambda 1$ and the wavelength $\lambda 2$ is coupled to a light wave with wavelength $\lambda 3$.
Figure 5B:
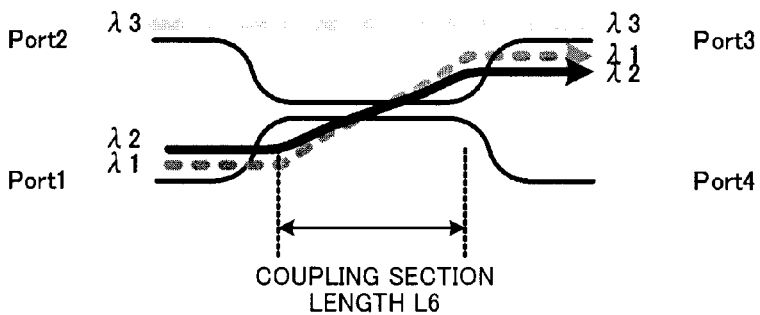
Figure 5C:
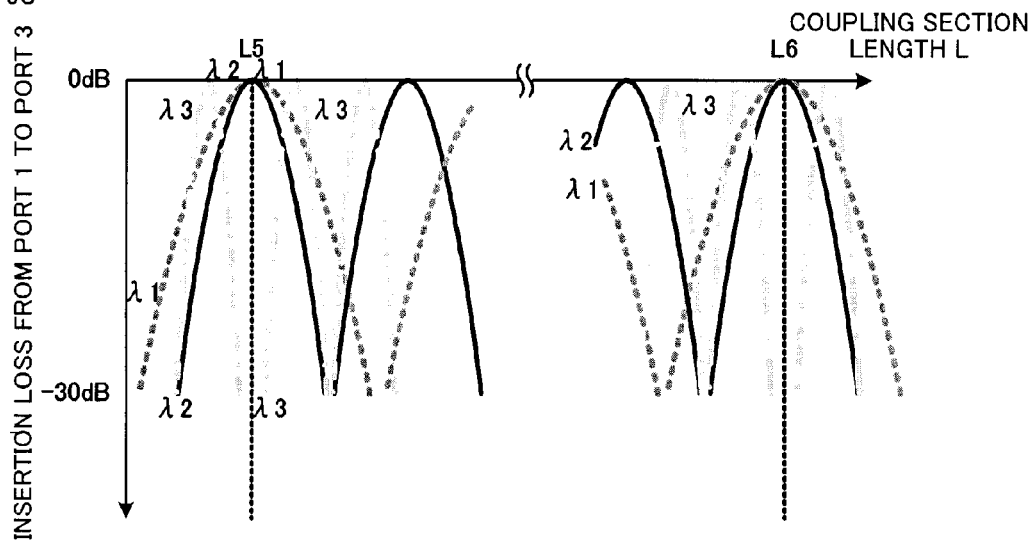

FIG. 5 illustrates the case where the combination of the light waves with the wavelength λ1 and the wavelength λ2, is coupled to the light wave with the wavelength λ3. FIG. 5 illustrates the periodicity of the coupling section lengths when the light waves with three different wavelengths shift between the waveguides; FIG. 5A and FIG. 5B illustrate a shifting status when the coupling section lengths of the waveguide type directional coupler are different, and FIG. 5C illustrates a periodic variation of the insertion loss between the waveguides, depending on the coupling section length.

In FIG. 5C, the insertion loss of the three different wavelengths (λ1, λ2, λ3) (λ1<λ2<λ3) between the waveguides, varies depending on the coupling section length L of the light waves. The periodic variation of the insertion loss depending on the coupling section length has the wavelength dependence, and the shorter is the wavelength, the cycle expressed in the formulas (6) and (7) becomes longer. By way of example, when the coupling section length is L5 or L6, the insertion loss of the wavelength $\lambda 1$ (indicated by a dashed line) and the wavelength $\lambda 2$ (indicated by a solid line) is small, and the insertion loss of the wavelength $\lambda 3$ (indicated by a dashed-dotted line) is large.

FIG. 5A illustrates the case where the coupling section length is L5, and FIG. 5B illustrates the case where the coupling section length is L6. According to the coupling section lengths L5 and L6, the light wave with the wavelength $\lambda 1$ and the light wave with the wavelength $\lambda 2$ incident from the port 1 are small in insertion loss, those light waves shift to the port 3, and since the insertion loss of the light wave with the wavelength $\lambda 3$ incident from the port 2 is large, the light wave proceeds to the port 3 without shifting. According to the periodicity of the coupling section length, the waveguide type directional coupler is provided with the wavelength selectivity also in the case where the light waves with multiple wavelengths are combined.

Figure 6A:
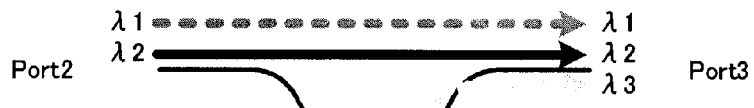
FIG. 6 illustrates the case where a light wave with wavelength $\lambda 3$ is coupled to a combination of the wavelength $\lambda 1$ and the wavelength $\lambda 2$.
Figure 6B:
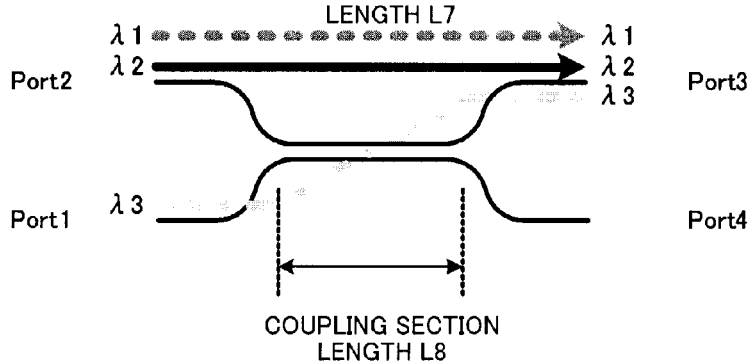
Figure 6C:
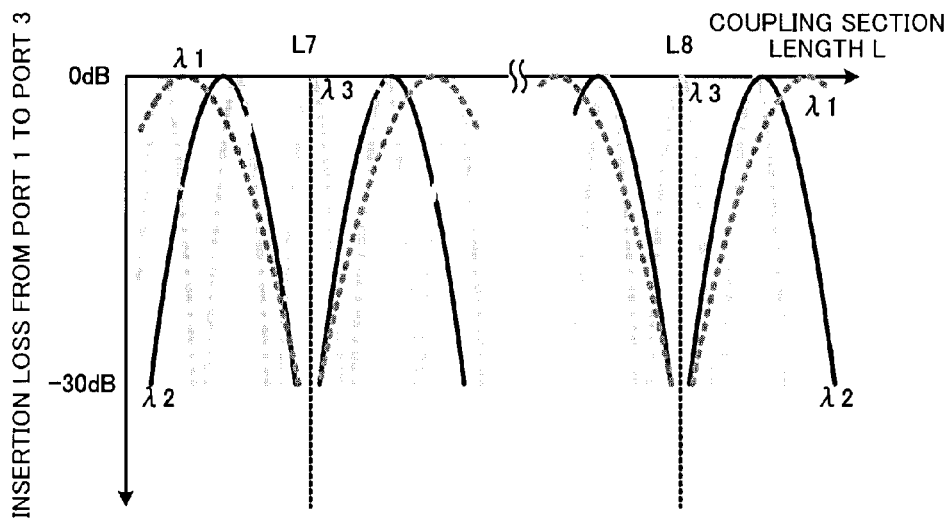

FIG. 6 illustrates the case where the light wave with the wavelength $\lambda 3$ is coupled to the combined waves with the wavelength $\lambda 1$ and the wavelength $\lambda 2$. Similar to the FIG. 5, FIG. 6 illustrates the periodicity of the coupling section length when the light waves with three different wavelengths shift between the waveguides; FIG. 6A and FIG. 6B illustrate the shifting status in the case where the coupling section lengths of the waveguide type directional coupler are different, and FIG. 6C illustrates the periodic variation of the insertion loss between the waveguides, depending on the coupling section length.

In FIG. 6C, the insertion loss of the three different wavelengths ($\lambda 1$, $\lambda 2$, $\lambda 3$) between the waveguides varies depending on the coupling section length L of the light wave. The periodic variation of the insertion loss depending on the coupling section length has dependence on the wavelength, and for example, when the coupling section length is L7 or L8, the insertion loss of the wavelength $\lambda 1$ (indicated by a dashed line) and the wavelength 2 (indicated by a solid line) is large, and the insertion loss of the wavelength $\lambda 3$ (indicated by a dashed-dotted line) is small.

FIG. 6A illustrates the case where the coupling section length is L7, and FIG. 6B illustrates the case where the coupling section length is L8. According to the coupling section lengths L7 and L8, since the insertion loss of the light wave with the wavelength $\lambda 3$ incident from the port 1 is small, the light wave shifts to the port 3, and since the insertion loss of the light waves with the wavelengths $\lambda 1$ and $\lambda 2$ is large, the light waves proceed to the port 3 without shifting. According to the periodicity of the coupling section length, the waveguide type directional coupler is provided with the wavelength selectivity also in the case where light waves with multiple wavelengths are combined.

Next, with reference to FIG. 7 to FIG. 13, an explanation will be made as to a configuration where the waveguide type directional couplers are connected in multiple stages. Figures from FIG. 7 to FIG. 10 illustrate examples of multistage connection of the waveguide type directional couplers for combining light waves with three different wavelengths. In addition, figures from FIG. 11 to FIG. 13 illustrate examples of multistage connection of the waveguide type directional couplers for combining light waves with four different wavelengths.

Figure 7A:
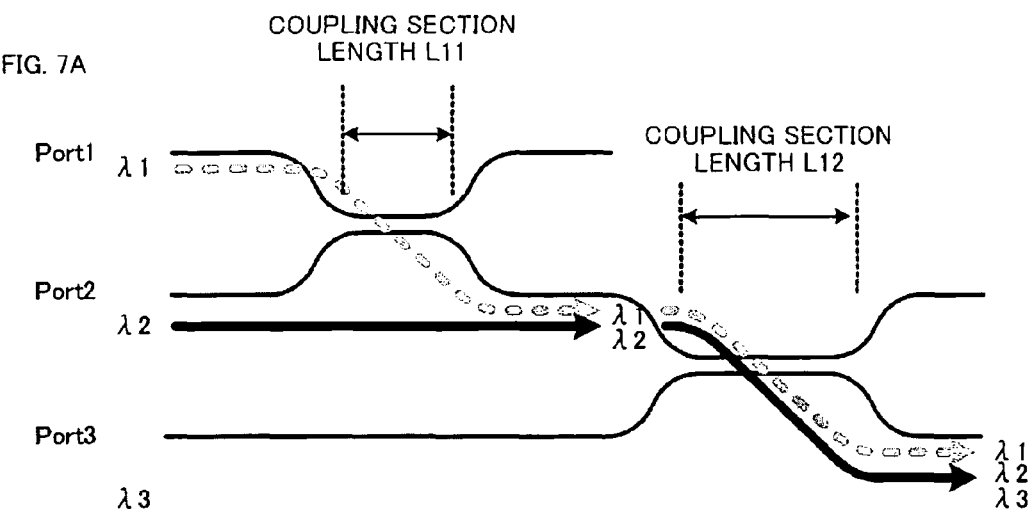
FIG. 7 illustrates an example that two waveguide type directional couplers are connected in two stages for the three waveguides according to the present invention.
Figure 7B:
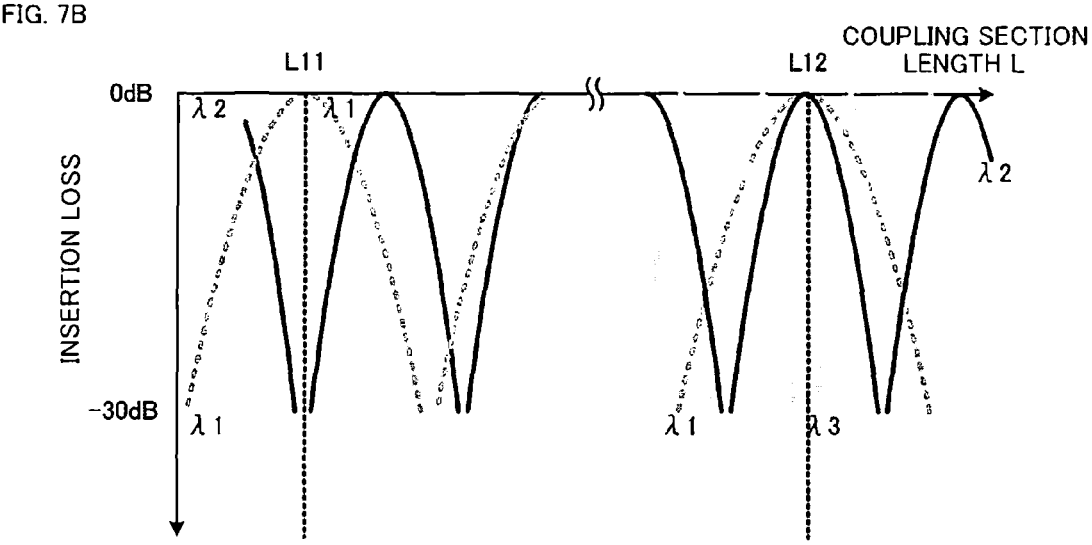

The connection example as shown in FIG. 7 represents that two waveguide type directional couplers are connected in two stages, for three waveguides. FIG. 7A illustrates the waveguide type directional couplers connected in multiple stages, and FIG. 7B illustrates the insertion loss between the waveguides in the two coupling section lengths.

In FIG. 7A, firstly, between the two waveguides being adjacent, among the three waveguides, a first-stage waveguide type directional coupler is formed in the coupling section length L11; and next, between the waveguide having been coupled and the remaining waveguide, a second-stage waveguide type directional coupler is formed in the coupling section length L12.

From each of the waveguides, the light waves $\lambda 1$, $\lambda 2$, $\lambda 3$ ($\lambda 1 < \lambda 2 < \lambda 3$) being different from one another are incident. As for the light wave with the wavelength $\lambda 1$ incident from the port 1 and the light wave with the wavelength $\lambda 2$ incident from the port 2, as indicated by the insertion loss property of FIG. 7B, in the coupling section length L11, the insertion loss of the light wave with the wavelength $\lambda 1$ (indicated by a dashed line) is small and the insertion loss of the light wave with the wavelength $\lambda 2$ (indicated by a solid line) is large, and therefore the light wave with the wavelength $\lambda 1$ incident on the first waveguide is coupled to the second waveguide.

Next, as for the light waves on the second waveguide, obtained by combining the light wave with the wavelength $\lambda 1$ and the light wave with the wavelength $\lambda 2$, and the light wave with the wavelength $\lambda 3$ incident on the third waveguide, as indicated by the insertion loss property of FIG. 7B, in the coupling section length L12, the insertion loss of the light waves with the wavelength $\lambda 1$ and the wavelength $\lambda 2$ (indicated by the dashed line and the solid line) is small, and the insertion loss of the light wave with the wavelength $\lambda 3$ (indicated by the dashed-dotted line) is large, the light waves with the wavelength $\lambda 1$ and the wavelength $\lambda 2$ on the second waveguide is coupled to the third waveguide. Accordingly, the light waves with the wavelengths $\lambda 1$, $\lambda 2$, and $\lambda 3$ are combined on the third waveguide.

FIG. 8 illustrates the state where the waves are combined. FIG. 8A, FIG. 8B, and FIG. 8D illustrate the periodicity of the coupling section length, respectively of the wavelengths $\lambda 1$, the wavelength $\lambda 2$, and the wavelength $\lambda 3$.

As shown in FIG. 8C, the insertion loss in the coupling section length L11 of the first-stage waveguide type directional coupler is small for the wavelength $\lambda 1$ (indicated by a dashed line), and it is large for the wavelength $\lambda 2$ (indicated by a solid line), by combining the coupling section length periodicity of the wavelength $\lambda 1$ as shown in FIG. 8A and the coupling section length periodicity of the wavelength $\lambda 2$ as shown in FIG. 8B. Accordingly, the first-stage waveguide type directional coupler couples the light wave with the wavelength $\lambda 1$ to the light wave with the wavelength $\lambda 2$.

Next, as shown in FIG. 8E, the insertion loss in the coupling section length L12 of the second-stage waveguide type directional coupler is small for the wavelength $\lambda 1$ (indicated by a dashed line) and the wavelength $\lambda 2$ (indicated by a solid line) and it is large for the wavelength $\lambda 3$ (indicated by a dashed-dotted line), by combining the coupling section length periodicity of the wavelength $\lambda 1$ as shown in FIG. 8A, the coupling section length periodicity of the wavelength $\lambda 2$ as shown in FIG. 8B, and the coupling section length periodicity of the wavelength $\lambda 3$ as shown in FIG. 8D. Accordingly, the second-stage waveguide type directional coupler couples the combined waves with the wavelength $\lambda 1$ and the wavelength $\lambda 2$, to the light wave with the wavelength $\lambda 3$.

Figure 9A:
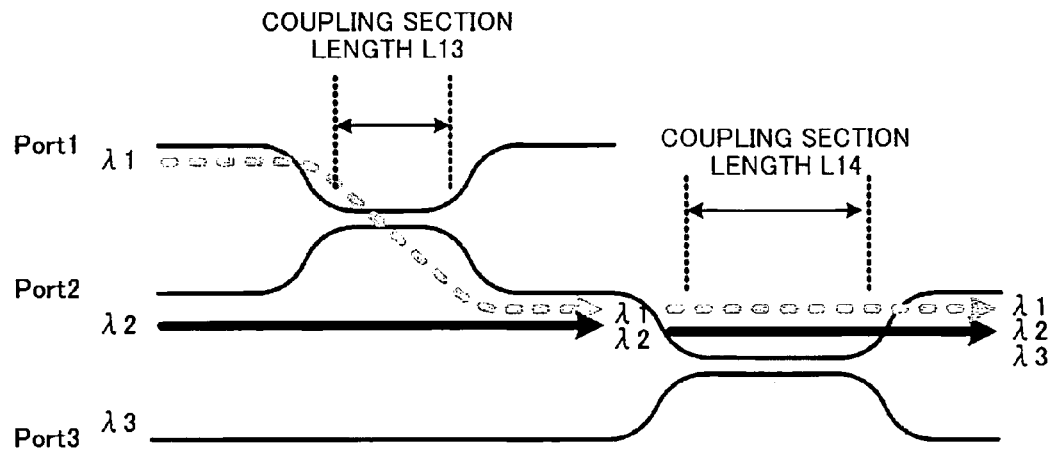
FIG. 9 illustrates another example that two waveguide type directional couplers are connected in two stages for the three waveguides, according to the present invention.
Figure 9B:
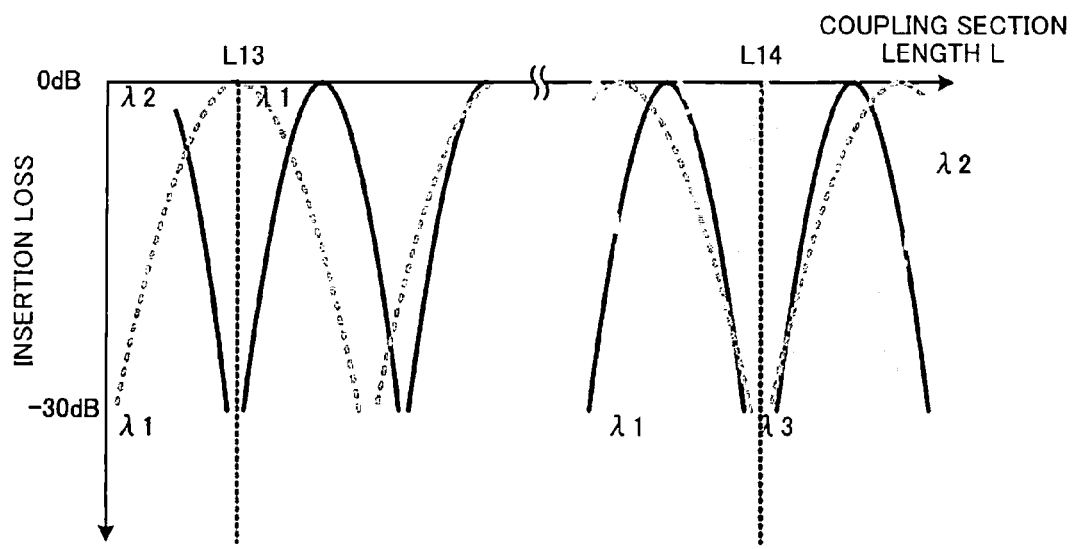

The connection example as shown in FIG. 9 illustrates another example where two waveguide type directional couplers are connected in two stages for three waveguides. FIG. 9A illustrates multistage connection of the waveguide type directional couplers, and FIG. 9B illustrates the insertion loss between the waveguides in the two coupling section lengths.

In FIG. 9A, the first-stage waveguide type directional coupler is formed in the coupling section length L13 between the two waveguides adjacent to each other among the three waveguides. Next, the second-stage waveguide type directional coupler is formed in the coupling section length L14 between the waveguides being coupled and the remaining waveguide.

Light waves with wavelengths being different from one another, $\lambda 1, \lambda 2, \lambda 3$ ($\lambda 1 < \lambda 2 < \lambda 3$) are incident from the respective waveguides. As indicated by the insertion loss property in FIG. 9B, as for the light waves with the wave length $\lambda 1$ incident from the port 1 and the wavelength $\lambda 2$ incident from the port 2, the insertion loss of the light wave with wavelength $\lambda 1$ (indicated by a dashed line) is small and the insertion loss of the light wave with the wavelength $\lambda 2$ (indicated by a solid line) is large, in the length L13. Therefore, the light wave with the wavelength $\lambda 1$ incident on the first waveguide is coupled to the light wave on the second waveguide.

Next, as for the light waves with the wavelength $\lambda 1$ and the wavelength $\lambda 2$ combined into the second waveguide, and the light wave with the wavelength $\lambda 3$ incident on the third waveguide, as indicated by the insertion loss property in FIG. 9B, in the coupling section length L14, the insertion loss (indicated by a dashed line and a solid line) of the light waves with the wavelength $\lambda 1$ and the wavelength $\lambda 2$ is large, and the insertion loss (indicated by a dashed-dotted line) of the light wave with the wavelength $\lambda 3$ is small. Therefore, the light wave with the wavelength $\lambda 3$ on the third waveguide is coupled to the light waves on the second waveguide. Accordingly, the light waves with the wavelength $\lambda 1, \lambda 2$, and $\lambda 3$ are combined on the third waveguide.

There is more than one form for establishing connection of multiple waveguide type directional couplers. FIG. 10 schematically illustrates a configuration example for connecting multiple waveguide type directional couplers.

Figure 10A:
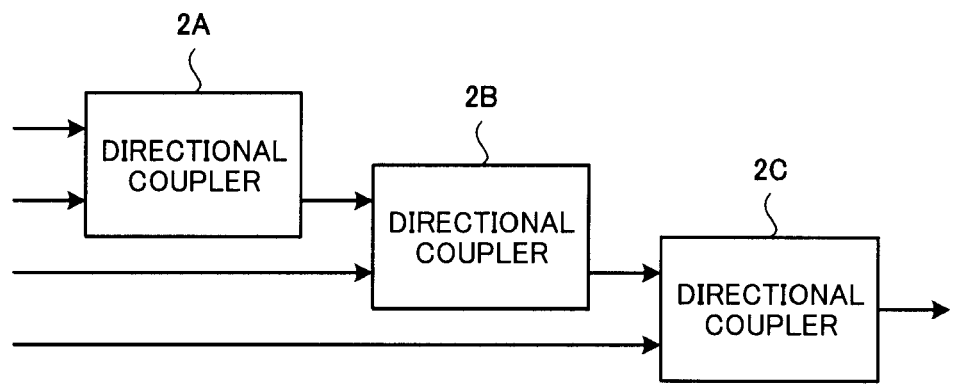
FIG. 10 schematically illustrates a configuration example for connecting multiple waveguide type directional couplers according to the present invention.

FIG. 10A illustrates a configuration where multiple waveguide type directional couplers 2A, 2B, and 2C are connected sequentially in stages. The light waves coupled by the waveguide type directional coupler on the former stage are coupled to another light wave on another waveguide in the next-stage waveguide type directional coupler. By sequentially repeating such coupling process, multiple light waves with different wavelengths are coupled to form combined waves.

Figure 10B:
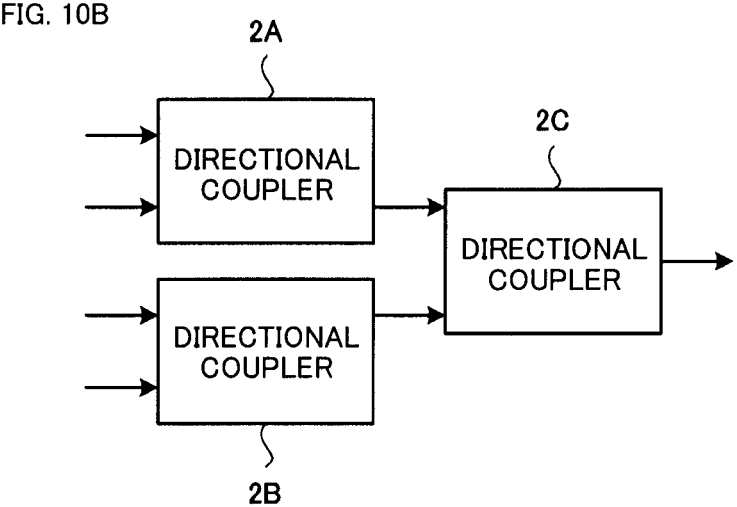

FIG. 10B illustrates a configuration where the light waves coupled by the waveguide type directional coupler 2A and the light waves coupled by the waveguide type directional coupler 2B, are coupled by the waveguide type directional coupler 2C which is connected subsequently. By repeating this configuration, multiple light waves with different wavelengths are coupled to form combined waves.

With reference to FIG. 11 to FIG. 13, an explanation will be made as to a configuration where light waves with four different wavelengths are coupled to form combined waves.

Similar to the FIG. 7, the configuration example shown in FIG. 11 illustrates a configuration where waveguide type directional couplers are connected sequentially in stages, which is associated with the example shown in FIG. 10A.

Figure 11A:
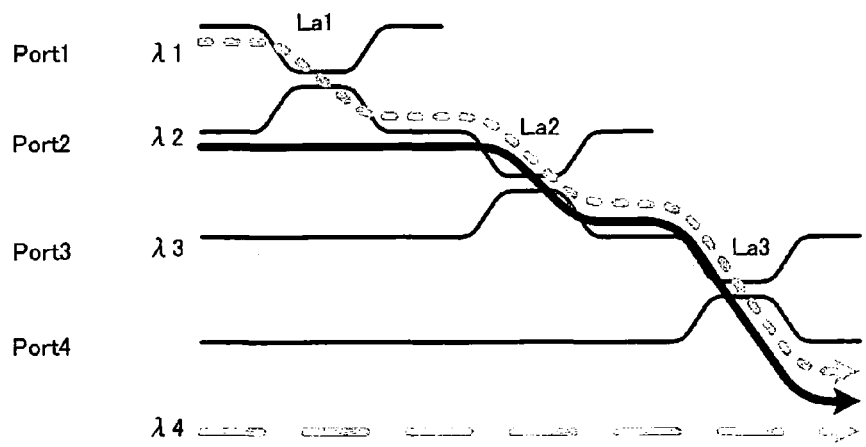
FIG. 11 schematically illustrates a configuration example for forming combined waves, by combining light waves with four different wavelengths according to the present invention.
Figure 11B:
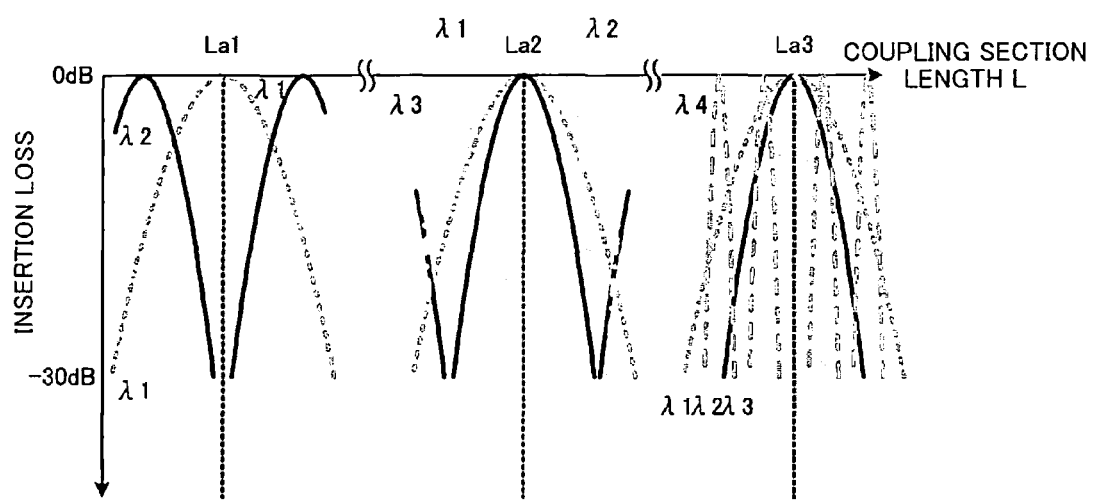

FIG. 11A illustrates multistage connection of the waveguide type directional couplers, and FIG. 11B illustrates insertion loss between the waveguides in each of the coupling section lengths.

In FIG. 11A, initially, the first-stage waveguide type directional coupler is formed with the coupling section length La1 between the two waveguides being adjacent to each other among the four waveguides, next, the second-stage waveguide type directional coupler is formed with the coupling length La2 between the waveguides being coupled and the third waveguide, and finally, the third-stage waveguide type directional coupler is formed with the coupling section length La3 between the waveguides being coupled and the fourth waveguide.

Light wave with wavelengths $\lambda 1, \lambda 2, \lambda 3$, and $\lambda 4$ ($\lambda 1 < \lambda 2 < \lambda 3 < \lambda 4$) different from one another, are incident from the respective waveguides. As for the light wave with the wavelength $\lambda 1$ incident from the port 1 and the light wave with the wavelength $\lambda 2$ incident from the port 2, as indicated by the insertion loss shown in FIG. 11B, in the coupling section length La1, the insertion loss of the light wave with the wavelength $\lambda 1$ (indicated by a dashed line) is small, and the insertion loss of the light wave with the wavelength $\lambda 2$ (indicated by a solid line) is large, and therefore, the light wave with the wavelength $\lambda 1$ incident on the first waveguide is coupled to the light wave with the wavelength $\lambda 2$ on the second waveguide.

Next, as for the light wave with the wavelength $\lambda 1$ and the light wave with the wavelength $\lambda 2$, being coupled on the second waveguide, and the light wave with the wavelength $\lambda 3$ incident from the third port 3, as indicated by the insertion loss shown in FIG. 11B, in the coupling section length La2, the insertion loss of the light waves with the wavelength $\lambda 1$ and the wavelength $\lambda 2$ (indicated by the dashed line and the solid line) is small, and the insertion loss of the light wave with the wavelength $\lambda 3$ (indicated by a dashed-dotted line) is large, the light waves with the wavelength $\lambda 1$ and the wavelength $\lambda 2$ on the second waveguide is coupled to the light wave with the wavelength $\lambda 3$ on the third waveguide. Consequently, the light waves with the wavelengths $\lambda 1, \lambda 2$, and $\lambda 3$ are combined on the third waveguide.

Finally, as for the light wave with the wavelength $\lambda 1$, the light wave with the wavelength $\lambda 2$, and the light wave with the wavelength $\lambda 3$, being coupled on the third waveguide, and the light wave with the wavelength $\lambda 4$ incident from the fourth port 4, as indicated by the insertion loss shown in FIG. 11B, in the coupling section length La3, the insertion loss of the light waves with the wavelength $\lambda 1$, the wavelength $\lambda 2$, and the wavelength $\lambda 3$ (indicated by a dashed line, a solid line, and a dashed-dotted line) is small and the insertion loss of the light wave with the wavelength $\lambda 4$ (indicated by a long dashed line) is large, and therefore the light waves with the wavelength $\lambda 1$, the wavelength $\lambda 2$, and the wavelength $\lambda 3$ on the third waveguide is coupled to the light wave with the wavelength $\lambda 4$ on the fourth waveguide. Consequently, the light waves with the wavelengths $\lambda 1, \lambda 2, \lambda 3$, and $\lambda 4$ are combined on the fourth waveguide.

The example as shown in FIG. 12 illustrates a configuration where multiple waveguide type directional couplers are sequentially connected to one waveguide.

Figure 12A:
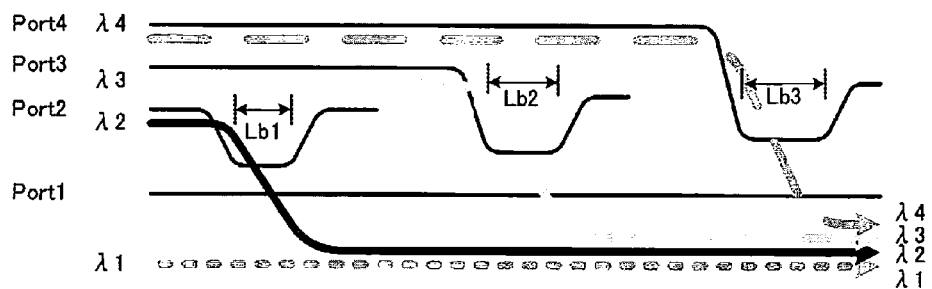
FIG. 12 schematically illustrates a configuration example for forming combined waves, by combining light waves with four different wavelengths according to the present invention.
Figure 12B:
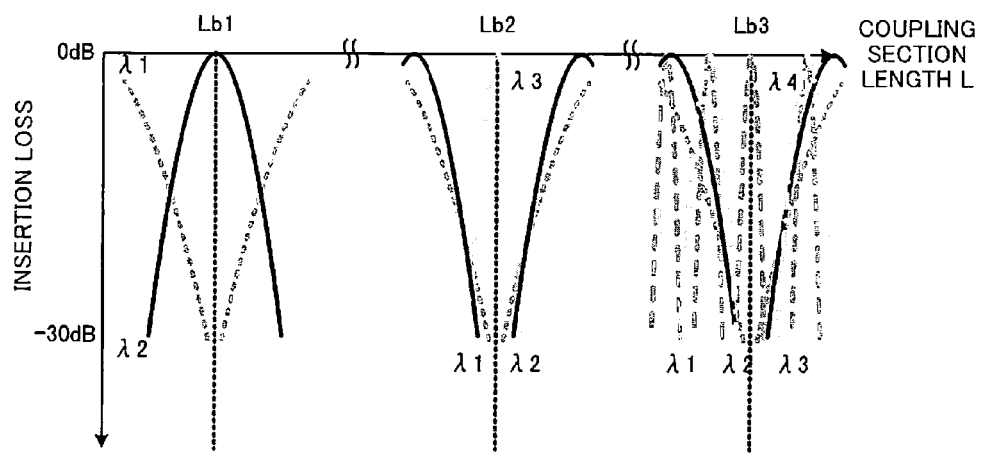

FIG. 12A illustrates a multistage connection of the waveguide type directional couplers, and FIG. 12B illustrates insertion loss between the waveguides in each of the coupling section lengths.

FIG. 12A illustrates the configuration where multiple waveguide type directional couplers are sequentially connected to one waveguide among the four waveguides, and the first-stage waveguide type directional coupler is formed in the coupling section length Lb1, the second-stage waveguide type directional coupler is formed in the coupling section length Lb2, the third-stage waveguide type directional coupler is formed in the coupling section length Lb3.

Light waves with the wavelength $\lambda 1, \lambda 2, \lambda 3$, and $\lambda 4$ ($\lambda 1 < \lambda 2 < \lambda 3 < \lambda 4$) different from one another are incident from the respective waveguides. As for the light wave with the wavelength $\lambda 1$ incident from the port 1 and the light wave with the wavelength $\lambda 2$ incident from the port 2, as indicated by the insertion loss shown in FIG. 12B, in the coupling section length Lb1, the insertion loss of the light wave with the wavelength $\lambda 2$ (indicated by a solid line) is small, and the insertion loss of the light wave with the wavelength $\lambda 1$ (indicated by a dashed line) is large, and therefore, the light wave with the wavelength $\lambda 2$ incident on the second waveguide is coupled to the light wave with the wavelength $\lambda 1$ on the first waveguide.

Next, as for the light wave with the wavelength $\lambda 1$ and the light wave with the wavelength $\lambda 2$, being coupled on the first waveguide, and the light wave with the wavelength $\lambda 3$ incident from the third port 3, as indicated by the insertion loss shown in FIG. 12B, in the coupling section length Lb2, the insertion loss of the light waves with the wavelength $\lambda 1$ and the wavelength $\lambda 2$ (indicated by a dashed line and a solid line) is large, and the insertion loss of the light wave with the wavelength $\lambda 3$ (indicated by a dotted and dashed line) is small, the light wave with the wavelength $\lambda 3$ on the third waveguide is coupled to the light waves with the wavelength $\lambda 1$ and the wavelength $\lambda 2$ on the first waveguide. Consequently, the light waves with the wavelengths $\lambda 1$, $\lambda 2$, and $\lambda 3$ are combined on the first waveguide.

Finally, as for the light wave with the wavelength $\lambda 1$, the light wave with the wavelength $\lambda 2$, and the light wave with the wavelength $\lambda 3$, being coupled on the first waveguide, and the light wave with the wavelength $\lambda 4$ incident from the fourth port 4, as indicated by the insertion loss shown in FIG. 12B, in the coupling section length Lb3, the insertion loss of the light waves with the wavelength $\lambda 1$, the wavelength $\lambda 2$, and the wavelength $\lambda 3$ (indicated by the dashed line, the solid line, and the dotted and dashed line) is large, and the insertion loss of the light wave with the wavelength $\lambda 4$ (indicated by the dashed line) is small, and therefore the light wave with the wavelength $\lambda 4$ on the fourth waveguide is coupled to the light waves with the wavelength $\lambda 1$, the wavelength $\lambda 2$, and the wavelength $\lambda 3$ on the third waveguide. Consequently, the light waves with the wavelengths $\lambda 1$, $\lambda 2$, $\lambda 3$, and $\lambda 4$ are combined on the first waveguide.

The configuration example shown in FIG. 13 illustrates a configuration where waveguide type directional couplers are connected sequentially in stages, which is associated with the example shown in FIG. 10B.

Figure 13A:
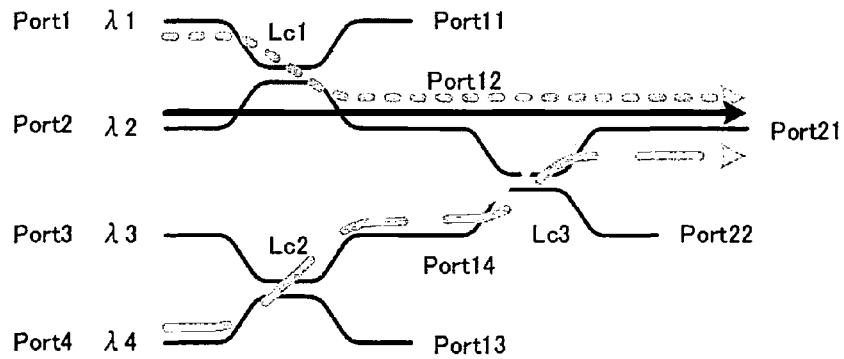
FIG. 13 schematically illustrates a configuration example for forming combined waves, by combining light waves with four different wavelengths according to the present invention.
Figure 13B:
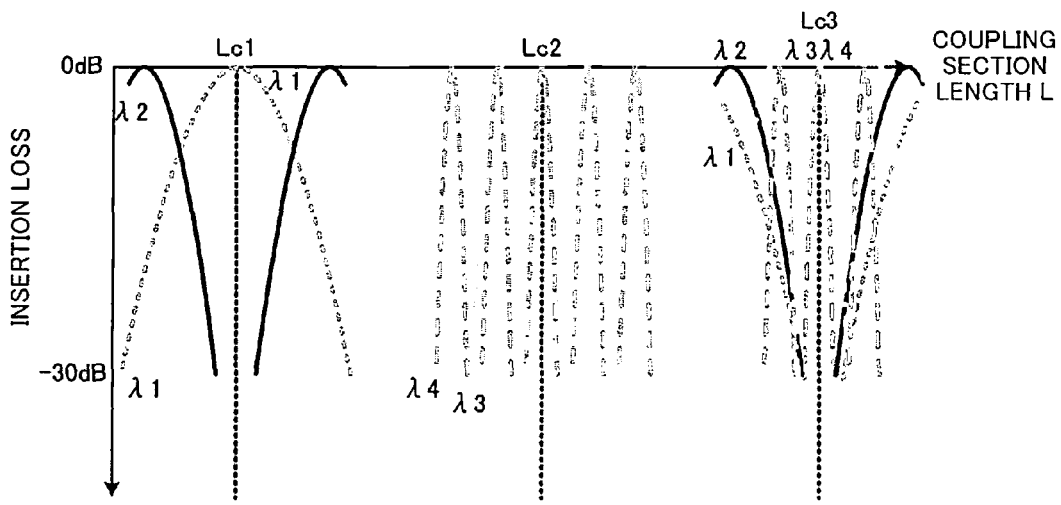

FIG. 13A illustrates a multistage connection of the waveguide type directional couplers, and FIG. 13B illustrates insertion loss between the waveguides in each of the coupling section lengths.

FIG. 13A illustrates a configuration where two waveguides among four waveguides are coupled by the waveguide type directional coupler, and two sets of this configuration are formed, and further two waveguides made up of the two sets of waveguide type directional couplers, respectively, are connected by a waveguide type directional coupler.

The first-stage waveguide type directional coupler associated with the coupling section length Lc1 is formed on the first waveguide and the second waveguide, the first-stage waveguide type directional coupler associated with the coupling section length Lc2 is formed on the third waveguide and the fourth waveguide, and further, the second-stage waveguide type directional coupler associated with the coupling section length Lc3 is formed on the coupled two waveguides.

Light waves with the wavelength $\lambda 1$, $\lambda 2$, $\lambda 3$, and $\lambda 4$ ($\lambda 1 < \lambda 2 < \lambda 3 < \lambda 4$) different from one another are incident from the respective waveguides. As for the light wave with the wavelength $\lambda 1$ incident from the port 1 and the light wave with the wavelength $\lambda 2$ incident from the port 2, as indicated by the insertion loss property shown in FIG. 13B, in the coupling section length Lc1, the insertion loss of the light wave with the wavelength $\lambda 1$ (indicated by a dashed line) is small and the insertion loss of the light wave with the wavelength $\lambda 2$ (indicated by a solid line) is large, and therefore the light wave with the wavelength $\lambda 1$ incident on the first waveguide is coupled to the light wave with the wavelength $\lambda 2$ on the second waveguide.

On the other hand, as for the light waves with the wavelength $\lambda 3$ incident from the port 3 and the light wave with the wavelength $\lambda 4$ incident from the port 4, as indicated by the insertion loss property shown in FIG. 13B, in the coupling section length Lc2, the insertion loss of the light wave with the wavelength $\lambda 4$ (indicated by the dashed line) is small and the insertion loss of the light wave with the wavelength $\lambda 3$ (indicated by a dotted and dashed line) is large, and therefore, the light wave with the wavelength $\lambda 4$ on the fourth waveguide is coupled to the light wave with wavelength $\lambda 3$ incident on the third waveguide.

Finally, as for the light waves with the wavelength $\lambda 1$ and the wavelength $\lambda 2$ being combined and the light waves with the wavelength $\lambda 3$ and the wavelength $\lambda 4$ also combined, as indicated by the insertion loss property shown in FIG. 13B, in the coupling section length Lc3, the insertion loss of the light waves with the wavelength $\lambda 3$ and the wavelength $\lambda 4$ (indicated by a dashed line and a dotted and dashed line) is small and the insertion loss of the light waves with the wavelength $\lambda 1$ and the wavelength $\lambda 2$ (indicated by a dashed line and a solid line) is large, and therefore, the light waves with the wavelength $\lambda 3$ and the wavelength $\lambda 4$ are coupled to the light waves with the wavelength $\lambda 1$ and the wavelength $\lambda 2$.

As discussed above, the multi-wavelength combiner of the present invention selects a combination of the coupling section lengths for combining waves, based on the periodicity of the coupling section lengths, respectively held by the light waves with the wavelengths to be combined, configures a waveguide type directional coupler established by the combination of these coupling section lengths, thereby coupling the multiple wavelengths, and further combines these waveguide type directional couplers in multistage, so as to combine multiple wavelengths.

In addition, according to the waveguide type directional coupler of the present invention, it is possible to select from combinations of the aforementioned coupling section lengths, a combination which makes the entire length of the multi-wavelength combiner to be short, thereby downsizing the multi-wavelength combiner.

It is to be noted that in the explanation above, the relationship among each of the wavelengths is assumed as $\lambda 1 < \lambda 2 < \lambda 3 < \lambda 4$, but the wavelength relationship is not limited to this example. It is possible to define the periodicity of the coupling section length, based on the relationship between the aforementioned wavelength and the periodicity.

Next, with reference to FIG. 14 and FIG. 15, an explanation will be made as to a configuration example of the multi-wavelength combiner of the present invention, and with reference to FIG. 16, an explanation will be made as to a configuration example of the light source device according to the present invention.

Figure 14A:
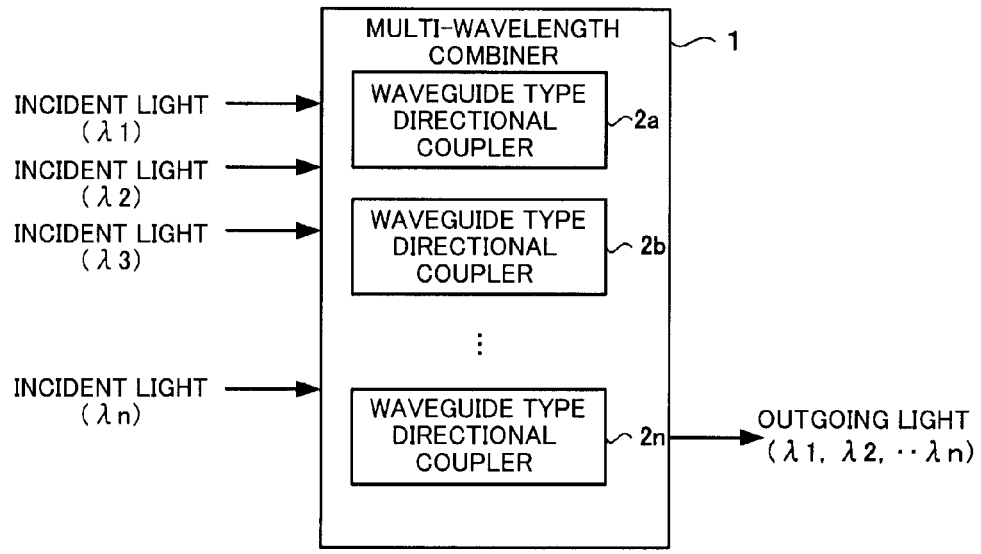
FIG. 14 illustrates configuration examples of the multi-wavelength combiner according to the present invention.

In FIG. 14A, the multi-wavelength combiner 1 is provided with multiple waveguide type directional couplers 2a, 2b, to 2n, and it is formed by a multistage connection of the couplers as described above, for multiple waveguides. Incident light 1 to incident light n with different wavelengths $\lambda 1$ to $\lambda n$ are incident on the multi-wavelength combiner 1, and the waveguide type directional couplers 2a to 2n being connected in multiple stages combine those light elements with one another. The combined waves being obtained are outputted as outgoing light.

Figure 14B:
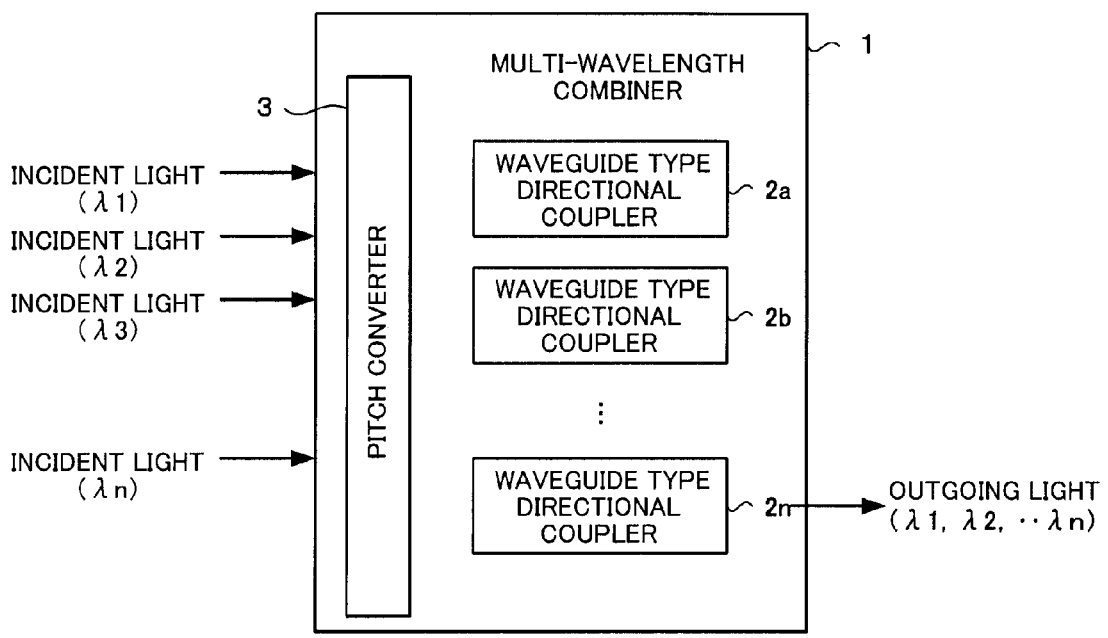

As shown in FIG. 14B, the multi-wavelength combiner 1 may have a configuration being provided with a pitch converter 3, in addition to the multiple waveguide type directional couplers 2a to 2n. The pitch converter 3 is a device for adjusting a pitch of multiple waveguides for guiding the incident light to the waveguide type directional couplers 2a to 2n, to match the pitch of the waveguide type directional couplers. When the light emitting device of the incident light is formed by using a semiconductor device, for example, in response to a size requirement which is necessary for configuring the semiconductor device, a pitch between the waveguides is required to be wider than the pitch between the waveguides in the waveguide type directional coupler.

The pitch converter 3 changes the pitch to reduce the pitch between the waveguides, thereby satisfying the spatial request as described above, and allowing the incident light to be incident into the waveguide type directional coupler.

Figure 15:
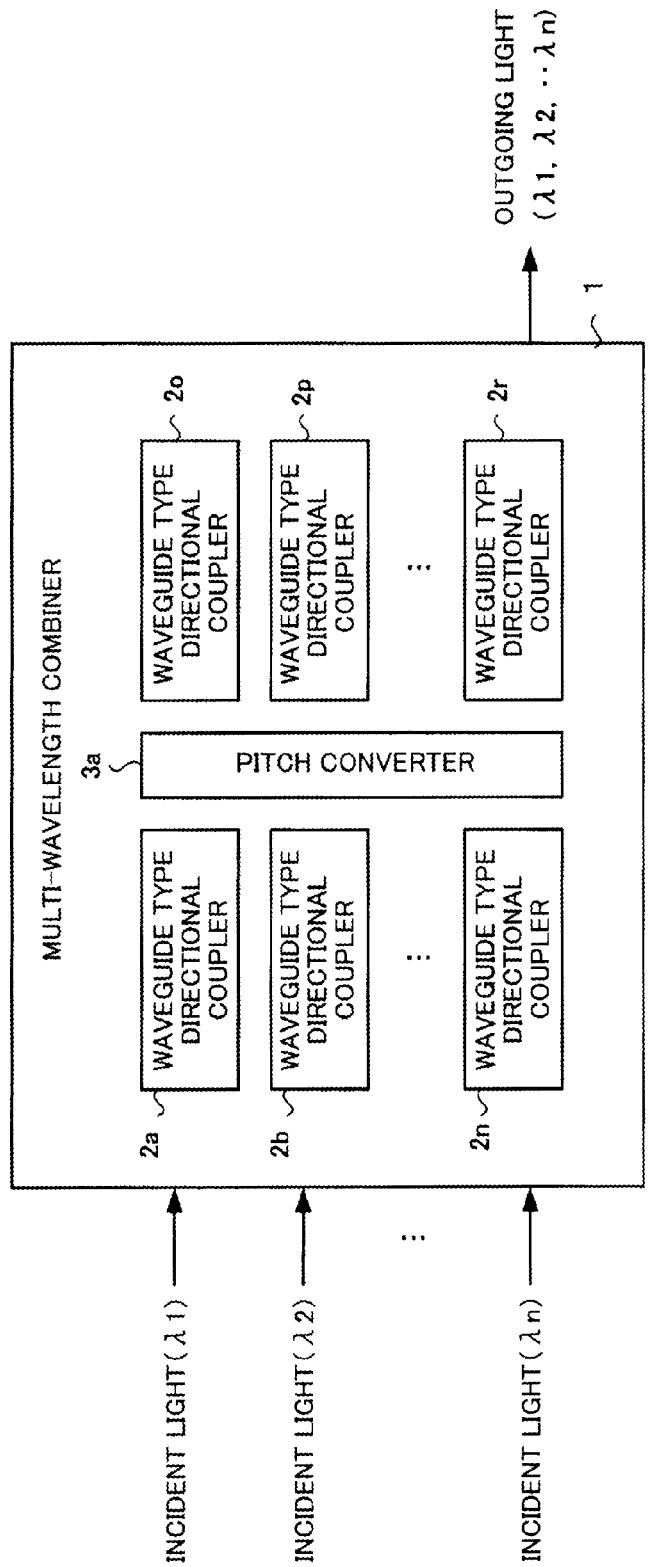
FIG. 15 illustrates a configuration example of the multi-wavelength combiner according to the present invention.

It is to be noted that as shown in FIG. 15, the pitch converter may be inserted behind or between the directional couplers. In the configuration of FIG. 15, the pitch converter 3a is placed between the waveguide type directional couplers 2a to 2c and the waveguide type directional couplers 2o to 2r, and it converts the pitch of the waveguide type directional couplers 2a to 2c on the input side of the pitch converter 3, to the pitch of the waveguide type directional couplers 2o to 2r on the output side of the pitch converter 3.

The light source device 10 according to the present invention has a configuration which forms a light emitting device and a control means, together with the multi-wavelength combiner 1 of the present invention on the same semiconductor substrate. The control means controls the light emitted from the light emitting device, thereby allowing an image projected on a projector to be controlled.

Figure 16:
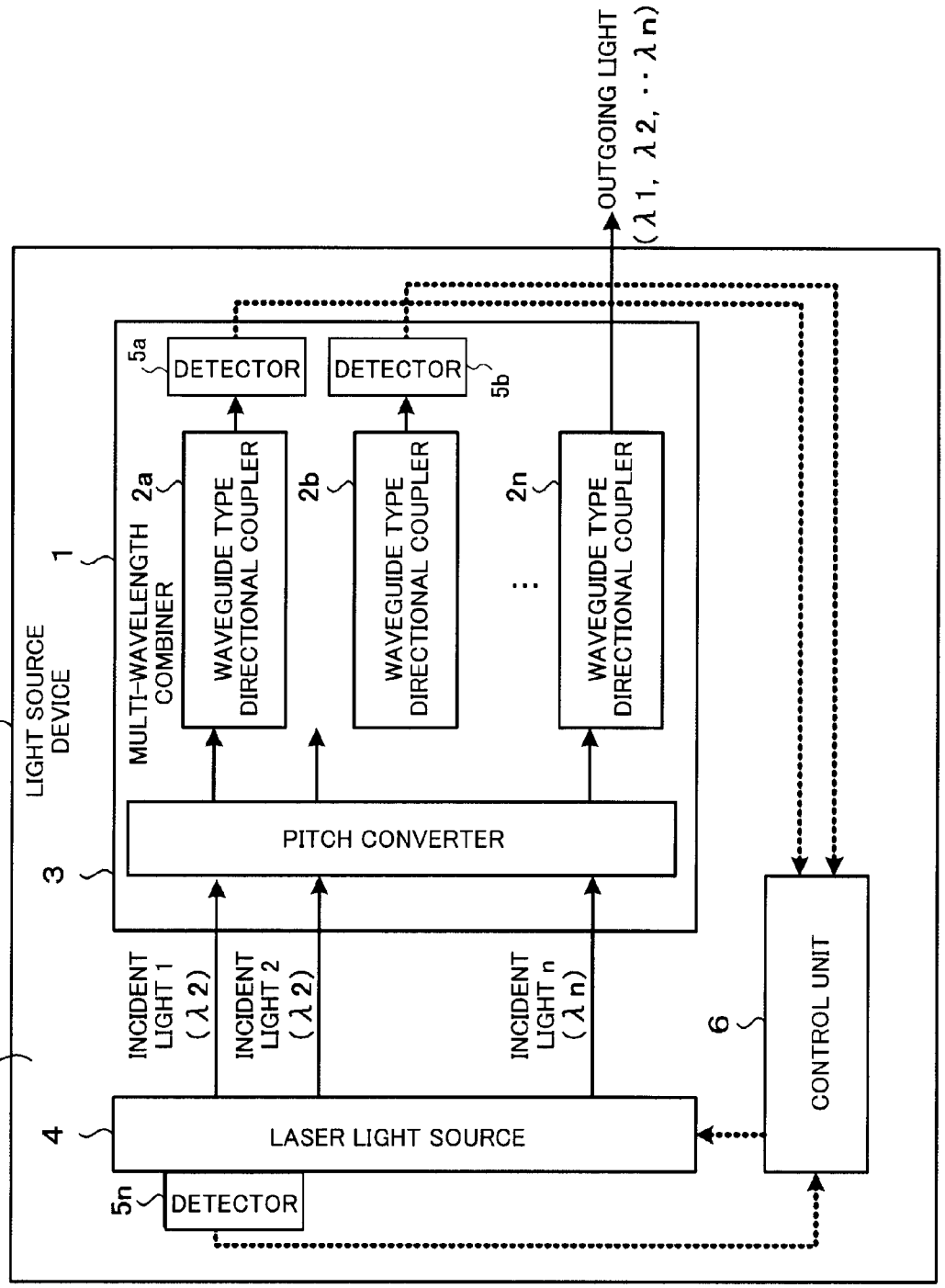
FIG. 16 illustrates a configuration example of the light source device according to the present invention.

In FIG. 16, the light source device 10 has a configuration which forms the multi-wavelength combiner 1 including the waveguide type directional couplers 2a to 2n and the pitch converter 3, a laser device 4, detectors 5a to 5n, and a control unit 6, on one wiring substrate 9.

The laser device 4 generates light elements with respective wavelengths λ1 to λn to form the incident light 1 to the incident light n. The detectors 5a to 5n detect the light elements with the respective wavelengths, so as to control a light emitting amount from the light emitting device. For example, the detector 5a detects a light amount of the light obtained from the waveguides in the waveguide type directional coupler 2a. These waveguides may discharge light that has not been combined in the waveguide type directional coupler 2. The detector detects this discharged light, thereby monitoring the light amount emitted from the laser device 4 which generates the wavelength. The detector 5n provided on the laser device 4 side detects the wavelength that is not detectable in the discharged light from the waveguide type directional coupler 2. The control unit 6 receives a detection signal as a feedback from the detector 5, and controls the emitted light from the laser device 4.

The multi-wavelength combiner and the light source device according to the present invention may be formed as a planar circuit on the semiconductor substrate.

Embodiment

Next, with reference to FIG. 17 to FIG. 64, one embodiment of the multi-wavelength combiner and the light source device according to the present invention will be explained.

Firstly, with reference to FIG. 17 to FIG. 23, one embodiment of the multi-wavelength combiner according to the present invention will be explained. It is to be noted here that the embodiment shown in FIG. 17 and FIG. 18 illustrates configuration examples where the light emitting device and the outgoing end are arranged respectively on two sides opposed to each other, of the semiconductor substrate having a quadrilateral shape; and FIG. 19 to FIG. 23 illustrate configuration examples where the light emitting device and the outgoing end are arranged respectively on two sides orthogonal to each other, of the semiconductor substrate having a quadrilateral shape.

Figure 17:
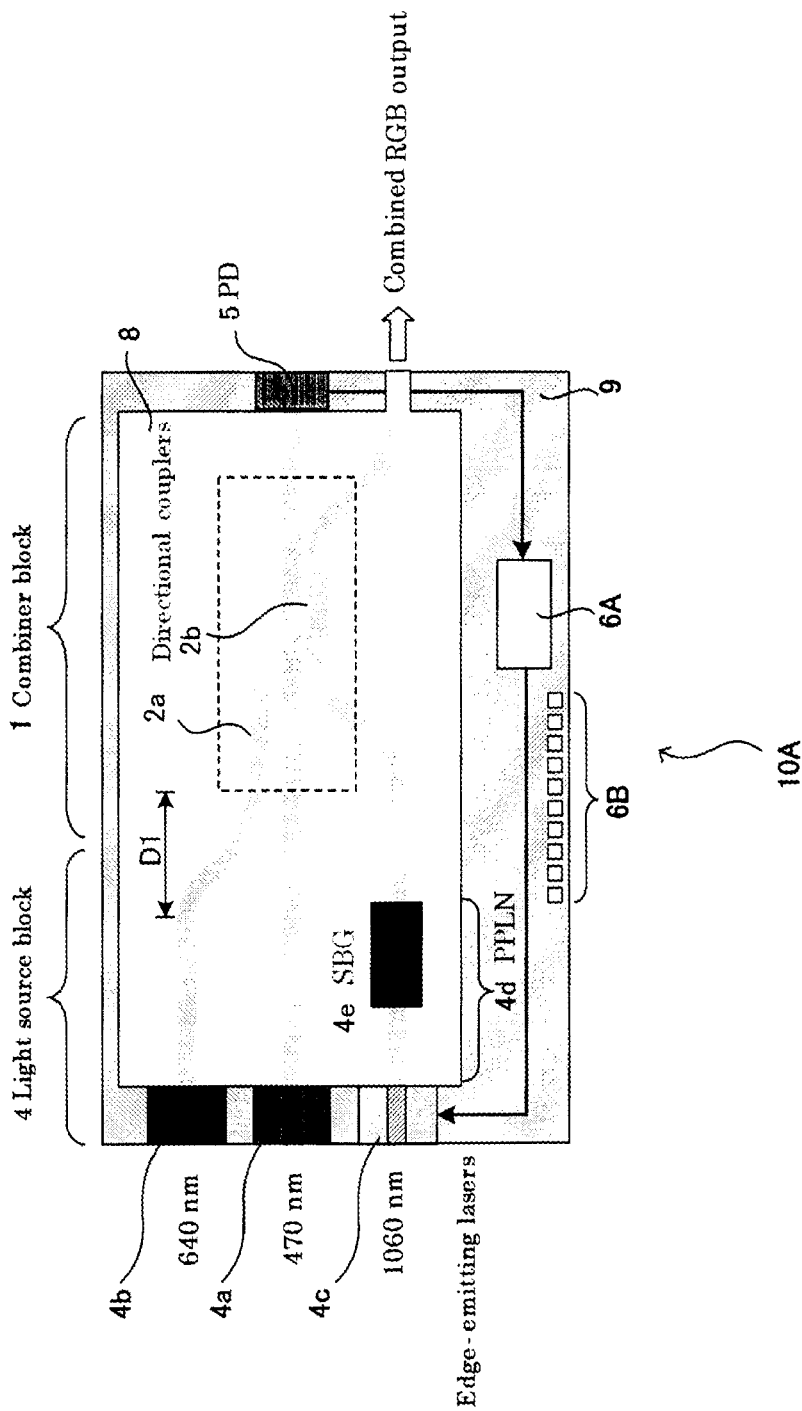
FIG. 17 illustrates one embodiment of the light source device according to the present invention.
Figure 18:
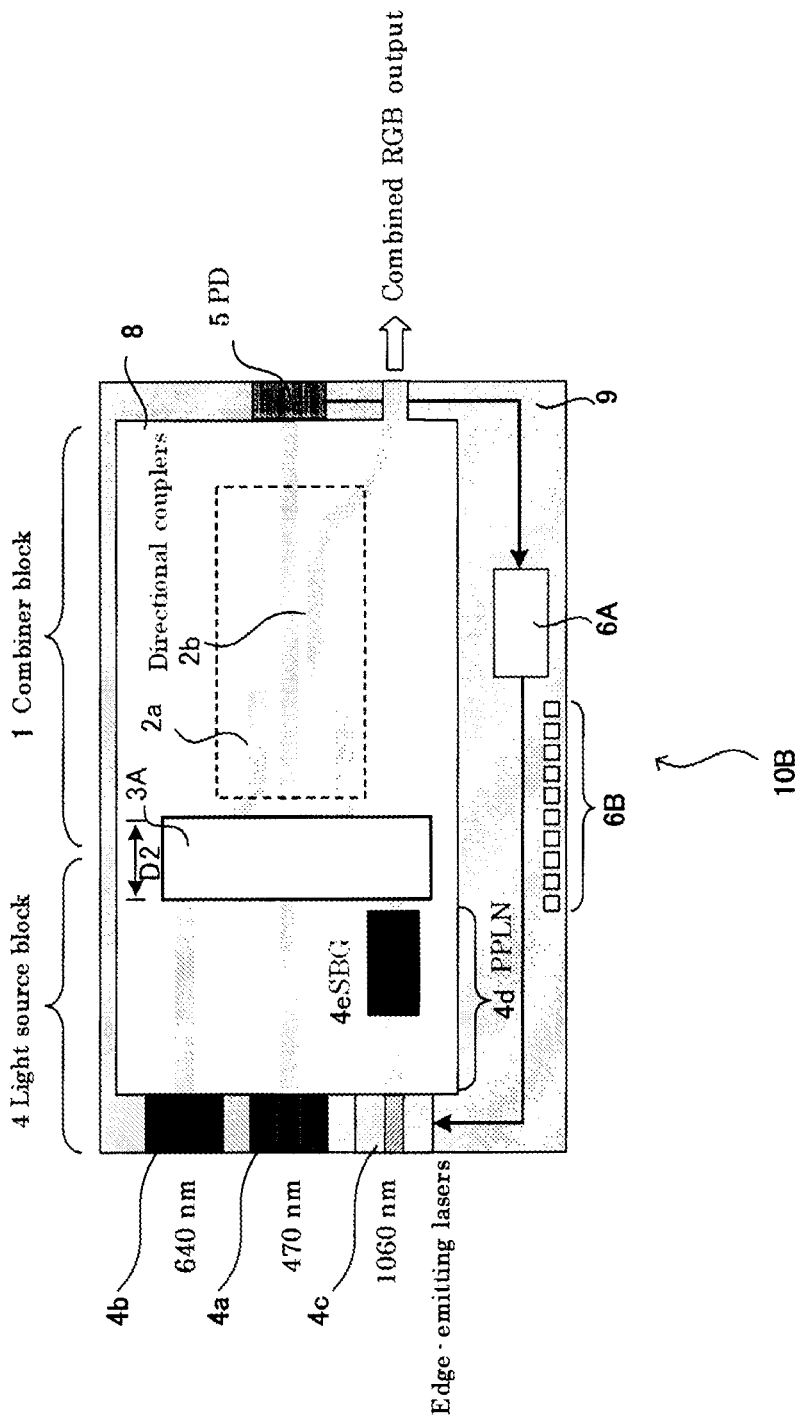
FIG. 18 illustrates another embodiment of the light source device according to the present invention.

In FIG. 17, the light source device 10A forms on the wiring substrate 9, a planar optical circuit by mounting an optical element substrate 8 which forms a block of the waveguides and the multi-wavelength combiner 1, and a block of the laser device 4 (4a to 4c). FIG. 17 illustrates an example of the RGB light source device where multiple wavelengths correspond to R wavelength, G wavelength, and B wavelength.

In a conceptual configuration of the RGB light source device 10A as shown in FIG. 17, the laser device 4 (4a to 4c), the multi-wavelength combiner 1, the control unit 6A, and the electrode terminal 6B are mounted. The multi-wavelength combiner 1 is provided with waveguide type directional couplers 2 and formed on the optical element substrate 8. Here, the optical element substrate 8 and the wiring substrate 9 are formed together by a semiconductor substrate. A silicon substrate may be employed as the semiconductor substrate, for instance.

The block of the laser device 4 is provided with the RGB light emitting devices. In the RGB light emitting devices, for example, InGaN (blue color) semiconductor laser and AlInGaP (red color) semiconductor laser may be employed as the blue light emitting device 4a and the red light emitting device 4b, respectively. On the other hand, a direct-emission green LD may be used as the green light emitting device 4c, but it is difficult to obtain a device suitable for a practical green semiconductor laser. Therefore, an SHG (Second Harmonic Generation) laser is employed as the green light emitting device.

As for the wavelengths of the respective light emitting devices, for example, the wavelength of the blue light emitting device 4a is assumed as 450 to 470 nm, the wavelength of the red light emitting device 4b is assumed as 630 to 650 nm, and the wavelength of near-infrared LD generating a fundamental wave of the green light emitting device 4c is assumed as 1050 to 1070 nm.

In order to stabilize the green light output from the SHG laser, a surface Bragg grating (SBG) 4e is provided for partially reflecting the fundamental wave of the near-infrared LD, and for frequency locking, a nonlinear optical crystal part (PPLN (periodically poled lithium niobate)) 4d is formed on the PPLN waveguide. As the near-infrared LD, Fabry-Perot laser diode, SLD (Super Luminescent Diode), or surface emitting laser diode may be employed. In the case where the near-infrared LD is DBR (Distributed Bragg Reflector) or DFB (Distributed-feedback) type and incorporates a wavelength and a frequency locking mechanism, it is possible to eliminate the surface Blagg grating.

Laser outputs from the laser devices are respectively connected to the input ports of the multi-wavelength combiner 1 for combining RGB via the waveguides used for connection. FIG. 17 illustrates a configuration of the waveguide type directional coupler being designed in such a manner that each of the blue output and the green output is connected to the red waveguide. A part of the green light output is coupled to the PD (photo diode) detector 5 in order to stabilize the output from the near-infrared LD being a pump LD. In the RGB light source device 10A, the waveguides constituting the optical circuit are in a single mode, and it is possible to easily connect the outputted light being combined to the outside, such as a lens, MEMS, and other optical system.

The light source device 10B as shown in FIG. 18 is made up of a planar optical circuit on the wiring substrate 9, by mounting an optical element substrate 8 including a block of the multi-wavelength combiner 1, and a block of the laser device 4, similar to the light source device 10A as shown in FIG. 17.

In a conceptual configuration of the RGB light source device 10B as shown in FIG. 18, the laser device 4 (4a to 4c), the multi-wavelength combiner 1, the control unit 6A, the electrode terminal 6B, and the pitch converter 3A are mounted on the wiring substrate 9. The multi-wavelength combiner 1, the waveguides, and the pitch converter 3A are formed on the optical element substrate 8.

The pitch converter 3A adjusts the pitch of the laser device 4 (4a, 4b, 4c) in the light source device 10B to match the pitch of the directional couplers in the multi-wavelength combiner 1.

In the configuration as shown in FIG. 17, the waveguide is curved in the distance D1, in order to adjust the pitch of the light emitting devices 4a, 4b, and 4c to match the pitch of the waveguide type directional couplers 2 in the multi-wavelength combiner 1. On the other hand, in the configuration as shown in FIG. 18, the pitch converter 3A is used to adjust the pitch of the light emitting devices 4a, 4b, and 4c to match the pitch of the waveguide type directional couplers 2 in the multi-wavelength combiner 1. The pitch converter 3A has the length D2, and this length is shorter, compared to the configuration without the pitch converter.

Figure 19:
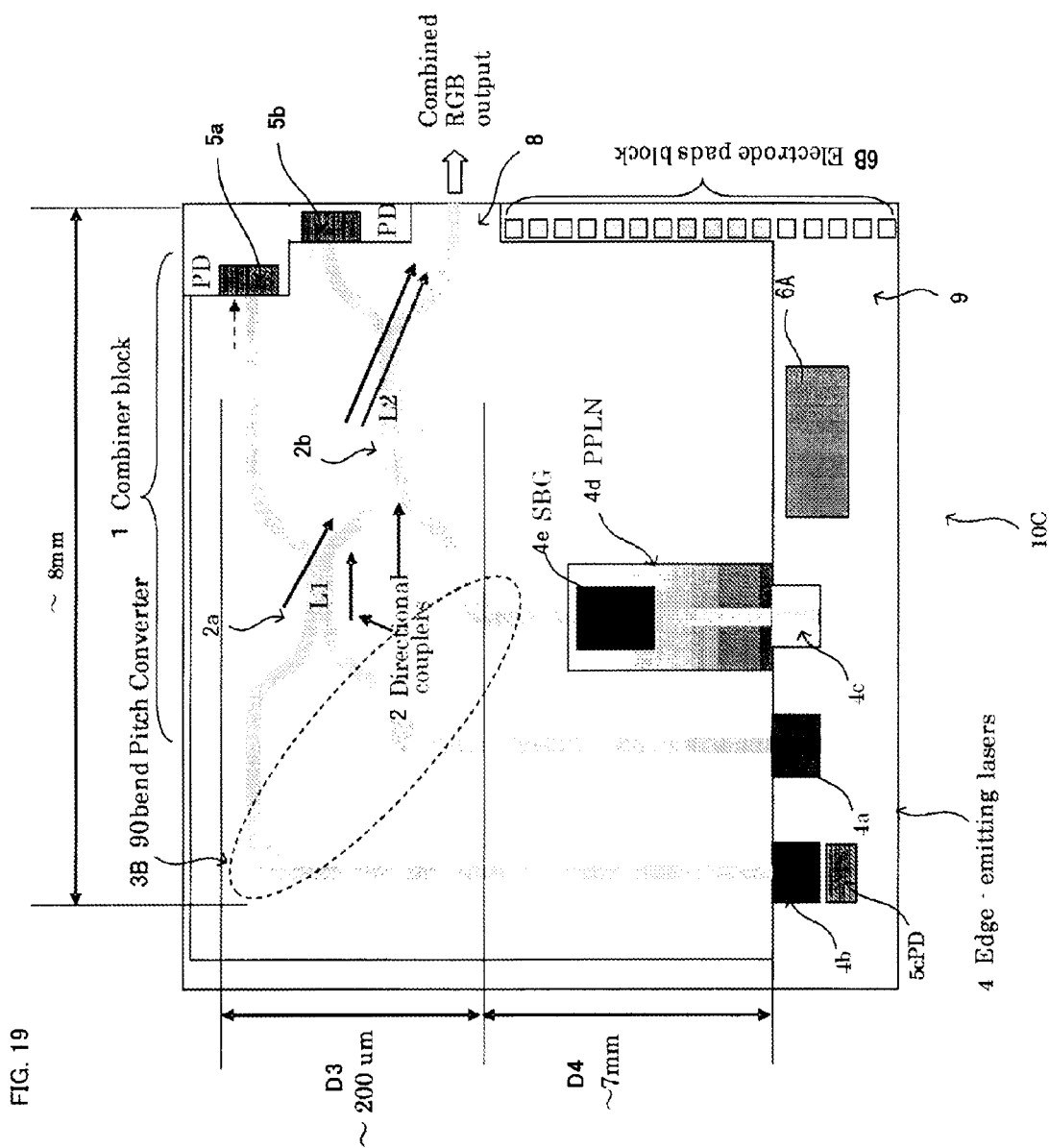
FIG. 19 illustrates another embodiment of the light source device according to the present invention.
Figure 20:
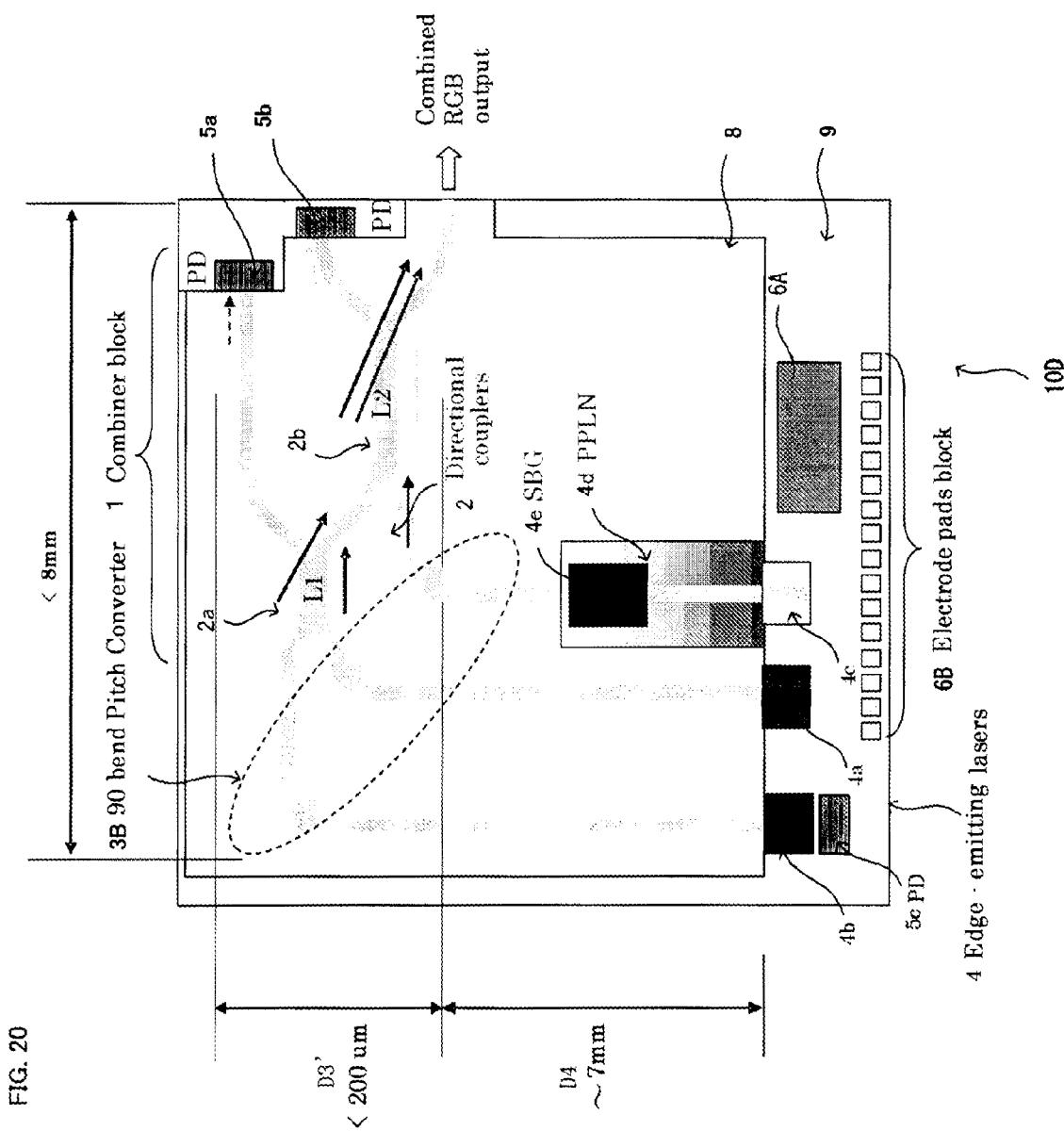
FIG. 20 illustrates another embodiment of the light source device according to the present invention.
Figure 21:
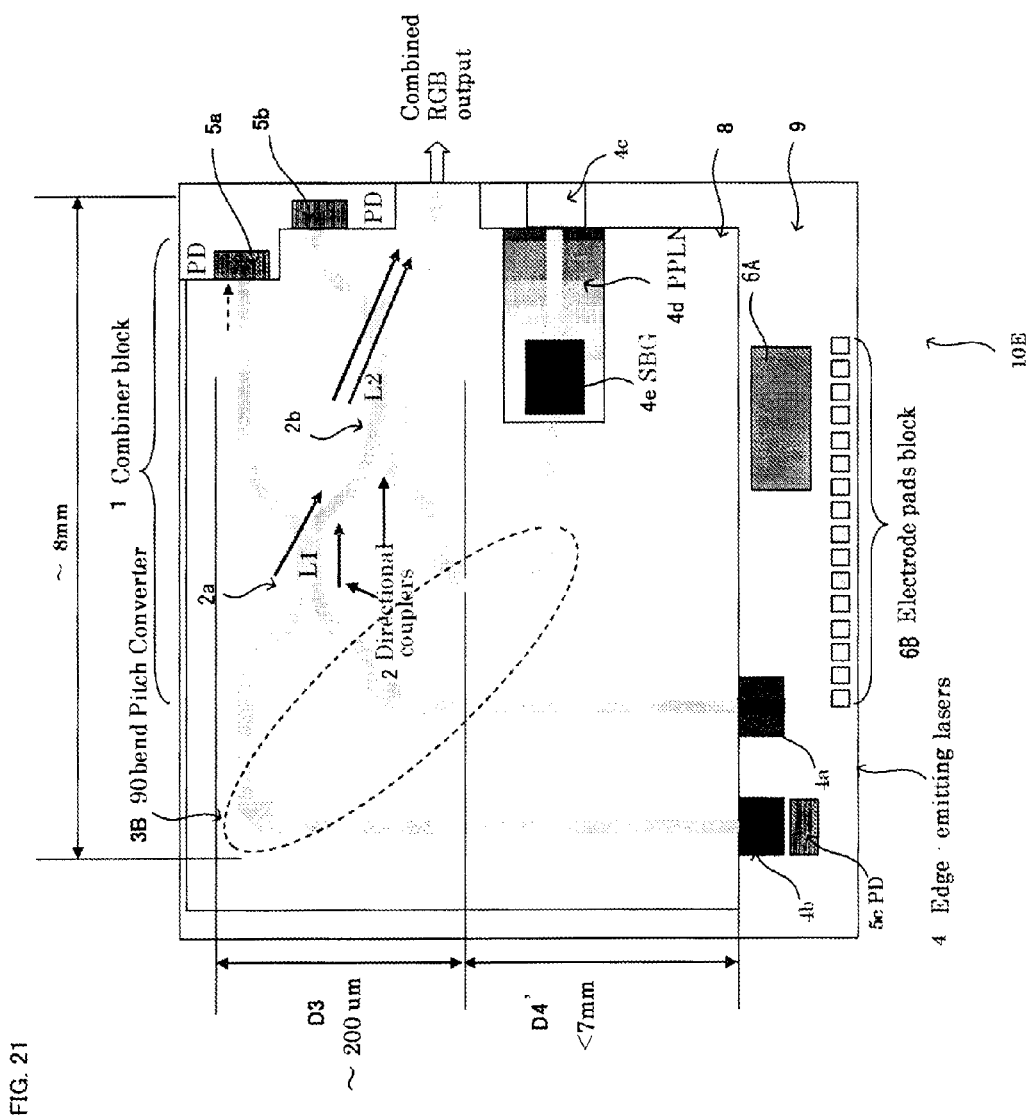
FIG. 21 illustrates another embodiment of the light source device according to the present invention.

Figures from FIG. 19 to FIG. 21 illustrate one specific configuration example of the RGB light source device according to the present invention. In the configuration as shown in FIGS. 19 to 21, a 90 degree pitch converter 3B is provided to establish the arrangement.

In FIG. 19 to FIG. 21, the multi-wavelength combiner 1 has an extremely long shape in reality, but for ease of understanding, FIG. 19 to FIG. 21 shows an example which is partially expanded.

The RGB light source device 10C has a configuration mounting on the wiring substrate 9, laser devices 4 (4a, 4b, and 4c), the 90 degree pitch converter 3B serving as a bend portion, a multi-wavelength combiner 1 including waveguide type directional couplers 2, detectors 5 (5a to 5c), a control unit 6A, and an electrode terminal 6B. The multi-wavelength combiner 1 including the 90 degree pitch converter 3B and the waveguide type directional coupler 2 is formed on the optical element substrate 8.

It is to be noted that as the optical element substrate 8, a metallic substrate or a dielectric substrate may be employed, other than the semiconductor substrate such as the silicon substrate. As the wiring substrate 9, similar to the configuration shown in FIG. 18, an insulator substrate or a conductive substrate may be employed, and as a material of the substrate, metal, silicon, aluminum nitride, $SiO_2$, resin, or the like, may be employed.

In the case where the substrate is made of a material other than the semiconductor substrate, it is possible to configure the substrate by accumulating on the semiconductor substrate such as the silicon substrate serving as a base, a wiring substrate, and an optical element substrate being made of each material.

A distance between each of the waveguides in the multi-wavelength combiner 1 made up of the waveguide type directional couplers 2a and 2b is extremely narrow, compared to the mounting distance between each of the semiconductor lasers of the respective light emitting devices 4a and 4b, and the SHG laser of the light emitting device 4c. In order to adjust the pitch of the waveguides on the light emitting device side to the pitch of the waveguides on the waveguide type directional coupler side, the 90 degree pitch converter 3B serving as a 90 degree bend part is provided between the waveguides for connecting the laser device 4 with each port of the multi-wavelength combiner 1. It is to be noted that the 90 degree pitch converter shown here is a model provided with a resonant area inside, but a simple 90 degree elbow-type waveguide without the resonant area may be employed.

In order to monitor an output of the blue light, the PD (photo diode) detector 5a is connected to the output port on the other side of the waveguide type directional coupler 2a, and in order to monitor an output of the green light, the PD (photo diode) detector 5b is connected to the output port on the other side of the waveguide type directional coupler 2b. In addition, in order to monitor an output of the red light, the PD (photo diode) detector 5c is connected to the red light emitting device 4b.

In the light source device 10C of the configuration example shown in FIG. 19, the width D3 of the 90 degree pitch converter 3B and the multi-wavelength combiner 1 may be around 200 μm, for instance, and the width D4 on the light emitting device may be around 7 mm, for instance. In addition, the length of the light source device 10C (the length in the horizontal direction in FIG. 19) may be around 8 mm, for instance. Further in the configuration example as shown in FIG. 19, the control unit 6A is provided on one side of the wiring substrate 9, and the electrode terminal 6B is mounted on another side which is orthogonal to the aforementioned one side.

The configuration example as shown in FIG. 20 indicates that the pitch of the 90 degree pitch converter 3B as shown in the configuration of FIG. 19 is further reduced. In the light source device 10D of this configuration example, the width D3' of the 90 degree pitch converter 3B and the multi-wavelength combiner 1 may be less than around 200 μm, for instance. With this configuration, the length of the light source device 10D (the length in the horizontal direction in FIG. 20) may be less than around 8 mm, for instance. Further in the configuration example of FIG. 20, the control unit 6A and the electrode terminal 6B are mounted on one side of the wiring substrate.

In the configuration example shown in FIG. 21, the surface Bragg grating SBG 4e and the nonlinear optical crystal part PPLN 4d mounted on the green light emitting device 4c in the configuration shown in FIG. 19 are provided on the side which is orthogonal to the side where the light emitting devices 4a and 4b are placed. With this configuration, it is possible to reduce the space for mounting the SBG 4e and the PPLN 4d. In the light source device 10E of this configuration example, it is possible to set the width D4' on the light emitting device side to be less than around 7 mm.

Next, with reference to FIG. 22 and FIG. 23, an explanation will be made as to an effect produced by the pitch converter in the light source device of the present invention.

Figure 22A:
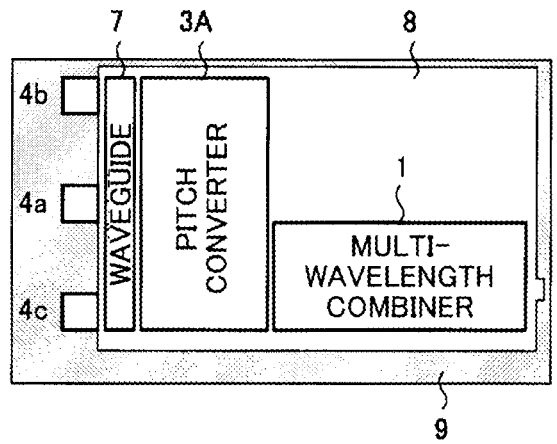
FIG. 22 illustrates an effect of a pitch converter in the light source device according to the present invention.
Figure 22B:
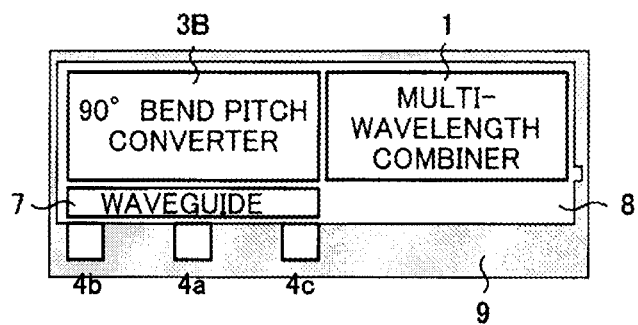
Figure 22C:
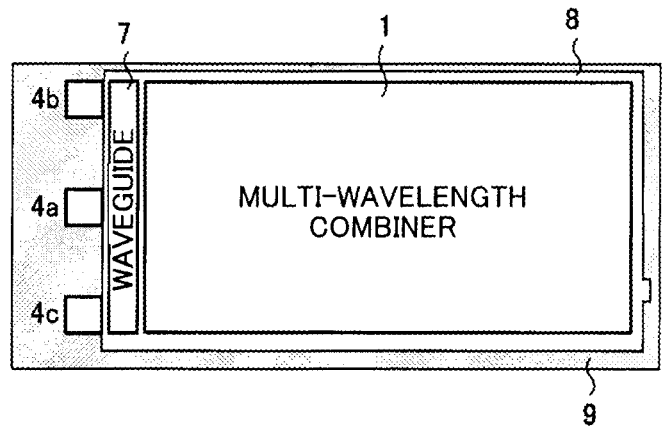

FIG. 22 illustrates an effect of downsizing produced by the pitch converter in the light source device 10A shown in FIG. 17 and the light source device 10B shown in FIG. 18. It is to be noted that FIG. 22C shows a configuration example where the pitch converter is not arranged.

The light source device 10A shown in FIG. 22A is a configuration example where the light emitting devices 4a to 4c are mounted on one side of the wiring substrate 9 having the quadrilateral shape, the outgoing end is arranged on the other side being opposed, and the pitch converter 3A is arranged between the waveguide 7 and the multi-wavelength combiner 1. When the light source device 10A is compared to the configuration shown in FIG. 22C, the pitch converter 3A allows the length of the waveguide part to be reduced, thereby reducing the length of the light source device 10A.

The light source device 10B shown in FIG. 22B is a configuration example where the light emitting devices 4a to 4c are mounted on one side of the wiring substrate 9 having the quadrilateral shape, the outgoing end is arranged on another side being orthogonal, and 90 degree pitch converter 3B is arranged between the waveguide 7 and the multi-wavelength combiner 1. When the light source device 10B is compared to the configuration shown in FIG. 22C, the pitch converter 3B allows the length of the waveguide part to be reduced, thereby reducing the length of the light source device 10A, and further reducing the width of the light source device 10A (the vertical direction in the figure).

Figure 23A:
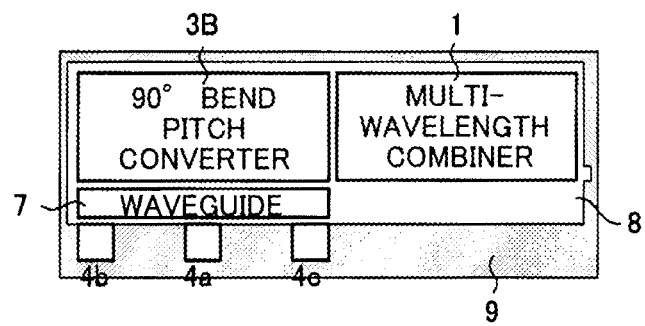
FIG. 23 illustrates an effect of the pitch converter in the light source device according to the present invention.
Figure 23B:
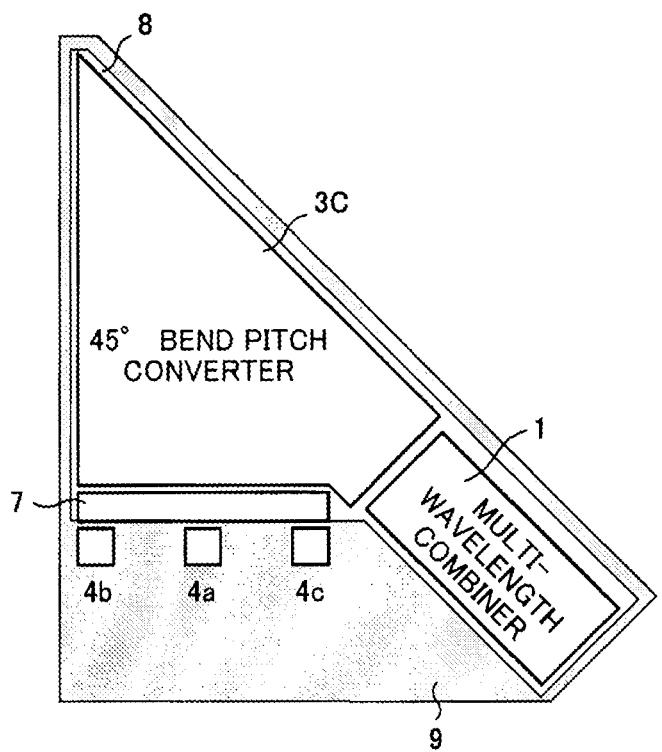

FIG. 23 illustrates an effect of downsizing produced by the 90 degree pitch converter in the light source device 10B shown in FIG. 18, and an explanation will be made as to the significance when the proceeding direction of the light wave is changed by 90 degrees. It is to be noted that FIG. 23B illustrates the case where a 45 degree pitch converter is arranged.

The light source device 10B as shown in FIG. 23A is a configuration example where the light emitting devices 4a to 4c are mounted on one side of the wiring substrate 9 having the quadrilateral shape, the outgoing end is arranged on another side being orthogonal, and the 90 degree pitch converter 3B is arranged between the waveguide 7 and the multi-wavelength combiner 1. On the other hand, the 45 degree pitch converter 3C, as shown in FIG. 23B, changes the proceeding direction of the light wave by 45 degrees.

In the case of the 45 degree pitch converter 3C, the width of the pitch converter itself is increased (the vertical direction in the figure), and in addition, the multi-wavelength combiner 1 is arranged at a lower position in the figure, and therefore, both the length (the horizontal direction in the figure) and the width (the vertical direction in the figure) of the light source device are increased.

On the other hand, the 90 degree pitch converter 3B reduces the length of the waveguide part and further reduces the length of the light source device 10A, and also allowing the width of the light source device 10A (the vertical direction in the figure) to be reduced.

Though not illustrated, in the configuration where the pitch convert has an obtuse angle being over 90 degrees, the width of the pitch converter itself is increased (the vertical direction in the figure), and the multi-wavelength combiner 1 is arranged in upper position in the figure. Therefore, both the length (the horizontal direction in the figure) and the width (the vertical direction in the figure) are increased.

Therefore, it is possible to efficiently downsize the light source device, by setting the 90 degree pitch converter.

Next, an explanation will be made as to a result of study which is conducted according to APSS 2.3 g (Apollo Software) being integrated software for designing an optical waveguide.

Firstly, modal analysis of the waveguide is carried out. In practice, the wavelengths respectively for RGB are required to be designed along with the wavelengths of the semiconductor laser or the SHG laser being employed. However, it is assumed here that the wavelength range covers 450 to 650 nm of a visible light region from blue to red.

Figure 24:
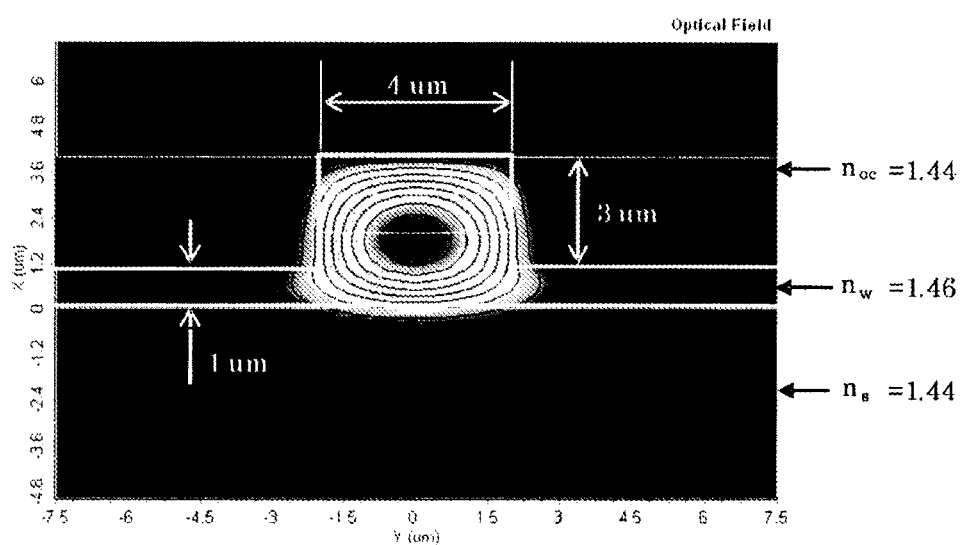
FIG. 24 illustrates a waveguide parameter and a light intensity distribution of a y-polarized fundamental mode of the waveguide according to the present invention.

FIG. 24 illustrates waveguide parameters and a light intensity distribution of a y-polarized fundamental mode at 460 nm, on a cross sectional view of the waveguide. Here, since the y-polarized light ($E^y$ mode) is polarized light outputted from the semiconductor laser, analysis is conducted as to the $E^y$ mode. The waveguide shown in FIG. 24 is a ridge-type waveguide, a dielectric substrate made of quartz is employed as the optical element substrate, and a ridge part (refraction index $n_w$=1.46) where a projection of 3 μm in thickness and 4 μm in width being provided on a planar portion having thickness of 1 μm, is formed on the dielectric substrate (refraction index $n_s$=1.46). The refraction index of the over-clad layer is assumed as $n_{oc}$=1.44.

Figure 25:
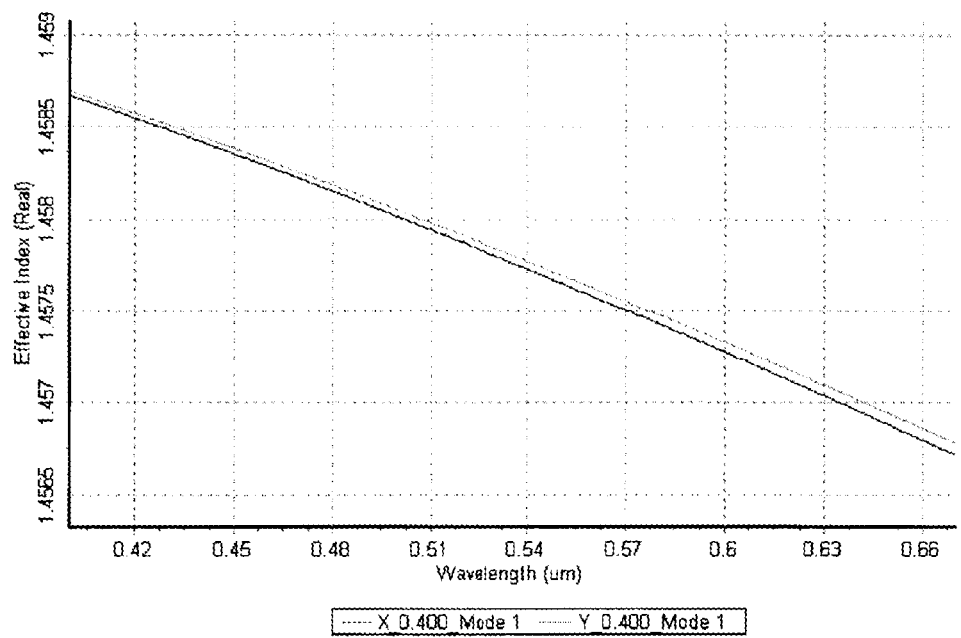
FIG. 25 illustrates a characteristic of effective refractive index of the waveguide according to the present invention.

Further, in a basic structure of the waveguide according to the present invention, it is confirmable that polarized dependence is small as indicated by the effective refractive index characteristics shown in FIG. 25. In view of this, since the laser light that is coupled to the waveguide is $E^y$ wave, only the y-polarized light is used for conducting the analysis in the following.

Figure 26:
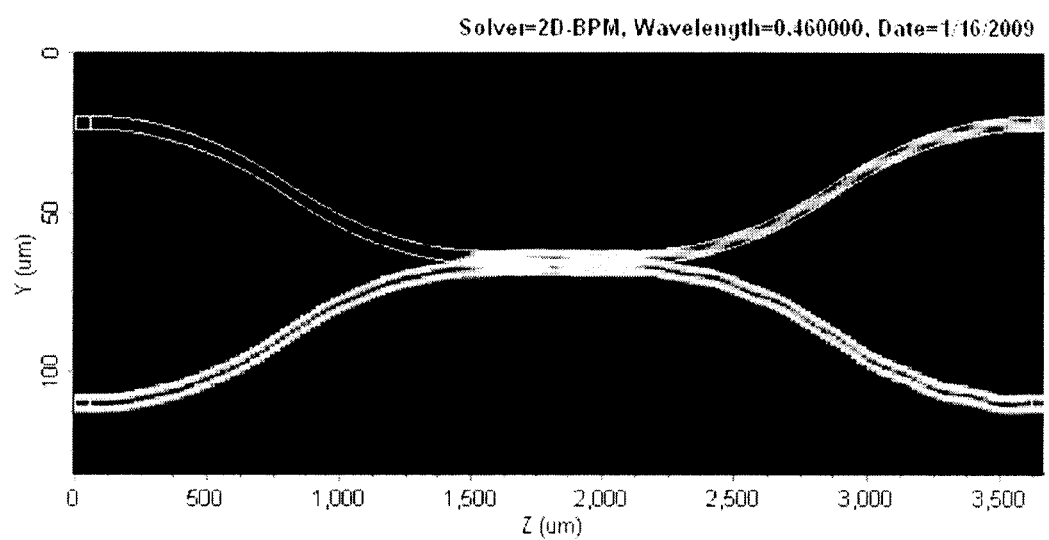
FIG. 26 illustrates one example of a shape of the waveguide type directional coupler according to the present invention.

Next, a directional coupler is constructed by using the basic structure of the waveguide according to the present invention, and a loss calculation is performed for the coupling from the port 1 to the port 3, as a function of a joint length (coupled section length). FIG. 26 shows one example of a shape of the waveguide type directional coupler which is used for the analysis.

Figure 27:
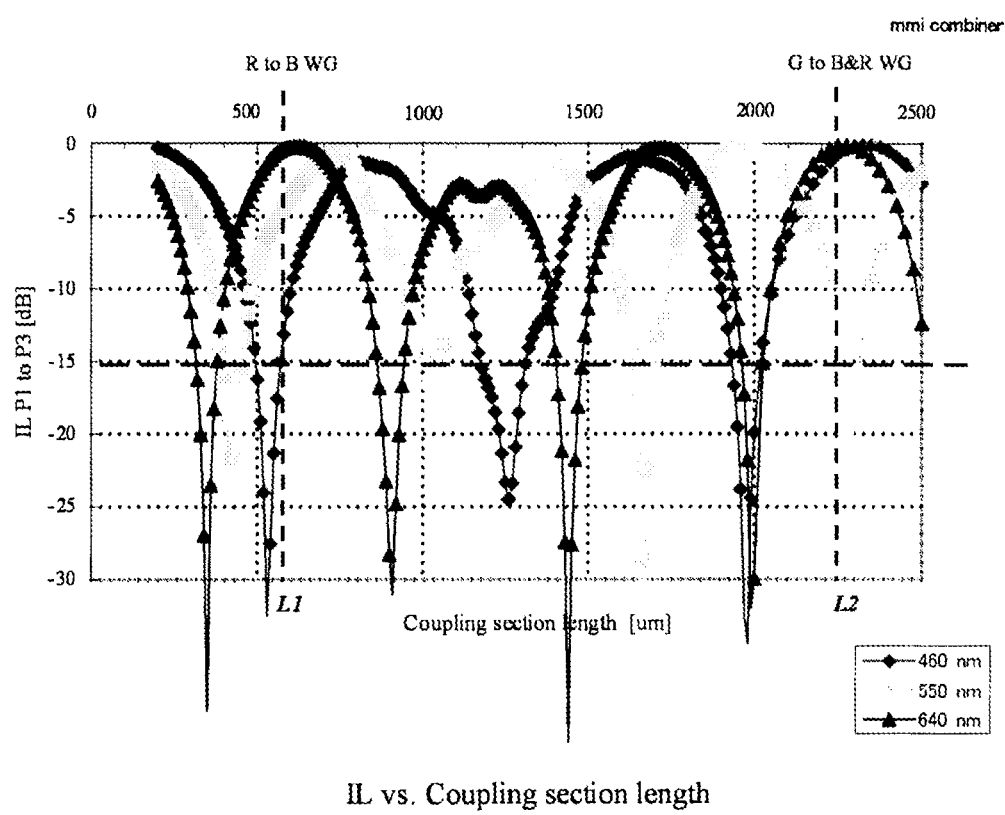
FIG. 27 illustrates an insertion loss of the waveguide type directional coupler according to the present invention.

FIG. 27 illustrates plotting obtained from the function of the insertion loss (IL) from the port 1 to the port 3, assuming the wavelength as a parameter, along with the change of the coupling section length of the waveguide type directional coupler having the shape shown in FIG. 26.

The analysis is conducted according to the beam propagation method. In the foregoing descriptions, an explanation was made taking as an example, the directional coupler using the inter-mode interference between two waveguides adjacent to each other. In practice, however, it is necessary to form a distance between the two waveguides in submicron order as well as suppressing a distance error, in order to generate sufficient mode coupling. As thus described, since the distance between the waveguides is very small, it is anticipated that fluctuations generated in the process for forming the waveguide may have a large influence on characteristic features. Consequently, in the simulation here, the study is conducted using the waveguide type directional coupler of a combined waveguide type (multimode interference type) which combines two waveguides, not a separation type.

According to the result of the simulation as shown in FIG. 27, it is found that the R wavelength (640 nm) and the B wavelength (460 nm) can be coupled near the coupling section length Lc=L1 (570 μm). It is further found that the R wavelength and the B wavelength are combined with the G wavelength at the coupling section length Lc=L2 (2270 μm). Therefore, in the configuration of the RBG light source device as shown in FIG. 19, viewed from the light emitting device side, the coupling section length of the first-stage waveguide type directional coupler is assumed as L1, and the coupling section length of the second-stage waveguide type directional coupler is assumed as L2, thereby combining the light waves with the R wavelength, G wavelength, and B wavelength emitted from the light emitting devices being different semiconductor lasers.

Next, another configuration example will be explained as to a material and a structure of the waveguide.

Figure 28:
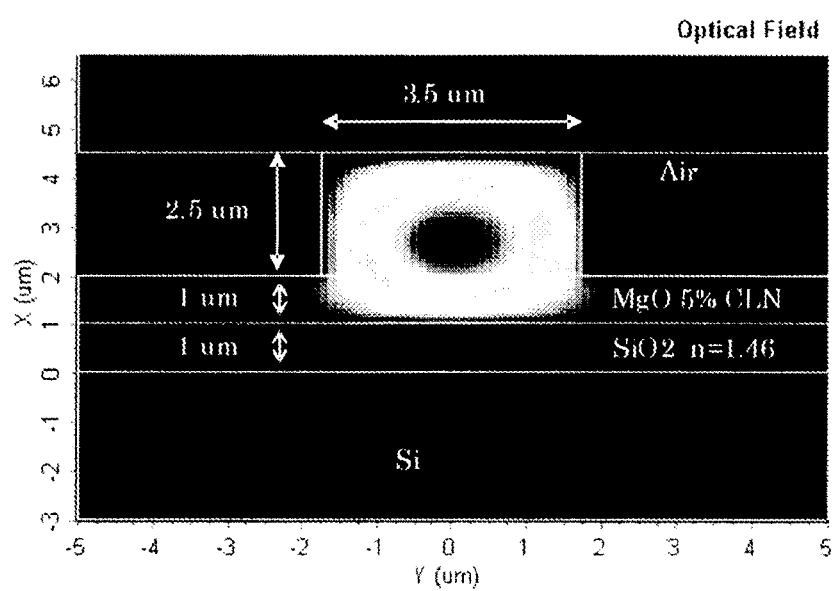
FIG. 28 illustrates a waveguide parameter and a light intensity distribution of a y-polarized fundamental mode of the waveguide in another configuration according to the present invention.

FIG. 28 is an illustration for explaining a schematic structure of the waveguide, and similar to FIG. 24, FIG. 28 illustrates waveguide parameters and a light intensity distribution of a y-polarized fundamental mode, on a cross sectional view of the waveguide. In this example, 5 mol % MgO doped congruent lithium niobate (Congruent LN) is employed as the waveguide.

The waveguide shown in FIG. 28 is a ridge type waveguide, and a ridge part where a projection of 2.5 µm in thickness and 3.5 µm in width is formed on a planar portion of 1 µm in thickness using the 5 mol % MgO doped Congruent LN, which is placed on the $SiO_2$ clad layer having the refraction index n=1.46 and having thickness of 1 µm, which is further placed on the semiconductor substrate such as Si substrate.

Figure 29:
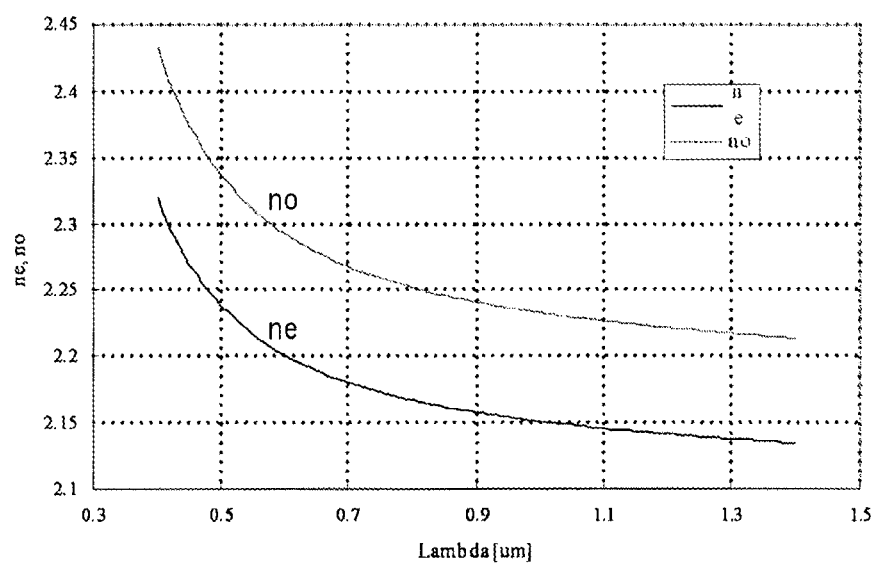
FIG. 29 illustrates a wavelength dispersion characteristic of the waveguide.
Figure 30:
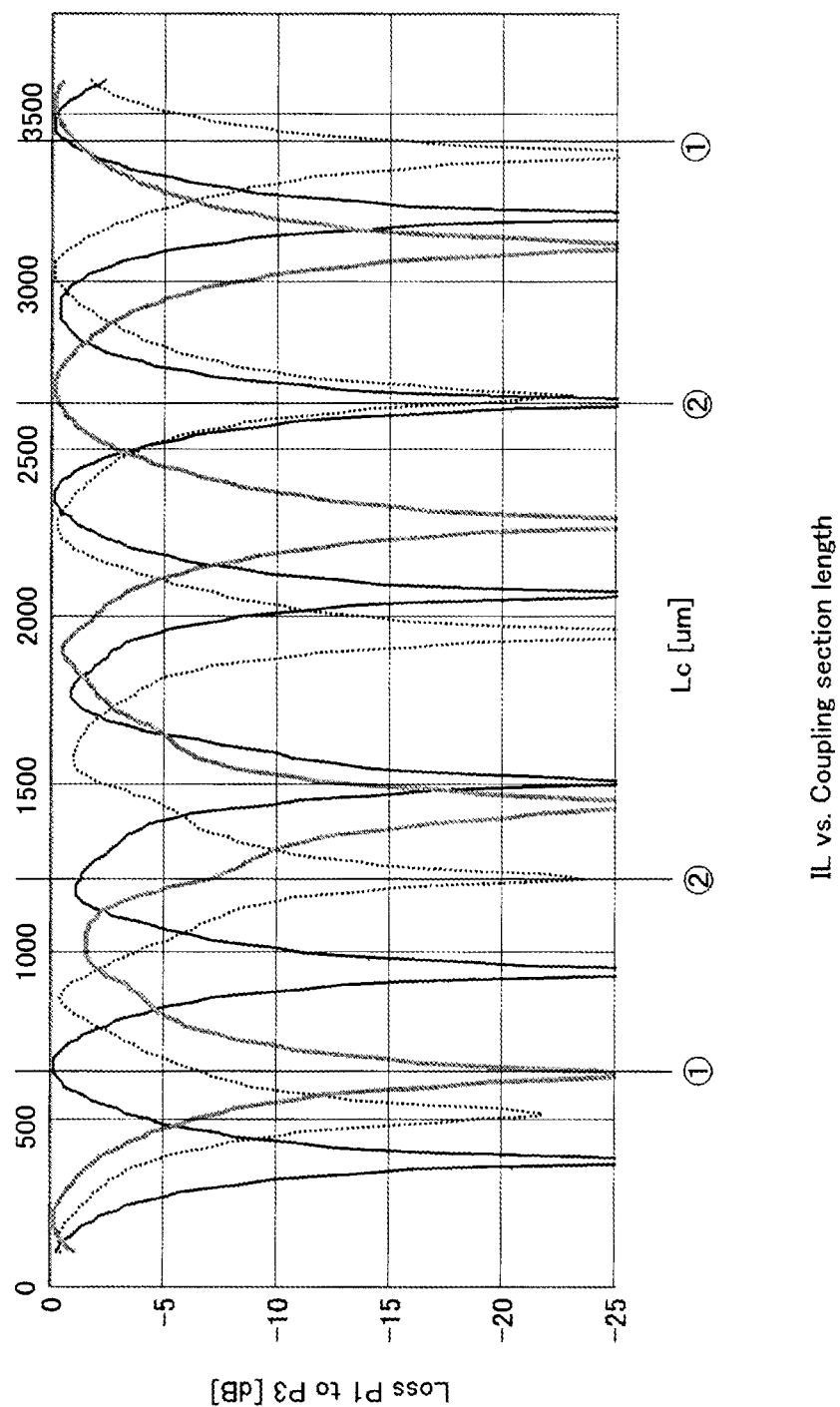
FIG. 30 illustrates a coupling section length of the waveguides, which is necessary for combining waves.

FIG. 29 illustrates material wavelength dispersion characteristics of the MgO doped CLN which is a waveguide material and FIG. 30 shows a graph of the coupling section lengths necessary for combining waves. In this configuration example, it is possible to combine light waves with multiple wavelengths, according to more than one combination of coupling section lengths, obtained by the selection from multiple coupling section lengths.

In the first example, for instance, the light waves with the R wavelength (650 nm) and the B wavelength (460 nm) are combined by the first-stage waveguide type directional coupler having the coupling section length Lc being 650 µm, and the combined light waves with the R wavelength and the B wavelength are combined with the light wave with the G wavelength (523 nm) by the second-stage waveguide type directional coupler having the coupling section length Lc being 3410 µm. FIG. 30 indicates the combination of the coupling section lengths by encircled number 1.

Further, in the second example, the first-stage waveguide type directional coupler having the coupling section length Lc being 1210 µm, combines the light wave with the R wavelength (650 nm) and the light wave with the G wavelength (523 nm), and the second-stage waveguide type directional coupler having the coupling section length Lc, being 2660 µm, combines the combined light waves with the R wavelength and the G wavelength with the light wave with the B wavelength (460 nm). FIG. 30 indicates the combination of the coupling section lengths by encircled number 2.

[90 Degree Bend Pitch Converter]

Next, with reference to FIG. 31 to FIG. 40, the 90 degree bend pitch converter provided in the multi-wavelength combiner of the present invention will be explained. In the description below, an explanation will be made using an anisotropic material as an example, so as to enable the anisotropic material to be handled, but if it is an isotropic material being $SiO_2$ base or an organic material, such material can be similarly handled assuming that $n_e = n_o$.

Figure 31:
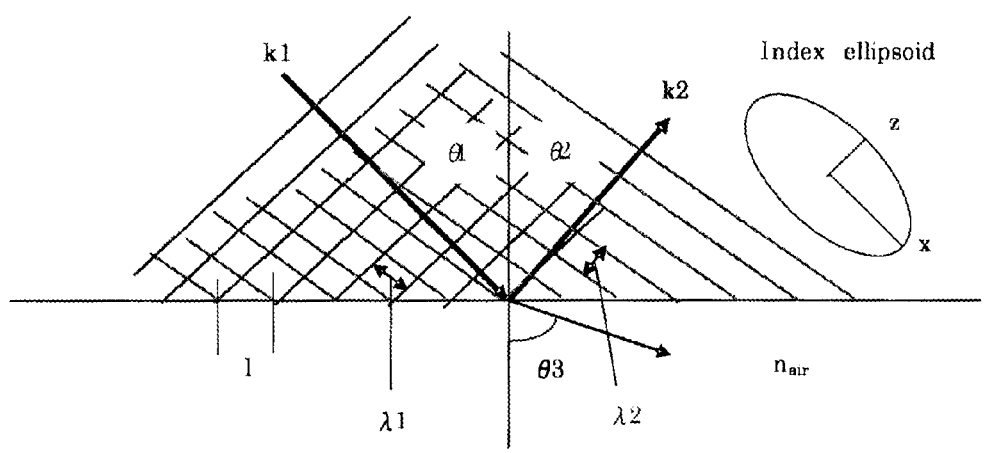
FIG. 31 is a schematic view of the TIR mirror using an anisotropic medium according the present invention.

FIG. 31 is a schematic view of a TIR mirror using an anisotropic medium. It is assumed that the outside of the TIR mirror is air ($n_{air}=1$). In the case where a light wave is incident from a high refractive index medium to a low refractive index medium (air in this case), when $n_o \cdot \sin \theta_1$ becomes larger than 1, indicating the angle becomes equal to or larger than a critical angle according to the Snell's law, the transmitted light is not allowed to propagate into the space of the air side, thereby causing total internal reflection. In addition, typically, in the isotropic material, the incident angle $\theta_1$ becomes equal to the output angle $\theta_2$. On the other hand, it is necessary that in the anisotropic medium, the wave front normal vector k1 of the incident light and the wave front normal vector of the outgoing wave satisfy the boundary condition on the boundary surface, according to the relationship with a direction of the index ellipsoid of the medium through which propagation is performed. Therefore, the incident angle $\theta_1$ is not necessarily equal to the output angle $\theta_2$.

It is to be noted that in FIG. 31, for ease of explanation, the wave fronts at the interface indicating the phase between the incident light and the reflection light are represented on the same position. However, in practice, in the state of total internal reflection caused by the angle equal to or larger than the critical angle, there occur phase jumps in the incident light and the reflection light depending on the refraction index of the medium or the incident angle, thereby generating wavefront aberration corresponding to the phase jumps on the wavefront at the interface. Furthermore, evanescent wave arises in proximity to the interface, and there occurs shifting of the incident light wave and the reflection light wave, referred to as "Goos-Hänchen shift". However, those are not illustrated here.

For ease reference here, the anisotropic medium is assumed as a negative uniaxial crystal, $n_o > n_e$, the relationship between the wavelength λ1 and the wavelength λ2 is expressed as the following:

$$\lambda_1 : \lambda_2 = \frac{c}{n_1} : \frac{c}{n_2} \tag{8}$$

Here, the wavelength λ1 and the wavelength λ2 respectively represent the wavelength on the incident side and the wavelength on the output side, c represents a speed of light, the refraction index $n_1$ and the refraction index $n_2$ respectively represent the refraction index upon an incident time, and the refraction index upon an output time. In addition, in order to satisfy the boundary condition to coincide with a tangential component of an electric field vector, it is necessary that the following relationship is established among the incident angle $\theta_1$, the output angle $\theta_2$, the wavelength λ1 and the wavelength λ2:

$$l \sin \theta_1 = \lambda_1$$

$$l \sin \theta_2 = \lambda_2 \tag{9}$$

Here, l represents the length of a projective component to the boundary surface.

The relational expression (10) for the total internal reflection light is derived from the formula (8) and the formula (9):

$$n_1 \sin \theta_1 = n_2 \sin \theta_2 \tag{10}$$

Though the definition of the angle is different, the expression (10) is the same as the formula of the Snell's law.

Figure 32:
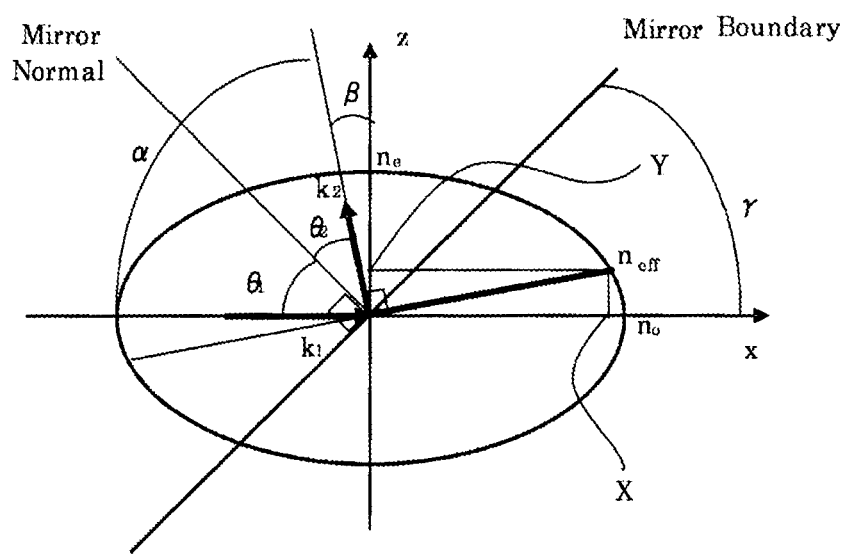
FIG. 32 illustrates a parameter relationship of the TIR mirror using the anisotropic medium according the present invention.

Next, assuming an actual crystal orientation, discussions will be made as the following. C-axis of the crystal (here, it is assumed as lithium niobate LN) forming the TIR mirror is set to be parallel with the z direction. Setting the angle of the reflection mirror measured from the x-axis as π/4 (45 degrees), the wave front normal vector of the incident light is assumed to have a propagating direction along the x-axis. In addition, the incident plane is rendered to be parallel to the x-z plane. On this occasion, the index ellipsoid of the crystal is cut along the incident plane x-z plane, and using the principal axis of the index ellipsoid as a reference, FIG. 32 shows relationships among each of the parameters. Here, the incident polarized light is assumed as s-polarized light (y-polarized light).

According to the definition of the index ellipsoid as shown in FIG. 32, following formula is established:

$$\frac{X^2}{n_o^2} + \frac{Y^2}{n_e^2} = 1 \tag{11}$$

Following formulas are also established:

$X = n_{eff} \cos\beta$ $Y = n_{eff} \sin\beta$ (12)

The formula (11) and the formula (12) are organized by using the relationship $\beta = \pi/4 - \theta_2$ and $\theta_1 = \pi/4$, and those formulas are simplified as the formulas (13) and (14).

$$n_e^2 \cos^2\beta + n_o^2 \sin^2\beta - \frac{n_o^2 \sin^2\theta_2}{\sin^2\theta_1} = 0, \quad (13)$$

$$n_e^2 + n_o^2 - \sin 2\theta_2(n_o^2 - n_e^2) - 4n_o^2 \sin^2\theta_2 = 0 \quad (14)$$

Assuming that $f(\theta_2)$=the left-hand side of Formula (14), when the wavelength in vacuum is 632.8 nm, $n_e$=2.200 and $n_o$=2.286 of the LN substrate are substituted and the relationship of $(f-\theta_2)$ is plotted. Then, FIG. 33 is obtained.

Figure 33:
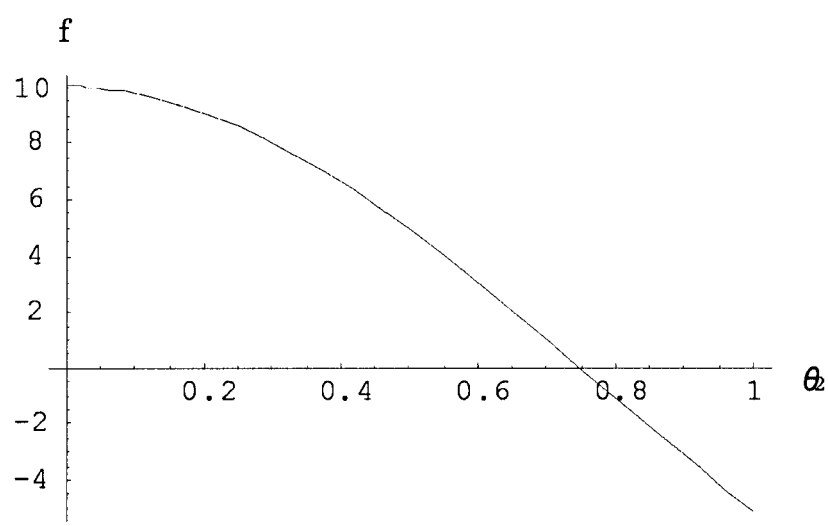
FIG. 33 illustrates calculation of output angle $\theta_2$.

According to FIG. 33, it is found that there is a solution, and the solution in proximity to 45 degrees in the formula (13) corresponds to $\theta_2$=0.7485 [rad] (42.886 [deg]).

When it is compared with 45 degree reflection by the isotonic medium, it is found that the reflection angle becomes smaller by approximately 2 degrees.

Next, discussions will be made as to the wavelength dependency of the reflection angle.

Figure 34:
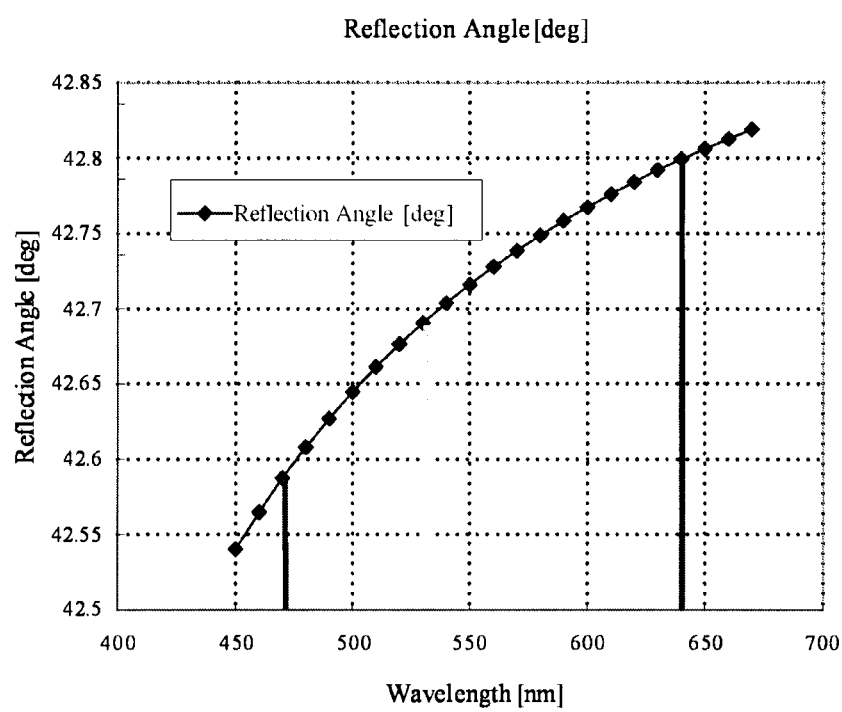
FIG. 34 illustrates a reflection angle in each of the RGB wavelengths.

When a calculation is carried out by using the reflection coefficients $n_e$ and $n_o$ of the 5 mol % MgO doped congruent LN, reflection angles for each of the RGB wavelengths are shown in FIG. 34.

As a result of this operation, the reflection angle is 42.59 degrees for the B wavelength (470 nm), 42.69 degrees for the G wavelength (530 nm), and 42.80 degrees for the R wavelength (640 nm).

Next, an explanation will be made as to adjustment of the reflection mirror. As a result of the operation, in the wavelength of 470 nm, for instance, the reflection angle $\theta_2$ becomes approximately 42.6 degrees. Therefore, the angle $\alpha$ made by the incident wave and the reflection wave is equal to 45+42.6=87.6 degrees, and it is smaller than 90 degrees. In order to form the 90 degree bend, it is necessary to adjust the angle of the reflection mirror.

When the formula (13) is organized assuming that $\theta_1 + \theta_2 = \pi/2$, the formula (15) is obtained.

$$n_e^2 + n_o^2 - \sin 2\theta_2(n_o^2 - n_e^2) - 2n_o^2 \tan^2\theta_2 = 0 \quad (15)$$

Figure 35:
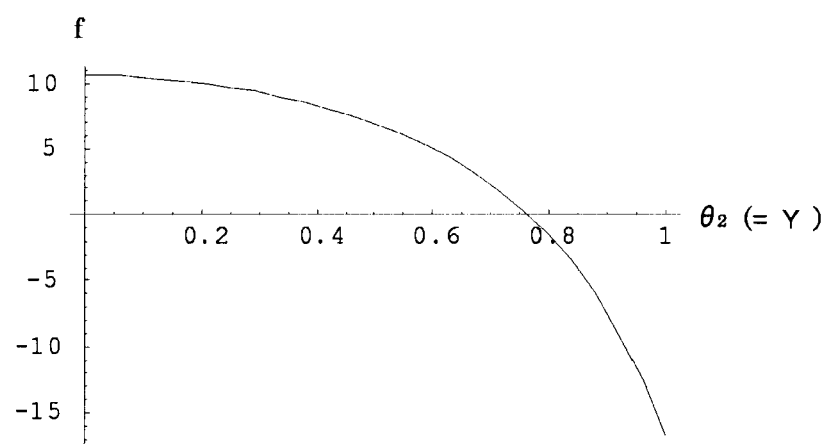
FIG. 35 illustrates calculation of output angle $\theta_2$.

By way of example, assuming $f(\theta_2)$=the left-hand side of Formula (14), when the wavelength in vacuum is 470 nm, $n_e$=2.255419 and $n_o$=2.356908 of the LN: MgO substrate, are substituted and the relationship of $(f-\theta_2)$ is plotted, and then FIG. 35 is obtained. According to FIG. 35, it is found that there is a solution. The solution in proximity to 45 degrees of the formula (13) corresponds to $\theta_2$=0.7634 [rad] (43.740 [deg]).

According to the relationship as shown in FIG. 32 and the condition of $\theta_1 + \theta_2 = \pi/2$, the mirror angle $\gamma$ measured from the x-axis becomes equal to $\theta_2$.

Figure 36:
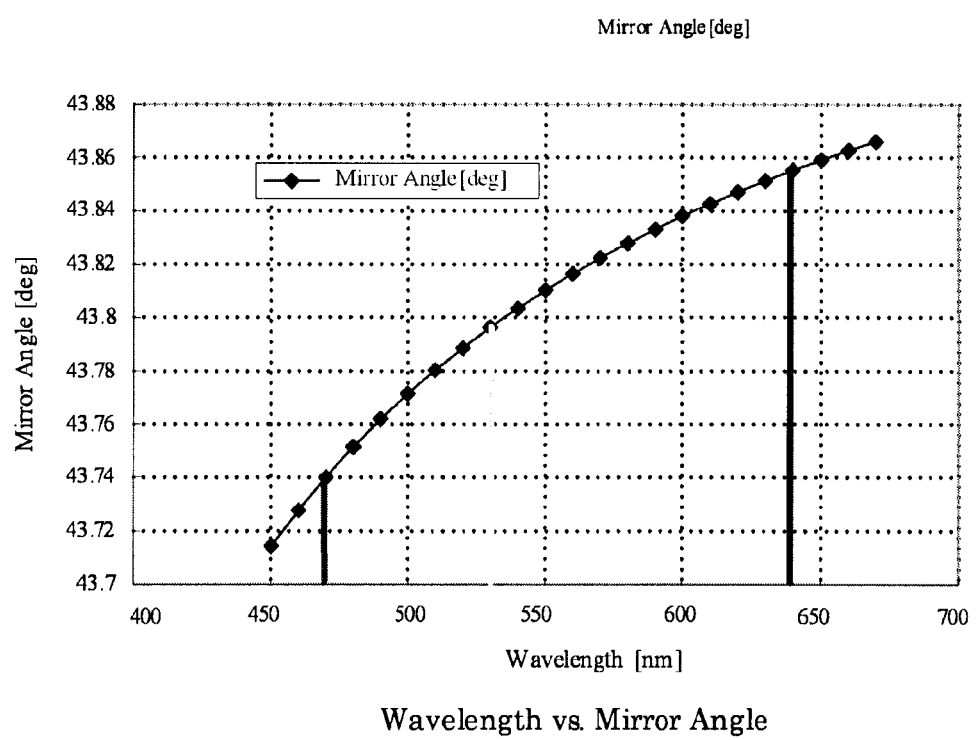
FIG. 36 illustrates a reflection angle in each of the RGB wavelengths.

Next, FIG. 36 shows the relationship between the wavelength and the mirror angle, calculated by using the formula (15). According to the operation, the following results are obtained; the mirror angle $\gamma$ becomes 43.74 degrees for the B wavelength (470 nm), it becomes 43.80 degrees for the G wavelength (530 nm), and it becomes 43.86 degrees for the R wavelength (640 nm).

Therefore, it is found that when the incident wave can be approximated by a plane wave, setting the mirror angle as described above enables the 90 degree bend.

FIG. 37 illustrates a structure of the 90 degree bend waveguide and an example of analysis according to the FDTD method. By forming the TIR mirror on the ridge-type waveguide, it is possible to bend the outgoing light from the semiconductor laser by 90 degrees with little loss. The use of the 90 degree bend waveguide as thus described allows construction of the 90 degree bend pitch converter as shown in FIG. 19.

According to the size of each of the semiconductor lasers and the PPLN, a mounting pitch of the LD portion may be a size of from a few hundred μm to a few mm. On the other hand, as shown in FIG. 26, the width of the waveguide type directional coupler may be formed to be equal to 200 μm or less.

As thus described, since the mounting pitch of the LD part is larger than the width of the waveguide type directional coupler, it becomes necessary to adjust the pitch. In the case where the pitch is adjusted according to a linear pitch conversion, a long distance is necessary for reducing generation of radiation mode and also reducing the waveguide propagation loss, though it depends on the refraction index of the material constituting the waveguide. Consequently, the size of the optical circuit may be expanded.

On the other hand, by establishing the connection via the 90 degree bend pitch converter according to the present invention, it is possible to downsize the optical circuit.

In the explanation above, the material refraction index is used as it is, and the analysis is conducted according to plane wave approximation. However, in actual waveguide structure, a light wave analysis for the waveguide propagation mode is necessary, considering the equivalent refractive index (effective refractive index) which depends on the shape of the waveguide.

Figure 38:
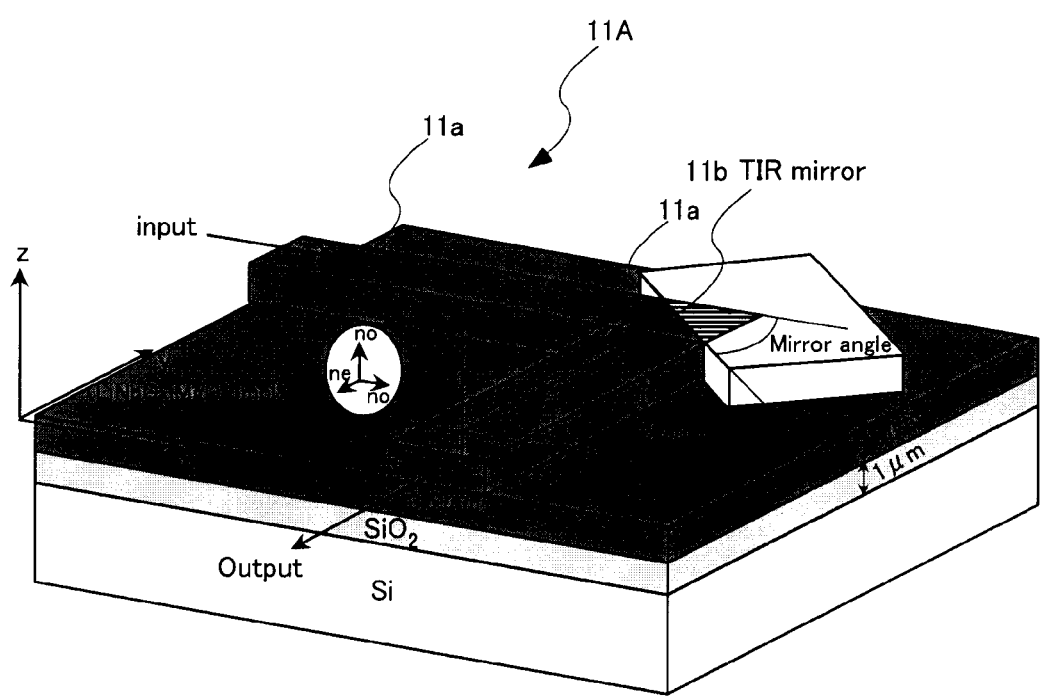
FIG. 38 illustrates a model of the 90 degree bend waveguide according to the present invention.

Next, an explanation will be made as to an example for designing the 90 degree bend waveguide by using an anisotropic medium substrate. Here, The FDTD method (FDTD solutions) is used on the basis of a model of the 90 degree bend waveguide 11A as shown in FIG. 38.

Figure 39A:
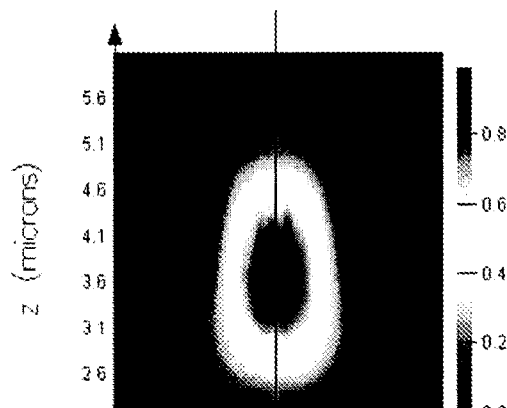
FIG. 39 illustrates a fundamental mode of Ex component viewed in x-z plane.
Figure 39B:
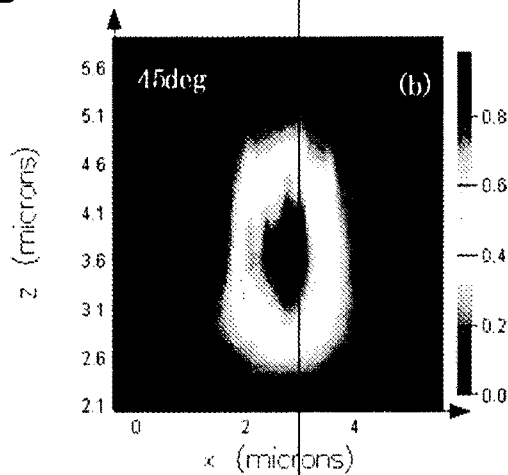
Figure 39C:
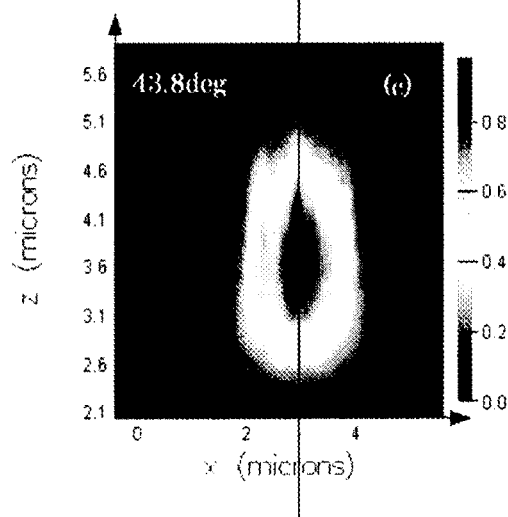
Figure 40A:
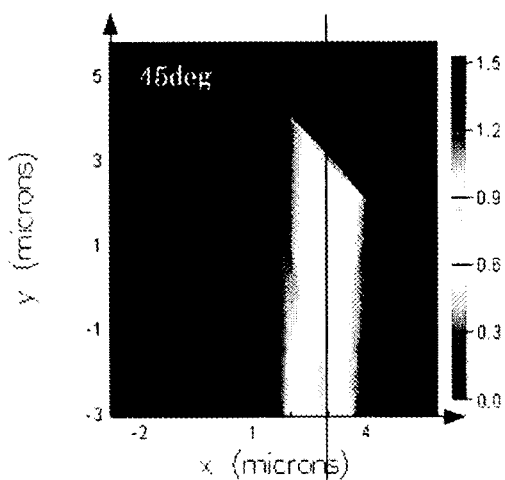
FIG. 40 illustrates a fundamental mode of Ex components viewed in x-y plane.
Figure 40B:
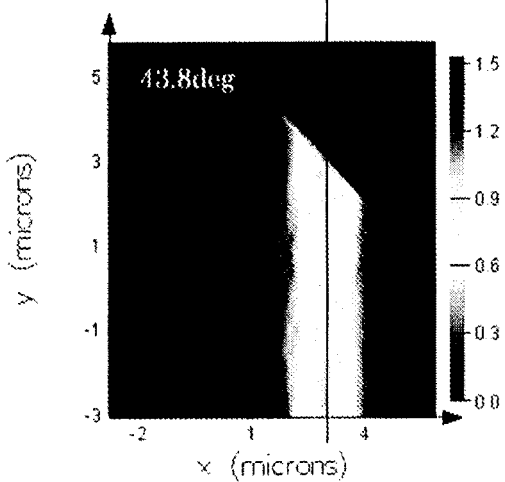

This structure is made up of three layers; Si substrate, $SiO_2$ clad layer, and a core layer made of MgO doped LN. The LN substrate serving as a core of the waveguide 11a is anisotropic, but z-axis (c-axis) of the LN layer is set to be parallel with y-axis of the Cartesian coordinates as shown in FIG. 38. Here, the LN substrate is assumed as a Y-cut substrate. FIG. 39A illustrates a fundamental mode of Ex component (wavelength 532 nm) which is inputted from the mode analysis. In FIG. 39, on the input side, the position of 3 μm on the horizontal axis being parallel to the y-axis indicates the center position of the waveguide, and on the output side, the position of 3 μm on the horizontal axis being parallel to the x-axis indicates the center of the waveguide. When the mirror angle is set to be 45 degrees, the Ex component of FIG. 39B, indicating the output side mode, has a maximum value being shifted to the left side from the position of 3 μm. When the mirror angle is set to be 43.8 degrees, the maximum point of the electric field Ex is positioned at approximately 3 μm. This angle agrees with a result of the analysis according to the aforementioned plane wave approximation. FIG. 40 illustrates that the electric field distribution under the same condition as shown in FIG. 39 is viewed on the x-y plane.

In the example of the bend circuit described above, the anisotropic medium having the same waveguide width and the height for forming the core is employed to establish the waveguide. However, it is further possible to form the bend circuit by an isotropic medium such as $SiO_2$ and an organic waveguide. In this case, $n_e$ and $n_o$ are replaced by an equivalent refractive index of the medium at the time of setting design parameters, thereby realizing the implementation.

The waveguide constituting the waveguide type directional coupler provided in the light source device of the present invention may have various configurations, such as a ridge type waveguide, a planar waveguide, and an optical fiber.

By way of example, the ridge-type waveguide which is made by forming the ridge part on the optical element substrate is configured by setting the equivalent refraction index of the ridge part to be higher relative to both sides of the ridge part. The wave guide type directional coupler is formed by making two ridge parts to be adjacent to each other in parallel for a length corresponding to the coupling length.

As for the planar waveguide, a semiconductor substrate is used as an optical element substrate, and a core is formed on this semiconductor substrate, using a thin film. By way of example, a high refraction index area is formed by an ion exchange method, and it is possible to employ a titanium diffusion type or a proton exchange type LN waveguide which uses the high refraction index area as the waveguide.

In the example where an optical fiber is used as the waveguide, the optical fiber is fixed on the optical element substrate, and two optical fibers are adjacent to each other in parallel for a length corresponding to the length of the coupling length, thereby forming the waveguide type directional coupler.

Figure 41:
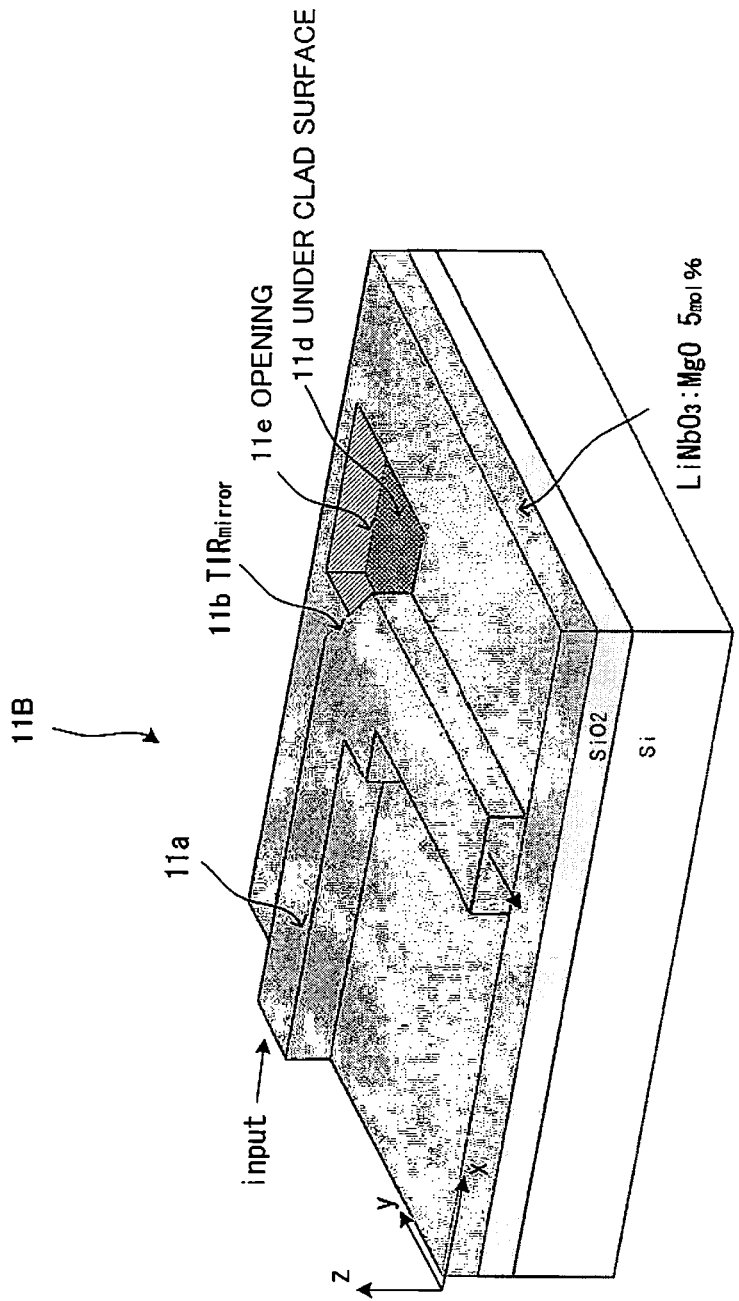
FIG. 41 illustrates another configuration example of the 90 degree bend waveguide according to the present invention.

FIGS. 41 and 42 illustrate another configuration example of the 90 degree bend waveguide. The 90 degree bend waveguide 11B as shown in FIGS. 41 and 42 has a configuration which reduces light leakage on the mirror part 11*b* in the configuration of the 90 degree bend waveguide 11A as shown in FIG. 38, and it is configured such that a portion of the ridge part is removed at the mirror part 11*b*.

Figure 42A:
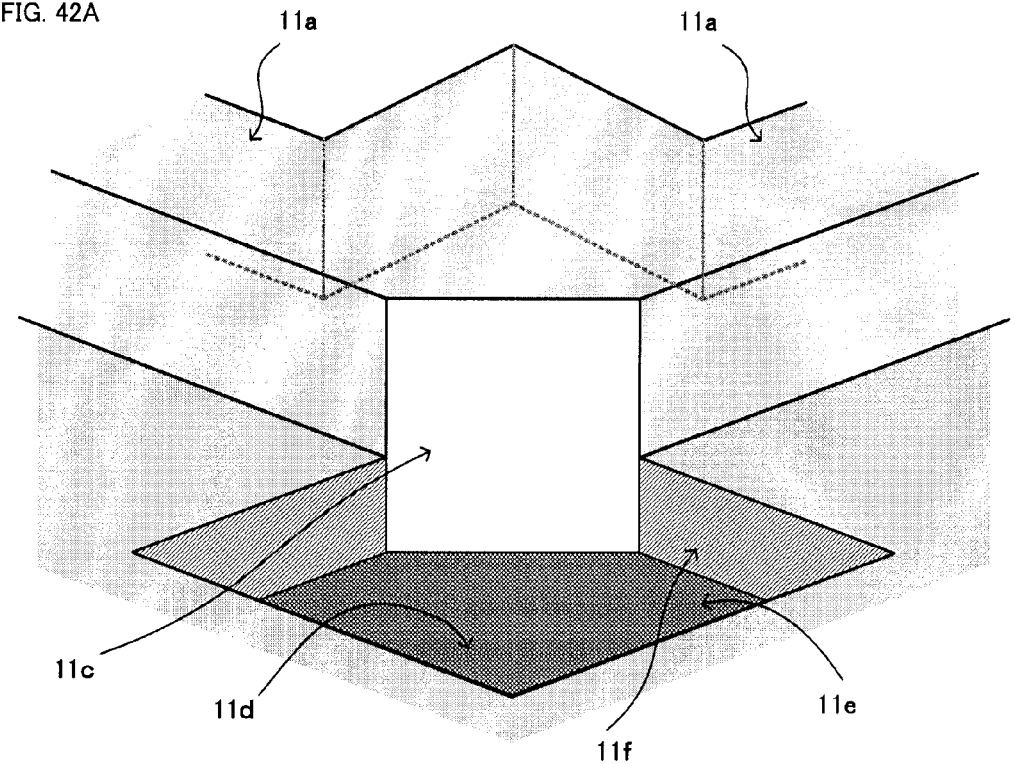
FIG. 42 illustrates another configuration example of the 90 degree bend waveguide according to the present invention.
Figure 42B:
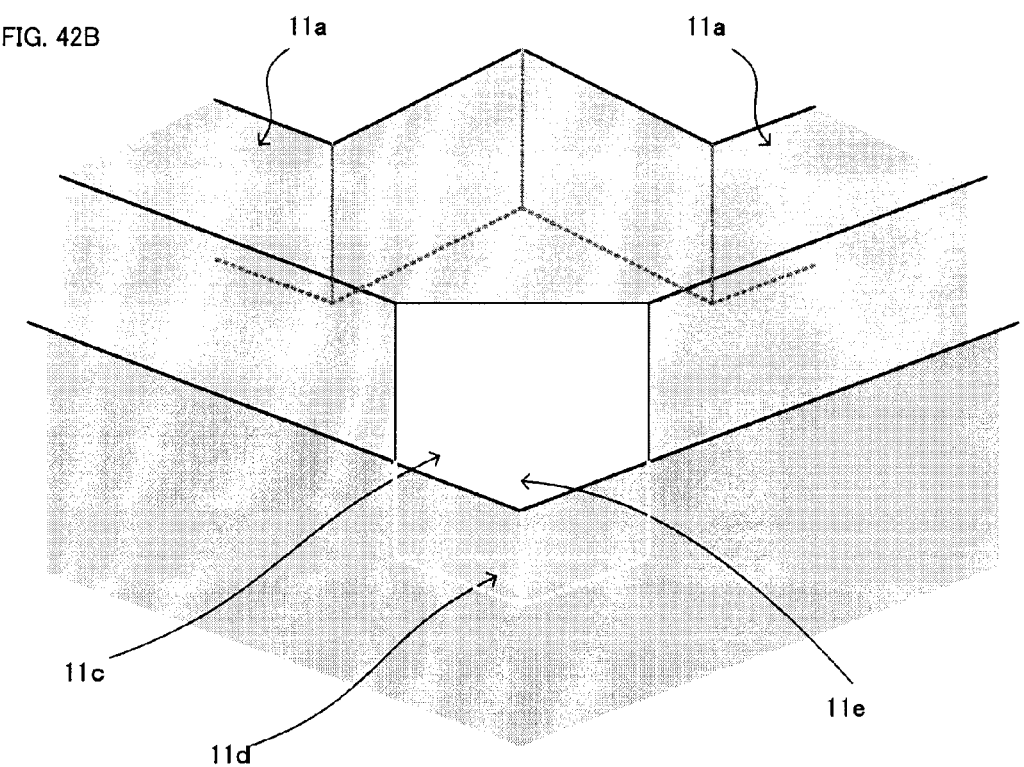

FIG. 42A and FIG. 42B are schematic illustrations viewed from the backside of the mirror part 11*b*. As for the 90 degree bend waveguide 11B, the opening 11*e* is formed by digging the ridge part on the mirror back surface 11*c* side, down to the under-clad surface 11*d*. Digging of the ridge part can be carried out by etching or the like. With this configuration, the mirror part 11*b* reduces the light leakage from the waveguide 11*a*, thereby enhancing reflectivity of the mirror.

The opening 11*e* as shown in FIG. 42A has a configuration that a dug portion is largely provided and the cross section 11*f* of the ridge part, being continuous to the mirror backside surface 11*c* is exposed. The opening part 11*e* as shown in FIG. 42B has a configuration that a dug portion is provided in a smaller size and the cross section 11*f* of the ridge part is also made small. The exposed amount of the cross section 11*f* on the ridge lower part may be determined according to the light leakage from the mirror part 11*b*.

Figure 43:
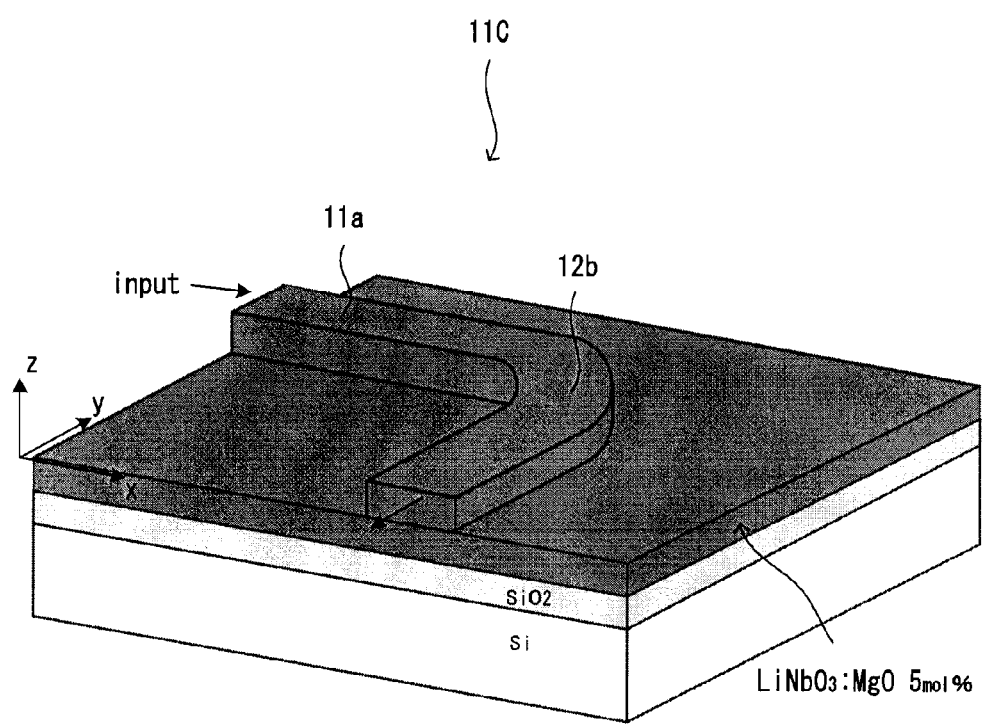
FIG. 43 illustrates another configuration example of the 90 degree bend waveguide according to the present invention.

FIG. 43 illustrates another configuration example of the 90 degree bend waveguide. The 90 degree bend waveguide 11C shown in FIG. 43 is an example that is formed by a curved waveguide. In this curved waveguide, the passing light has wavelength dependence. Therefore, the radius of curvature, the refraction index, and the like, of the curved waveguide are set according to the wavelength of the light from the light emitting device.

[Formation of Optical Waveguide]

Next, with reference to FIG. 44 to FIG. 52, an example for forming the optical waveguide will be explained. Hereinafter, an explanation will be made as to the formation of the optical waveguide employing a silicon nitride (SiN) film, the formation of the optical waveguide using a resin film, and the formation of the optical waveguide employing a nanoimprint technique.

(Formation of the Optical Waveguide Using a Silicon Nitride (SiN) Film)

Figure 44:
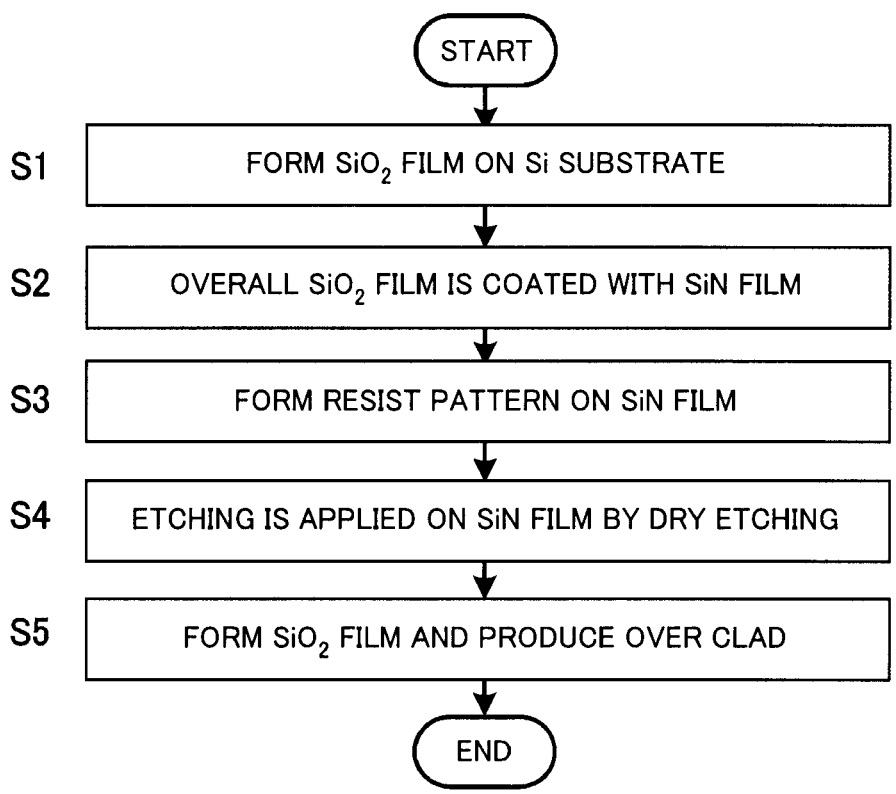
FIG. 44 is a flowchart for explaining a formation of an optical waveguide using a silicon nitride (SiN) film.
Figure 45A:
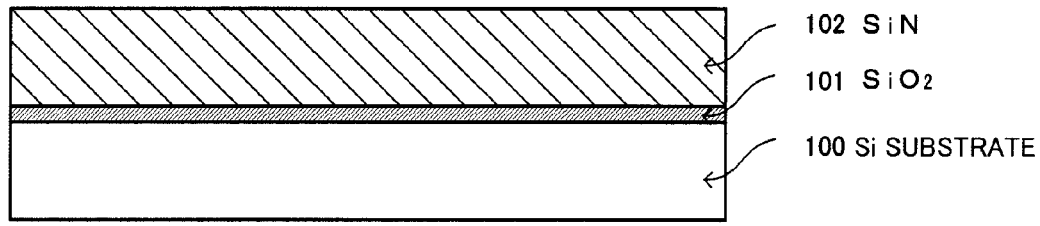
FIG. 45 schematically illustrates a formation of the optical waveguide using the silicon nitride (SiN) film.
Figure 45B:
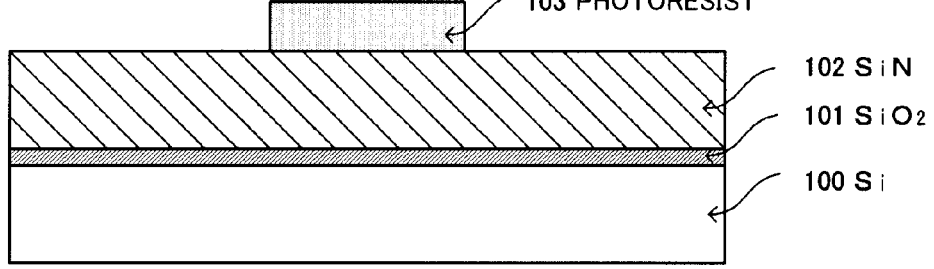
Figure 45C:
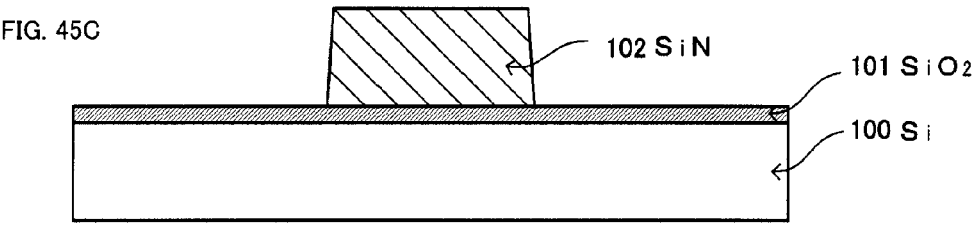
Figure 45D:
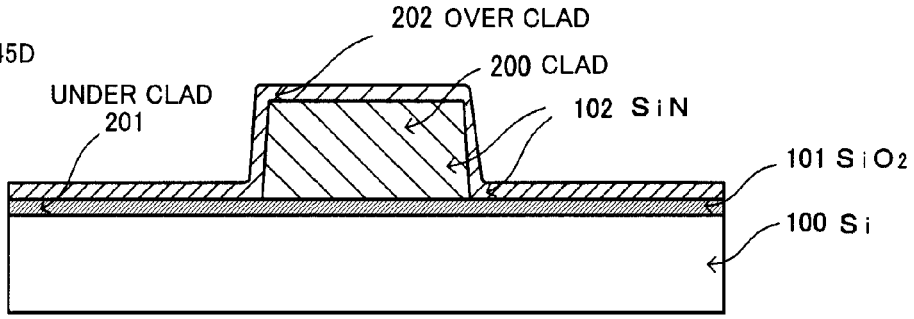

With reference to FIG. 44 and FIG. 45, formation of the optical waveguide using a silicon nitride (SiN) film will be explained. FIG. 44 and FIG. 45 are, respectively, a flowchart and schematic illustrations for explaining the formation of the optical waveguide using the silicon nitride (SiN) film.

Firstly, an oxide silicon film ($SiO_2$ film) 101 is formed on the silicon substrate (Si substrate) 100. The $SiO_2$ film 101 may be a thermally-oxidized film or a plasma CVD film, and the film thickness may be set to be around 1 to 2 μm (S1). A silicon nitride film (SiN film) 102 is formed on the $SiO_2$ film 101 by plasma CVD. The SiN film 102 may be set to be around 3 μm in thickness (FIG. 45A) (S2).

The SiN film 102 is coated with a photoresist to form a resist pattern which makes the optical waveguide (FIG. 45B) (S3). Using the resist pattern as a mask, dry etching is performed using plasma, thereby etching the SiN film 102. The etching is completed leaving the boundary with the $SiO_2$ film 101, or the $SiO_2$ film 101.

If the etching is performed up to the boundary with the $SiO_2$ film 101, an independent type optical waveguide using the SiN film 102 is formed on the Si substrate 100. On the other hand, if the etching is terminated just before the boundary of the $SiO_2$ film 101 to leave SiN film 102, it is possible to form a ridge type optical waveguide using the SiN film on the Si substrate 100 (FIG. 45C) (S4).

In addition, $SiO_2$ film having film thickness of 2 μm, for instance, is formed on the optical waveguide and the $SiO_2$ film 101. On this occasion, the $SiO_2$ film on the upper layer forms an over-clad 202 on the clad 200 of the optical waveguide, and the $SiO_2$ film 101 on the lower layer forms the under-clad 201 (FIG. 45D) (S5).

(Formation of the Optical Waveguide Using a Resin Film)

Figure 46:
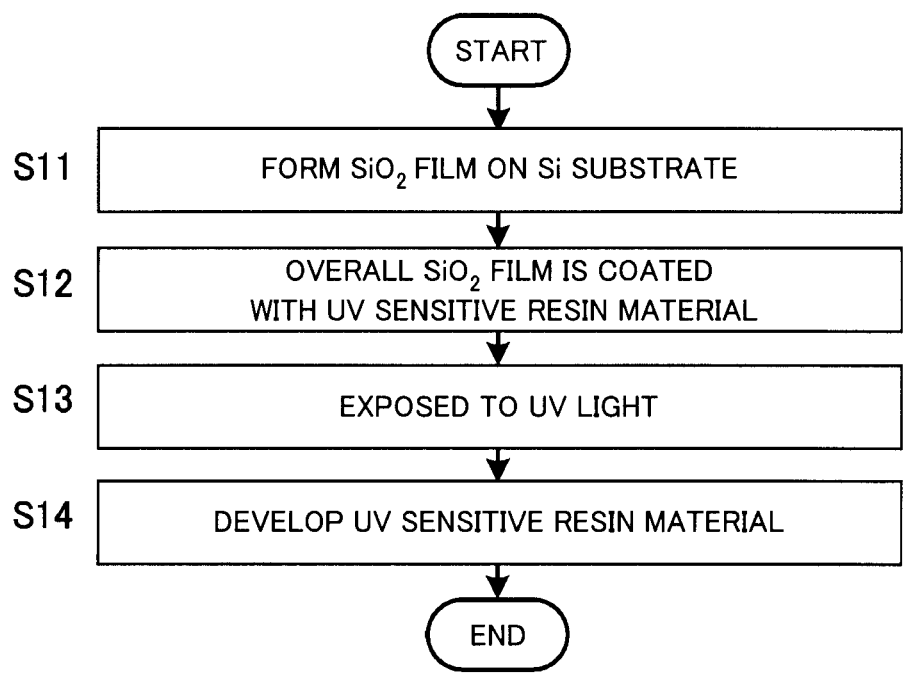
FIG. 46 is a flowchart for explaining a formation of an optical waveguide using a UV sensitive resin material.
Figure 47A:
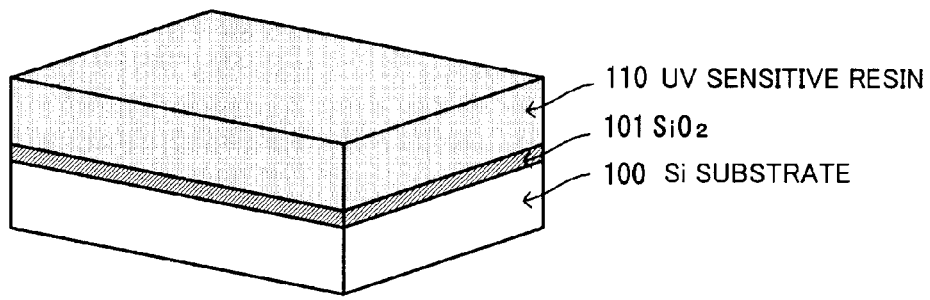
FIG. 47 schematically illustrates a formation of the optical waveguide using the UV sensitive resin material.
Figure 47B:
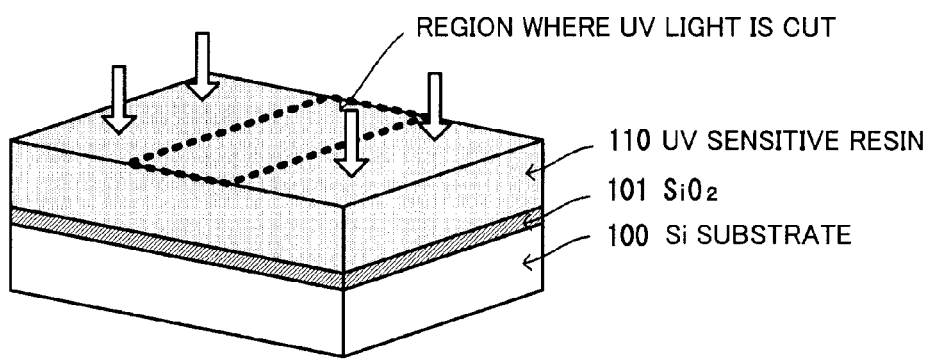
Figure 47C:
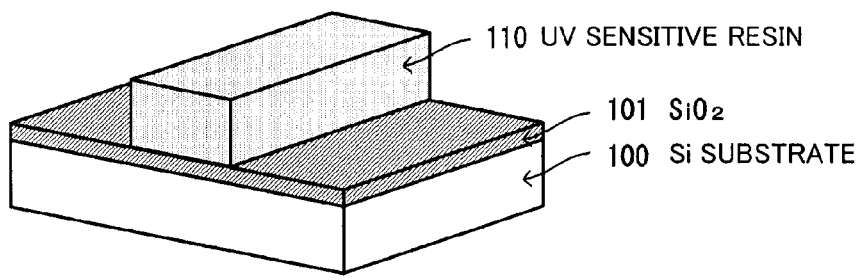
Figure 48:
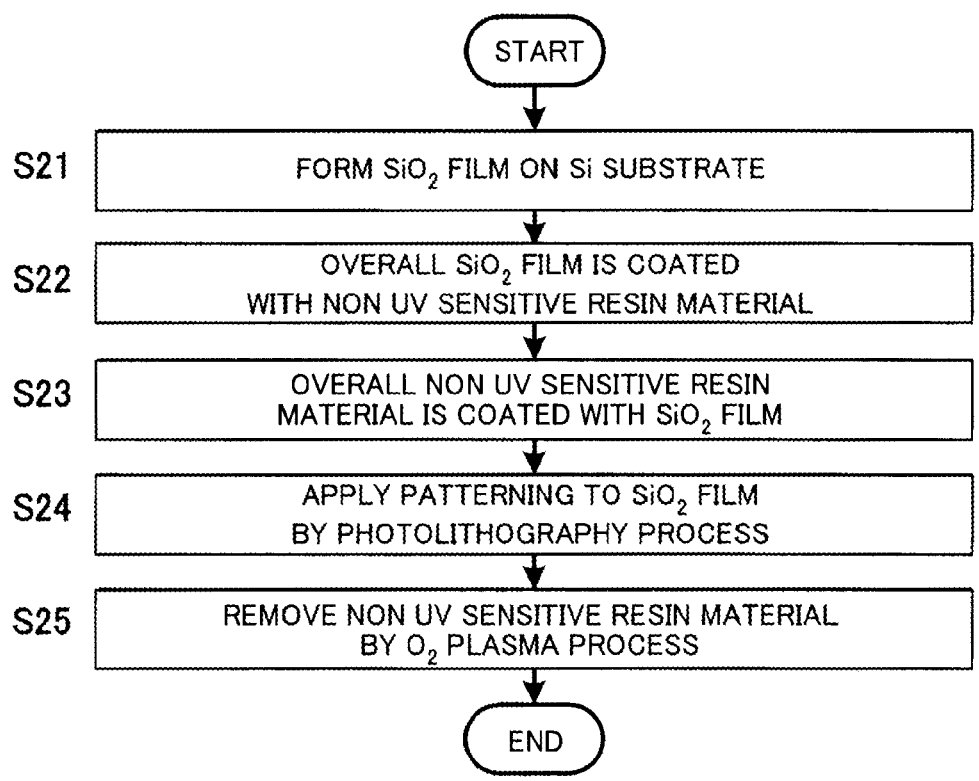
FIG. 48 is a flowchart for explaining a formation of an optical waveguide using a non UV sensitive resin material.

With reference to FIG. 46 and FIG. 49, formation of the optical waveguide using a resin film will be explained. A material of UV sensitive resin or a material of non UV sensitive resin may be used as the resin film. FIG. 46 and FIG. 47 are respectively a flowchart and schematic illustrations for explaining the formation of the optical waveguide using the UV sensitive resin material. FIG. 48 and FIG. 49 are respectively a flowchart and schematic illustrations for explaining the formation of the optical waveguide using the non UV sensitive resin material.

Firstly, an explanation will be made as to the formation of the optical waveguide using the UV sensitive resin material.

A silicon oxide film ($SiO_2$ film) 101 is formed on the silicon substrate (Si substrate) 100. The $SiO_2$ film 101 may be a thermally-oxidized film or a plasma CVD film, and the film thickness may be set to be around 1 to 2 μm (S11). The overall $SiO_2$ film 101 is coated with UV sensitive resin material 110 (FIG. 47A) (S12).

Via a photoresist mask made of Cr placed on the UV sensitive resin material 110, a pattern of the optical waveguide is exposed to UV light (FIG. 47B) (S13).

The part of the UV sensitive resin material 110 which is irradiated with the UV light is dissolved and removed, and the remaining UV sensitive resin material 110 part is cured to form the optical waveguide (FIG. 47C) (S14). It is to be noted that in some cases, the optical waveguide is formed by leaving a part being exposed, depending on a property of the UV sensitive resin material 110.

Next, with reference to FIG. 48 and FIG. 49, formation of the optical waveguide using the non photosensitive resin material will be explained.

An oxide silicon film ($SiO_2$ film) 101 is formed on the silicon substrate (Si substrate) 100. The $SiO_2$ film 101 may be a thermally-oxidized film or a plasma CVD film, and the film thickness may be set to be around 1 to 2 μm (S21). The overall the $SiO_2$ film 101 is coated with a non UV sensitive resin material 111 (FIG. 49A) (S22).

A $SiO_2$ film is formed on the overall non UV sensitive resin material 111 by plasma CVD or the like (S23), and patterning is applied to the $SiO_2$ film by a photolithography process to form an etching-resistant mask (S24). According to $O_2$ plasma process, the resin predominantly composed of carbon is removed by CO reaction (FIG. 49B) (S25).

Figure 49A:
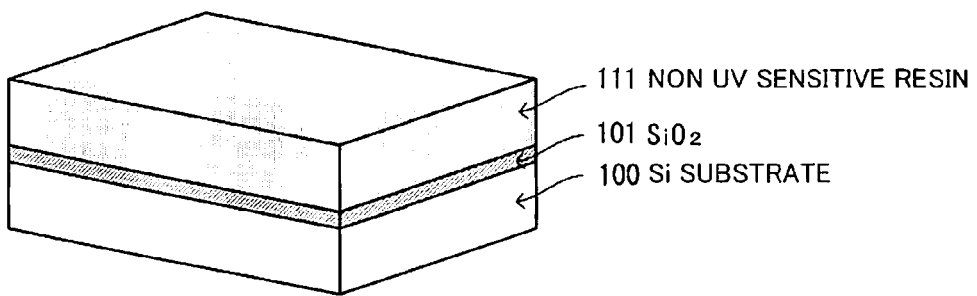
FIG. 49 schematically illustrates a formation of the optical waveguide using the non UV sensitive resin material.
Figure 49B:
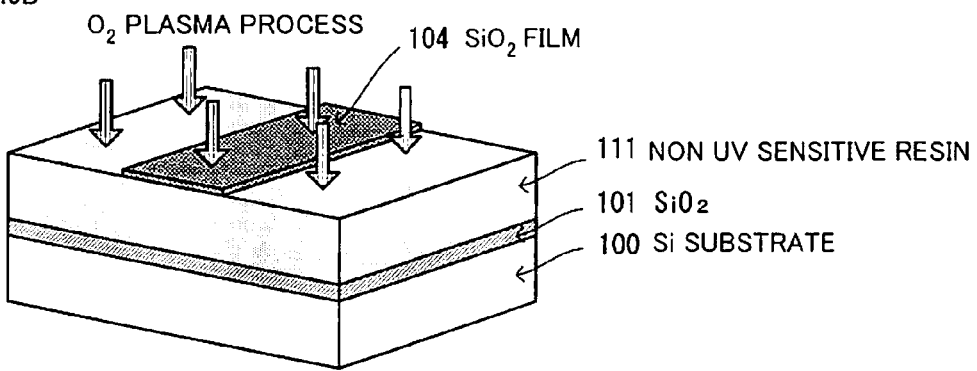
Figure 49C:
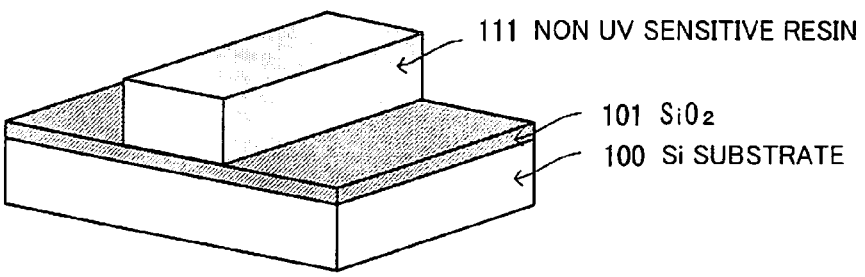

After the $O_2$ plasma process is performed, the etching-resistant mask is removed to form the optical waveguide (FIG. 49C).

(Formation of the Optical Waveguide Employing the Nanoimprint Technique)

Figure 50:
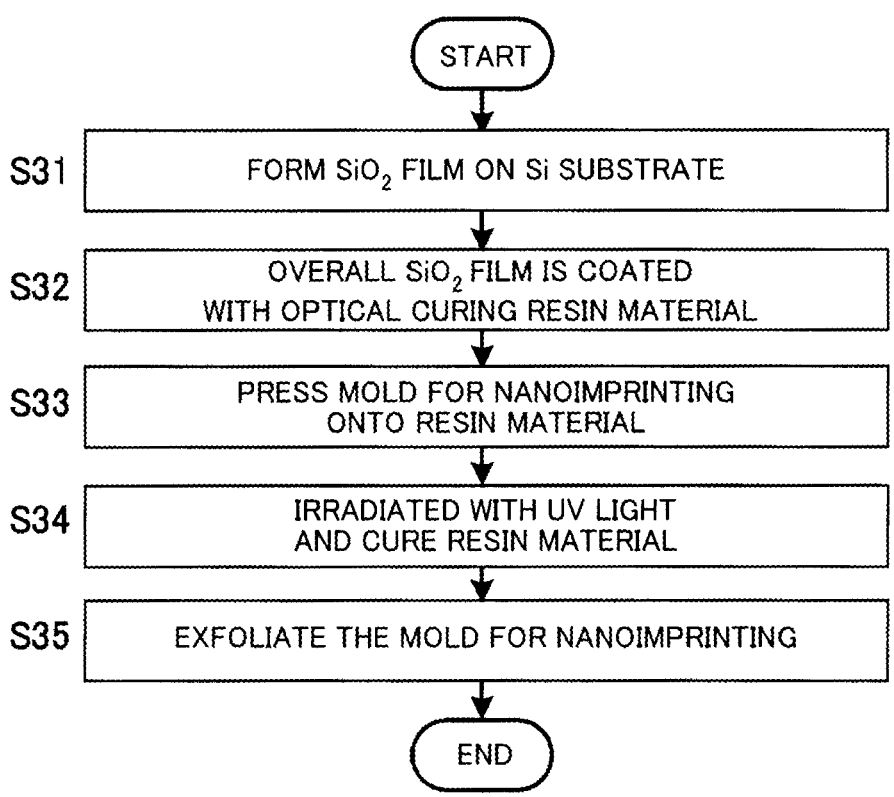
FIG. 50 is a flowchart for explaining a formation of an optical waveguide using a UV curing resin material.
Figure 51:
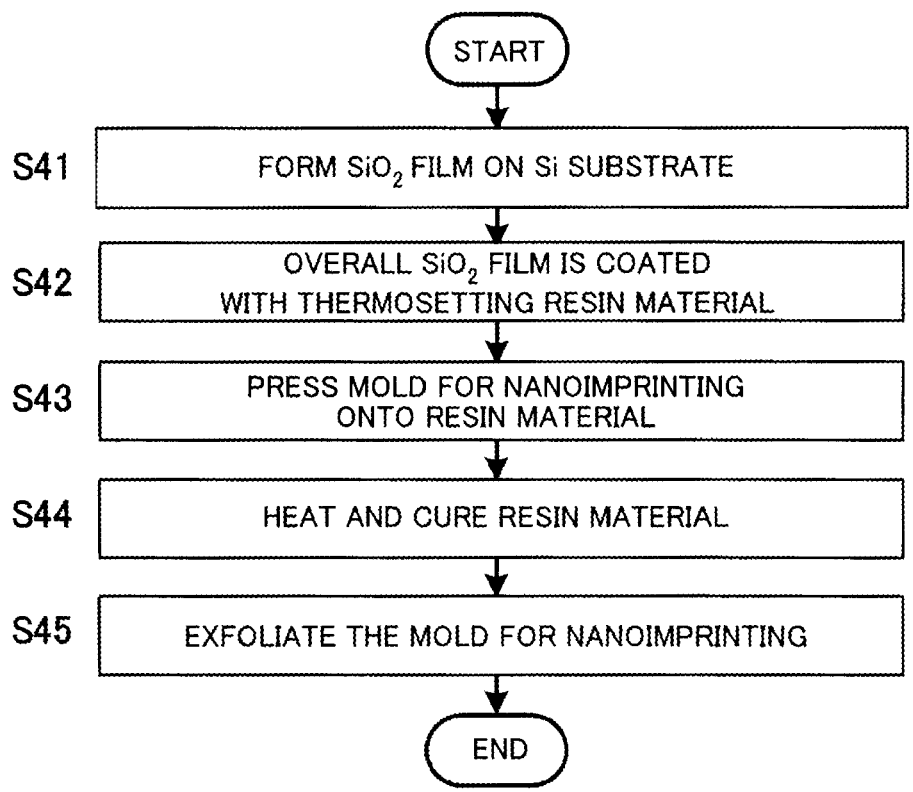
FIG. 51 is a flowchart for explaining a formation of an optical waveguide using a thermosetting resin material.
Figure 52A:
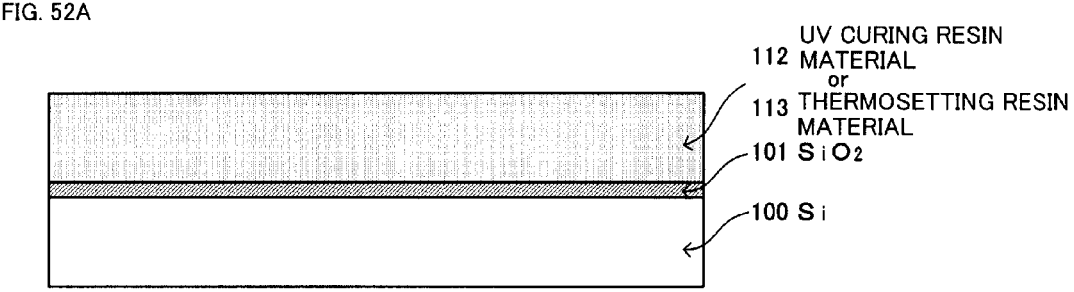
FIG. 52 schematically illustrates a formation of the optical waveguide using the UV curing resin material or the thermosetting resin material.
Figure 52B:
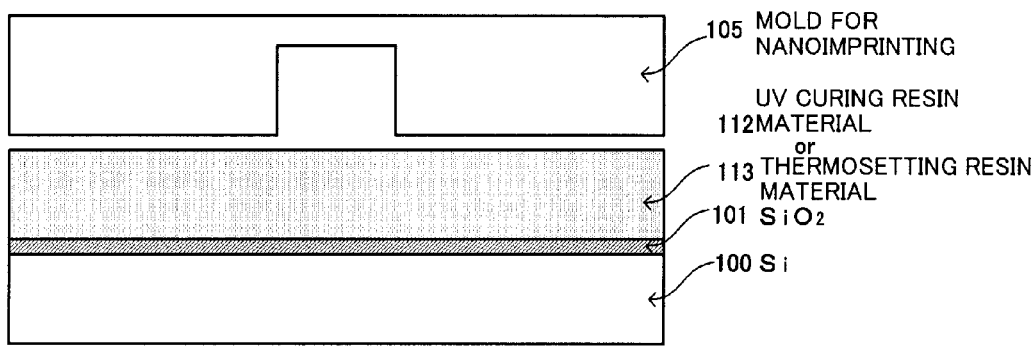
Figure 52C:
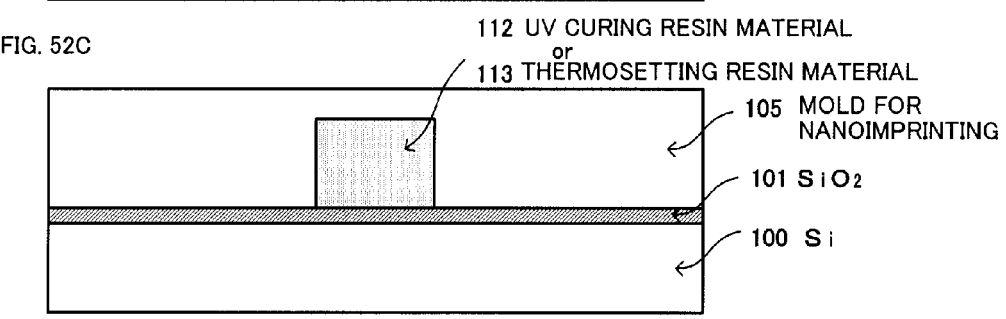
Figure 52D:
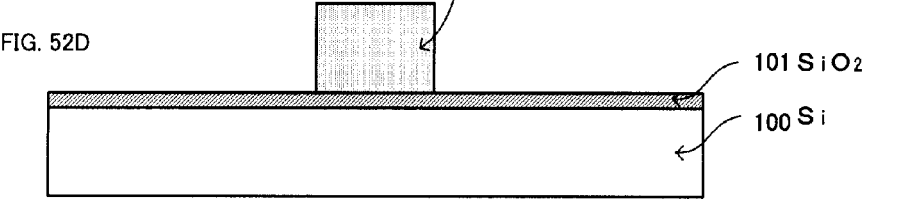

With reference to FIG. 50 to FIG. 52, formation of the optical waveguide employing the nanoimprint technique will be explained. A UV curing resin material or a thermosetting resin material may be used as a resin film. FIG. 50 is a flowchart for explaining the formation of the optical waveguide using the UV curing resin material, FIG. 51 is a flowchart for explaining the formation of the optical waveguide using the thermosetting resin material, and FIG. 52 schematically illustrates the formation of the optical waveguide using the UV curing resin material or the thermosetting resin material.

Firstly, an explanation will be made as to the formation of the optical waveguide, which applies the nanoimprint technique to the UV curing resin material.

An oxide silicon film ($SiO_2$ film) 101 is formed on a silicon substrate (Si substrate) 100. The $SiO_2$ film 101 may be a thermally-oxidized film or a plasma CVD film, and the film thickness may be set to be around 1 to 2 μm (S31). The overall $SiO_2$ film 101 is coated with the UV curing resin material 112 (FIG. 52A) (S32).

A mold for nanoimprinting 105 is pressed onto the UV curing resin material 112, and the optical waveguide part is formed. The mold for nanoimprinting 105 may be made of a material such as quartz, for instance (FIG. 52B) (S33).

In the state of being pressed by the mold for nanoimprinting 105, the UV curing resin material 112 is irradiated with UV light, and it is cured (S34).

The mold for nanoimprinting 105 is exfoliated, and by the use of the cured UV curing resin material 112, the optical waveguide is formed (FIG. 52C) (S35).

Next, formation of the optical waveguide, applying the nanoimprint technique to the thermosetting resin material, will be explained.

An oxide silicon film ($SiO_2$ film) 101 is formed on a silicon substrate (Si substrate) 100. The $SiO_2$ film 101 may be a thermally-oxidized film or a plasma CVD film, and the film thickness may be set to be around 1 to 2 μm (S41). The overall $SiO_2$ film 101 is coated with a thermosetting resin material 113 (FIG. 52A) (S42).

A mold for nanoimprinting 105 is pressed onto the thermosetting resin material 113, and the optical waveguide part is formed. The mold for nanoimprinting 105 may be made of a material such as quartz, for instance (FIG. 52B) (S43).

In the state of being pressed by the mold for nanoimprinting 105, the thermosetting resin material 113 is heated and it is cured (S44). The mold for nanoimprinting 105 is exfoliated, and by the use of the cured thermosetting resin material 113, the optical waveguide is formed (FIG. 52C) (S45).

[Formation of the Optical System Element and the Electrical System Element]

Next, an explanation will be made as to a method for forming on the semiconductor substrate, the optical system element and the electrical system element. Hereinafter, there will be explained a process example for mounting a detector and a control unit in a post-process, and a process example for building the detector and the control unit into the semiconductor substrate.

Here, the optical system element may represent, for example, an optical waveguide or a multi-wavelength combiner element, and the electrical system element may represent, for example, wiring, or an electrode terminal. In addition, in the case where the detector and the control unit are built into the semiconductor substrate, it is possible to form the detector and the control unit together with the electrical system element, such as wiring.

(Process Example for Mounting the Detector and the Control Unit in the Post-Process)

Figure 53:
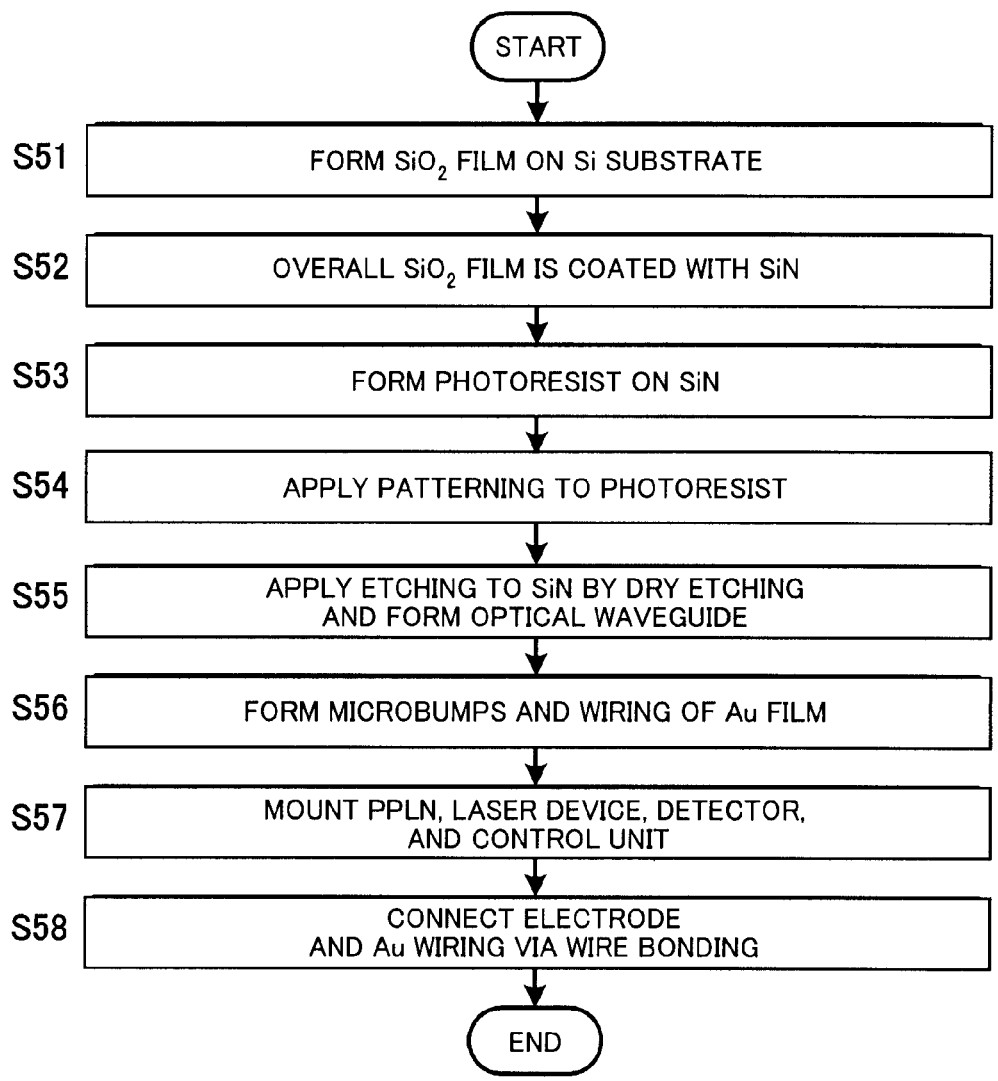
FIG. 53 is a flowchart for explaining a process procedure for mounting a detector and a control unit in a post-process, in forming an optical system element and an electrical system element.
Figure 54A:
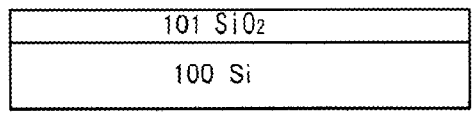
FIG. 54 schematically illustrates a process procedure for mounting the detector and the control unit in the post-process, in forming the optical system element and the electrical system element.
Figure 54B:
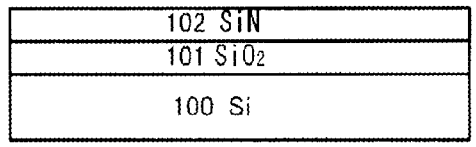
Figure 54C:
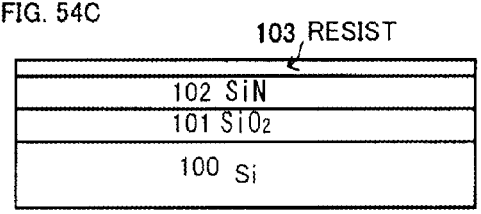
Figure 54D:
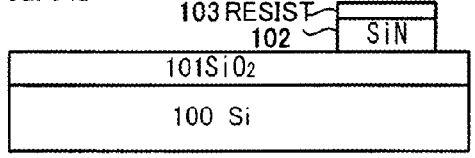
Figure 54E:
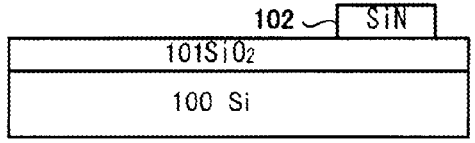
Figure 54F:
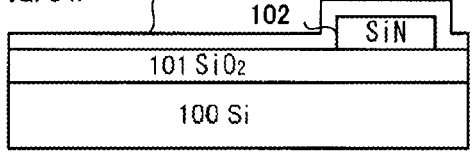
Figure 54G:
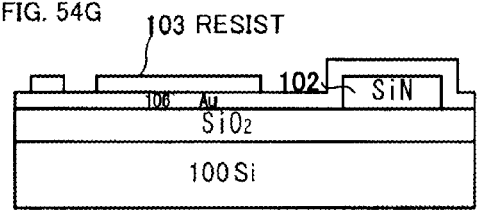
Figure 54H:
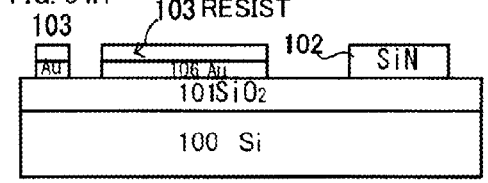
Figure 54I:
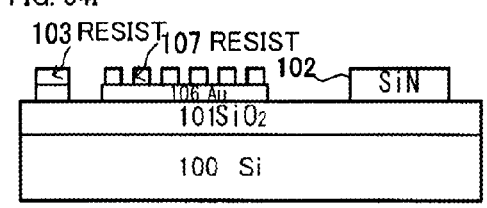
Figure 54J:
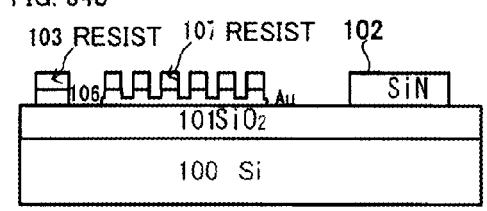
Figure 54K:
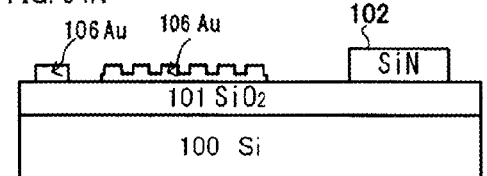
Figure 54L:
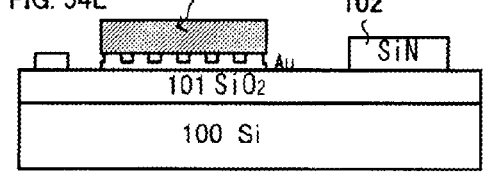
Figure 54M:
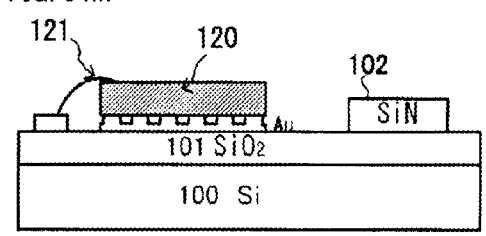
Figure 55:
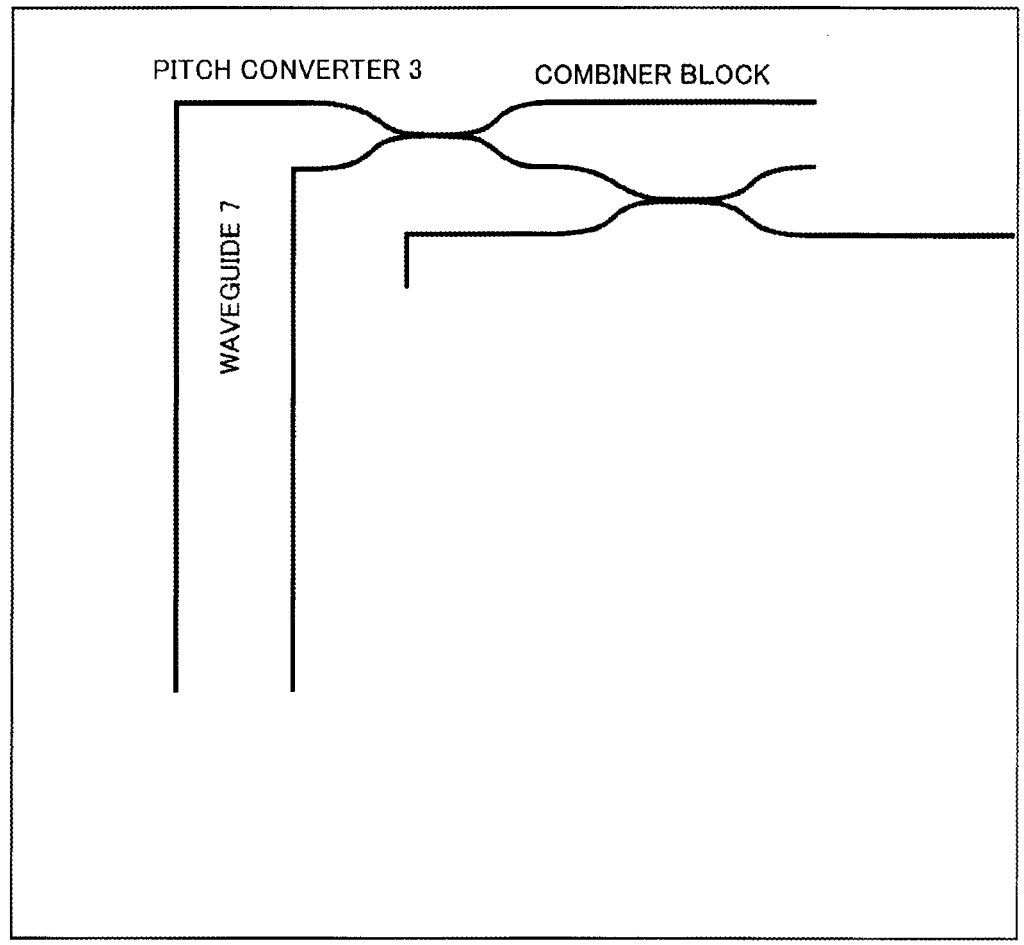
FIG. 55 is a block diagram showing each process procedure for mounting the detector and the control unit in the post-process, in forming the optical system element and the electrical system element.
Figure 56:
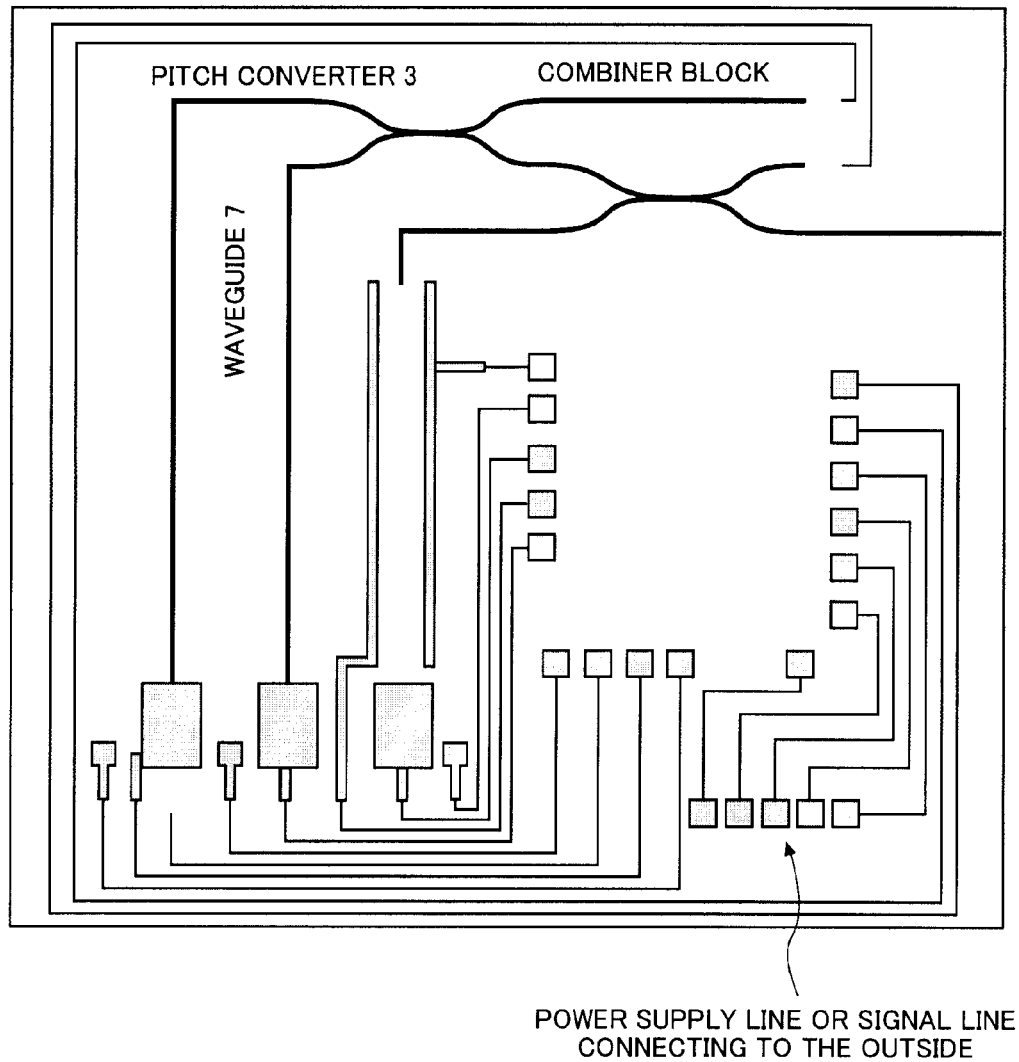
FIG. 56 is a block diagram showing each process procedure for mounting the detector and the control unit in the post-process, in forming the optical system element and the electrical system element.
Figure 57:
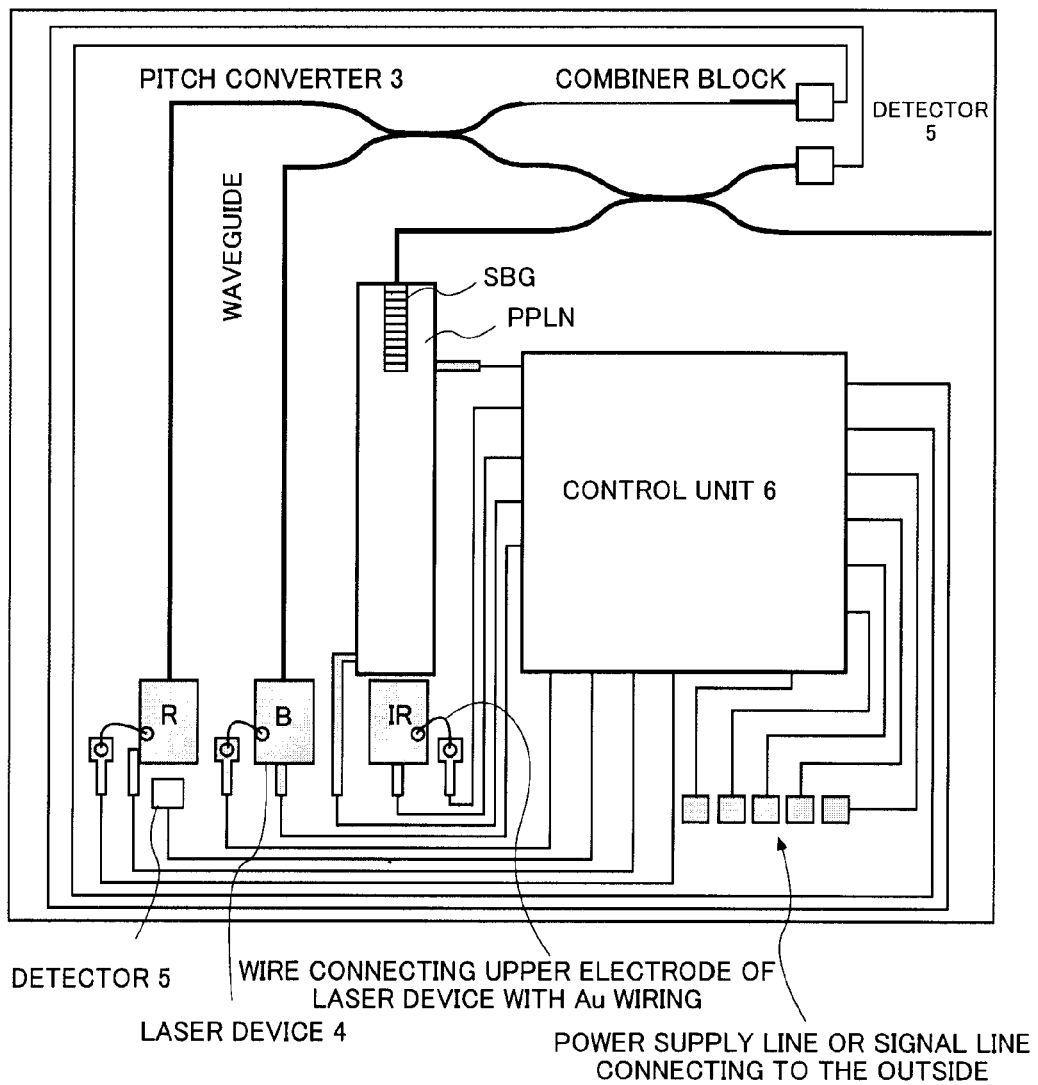
FIG. 57 is a block diagram showing each process procedure for mounting the detector and the control unit in the post-process, in forming the optical system element and the electrical system element.

With reference to FIGS. 53 to 57, an explanation will be made as to a process example for mounting the detector and the control unit in the post-process, in forming the optical system element and the electrical system element. FIGS. 53 and 54 are respectively, a flowchart for explaining a procedure of the process and schematic illustrations for explaining the procedure; and figures from FIG. 55 to FIG. 57 are block diagrams showing respective procedure steps of the process.

Firstly, the optical system element is formed in the steps S51 to S55. An oxide silicon film ($SiO_2$ film) 101 is formed on a silicon substrate (Si substrate) 100. The $SiO_2$ film 101 may be a thermally-oxidized film or a plasma CVD film, and the film thickness may be set to be around 1 to 2 μm (FIG. 54A) (S51). A silicon nitride film (SiN film) 102 is formed on the $SiO_2$ film 101 by plasma CVD. The film thickness of the SiN film 102 is set to be around 3 μm (FIG. 54B) (S52).

The SiN film 102 is coated with a photoresist, and a resist pattern for producing the optical waveguide pattern is formed. In the photoresist patterning, for example, patterns of the waveguide type directional coupler 2, the pitch converter 3, the optical waveguide 7 for linking the pitch converter 3 and the laser device 4 are formed (FIG. 54C, D) (S53, S54). Employing the resist pattern as a mask, dry etching is performed using plasma, and the SiN film 102 is subjected to the etching, thereby forming the optical waveguide. FIG. 55 illustrates a state that the optical system elements, such as the waveguide type directional coupler 2, the pitch converter 3 and the optical waveguide 7, are formed on the semiconductor substrate (FIG. 54E, FIG. 55) (S55).

Next, in the step of S56, the electrical system element is formed. In the step of forming the electrical system element, wiring using an Au film, an electrode for external connection, and an electrode for electrically connecting the mounted components such as the control unit, are formed. The electrode for electrically connecting the mounted components may be made of microbumps (S56). In this step, after forming the Au film 106 on the $SiO_2$ film 101 (FIG. 54F), a resist film 103 is formed by patterning on the part which is required to be left as wiring or an electrode (FIG. 54G), etching is performed using the resist film 103 as a mask, and the Au film 106 of the part not covered by the resist film 103 is removed to form the wiring and the electrode. On this occasion, the optical waveguide made of the $SiO_2$ film 101 and SiN film 102 remains (FIG. 54H).

Next, partially on the electrodes, where components are to be mounted, resist films 107 for the microbumps are formed. As for the part to be left as wiring, the resist film 103 is formed all over the Au film 106 (FIG. 54I).

Thereafter, according to half-etching, projections and depressions with a predetermined depth are formed on the Au film 106 between the resist films 107 for the microbumps (FIG. 54J). These projections and depressions formed on the Au film 106 constitute the microbumps. Since the Au film 106 is continuous in the lower layer, it establishes conduction state as an electrode. On the other hand, since there are no microbumps being formed on the wiring side, a flat surface is formed. FIG. 56 illustrates the state where the electrical system elements such as the Au wiring and the electrodes are formed (FIG. 54K, FIG. 56) (S56).

The Au film 106 where the microbumps are formed constitutes joints of the mounted components, and the mounted components, such as the laser device and the control unit, are mounted on the joints. Joining via the microbumps is performed by surface activated bonding, and therefore normal-temperature joining is possible (FIG. 54L) (S57). Thereafter, Au wire bonding connects the electrodes with the wiring. It is to be noted that when the control unit is mounted, the Au film is formed on the aluminum pad while the IC of the control unit is in the bare-chip status, and it is flipped when mounting is performed (S58).

FIG. 57 illustrates the state where the mounted components such as the laser device 4, the detector 5, the control unit 6, the PPLN 4d, and the SGB 4e are mounted, the upper electrode of the laser device 4 and the Au wiring are connected via wire bonding (FIG. 54M, FIG. 57).

(Process Example for Building the Detector and the Control Unit into the Semiconductor Substrate)

Figure 58:
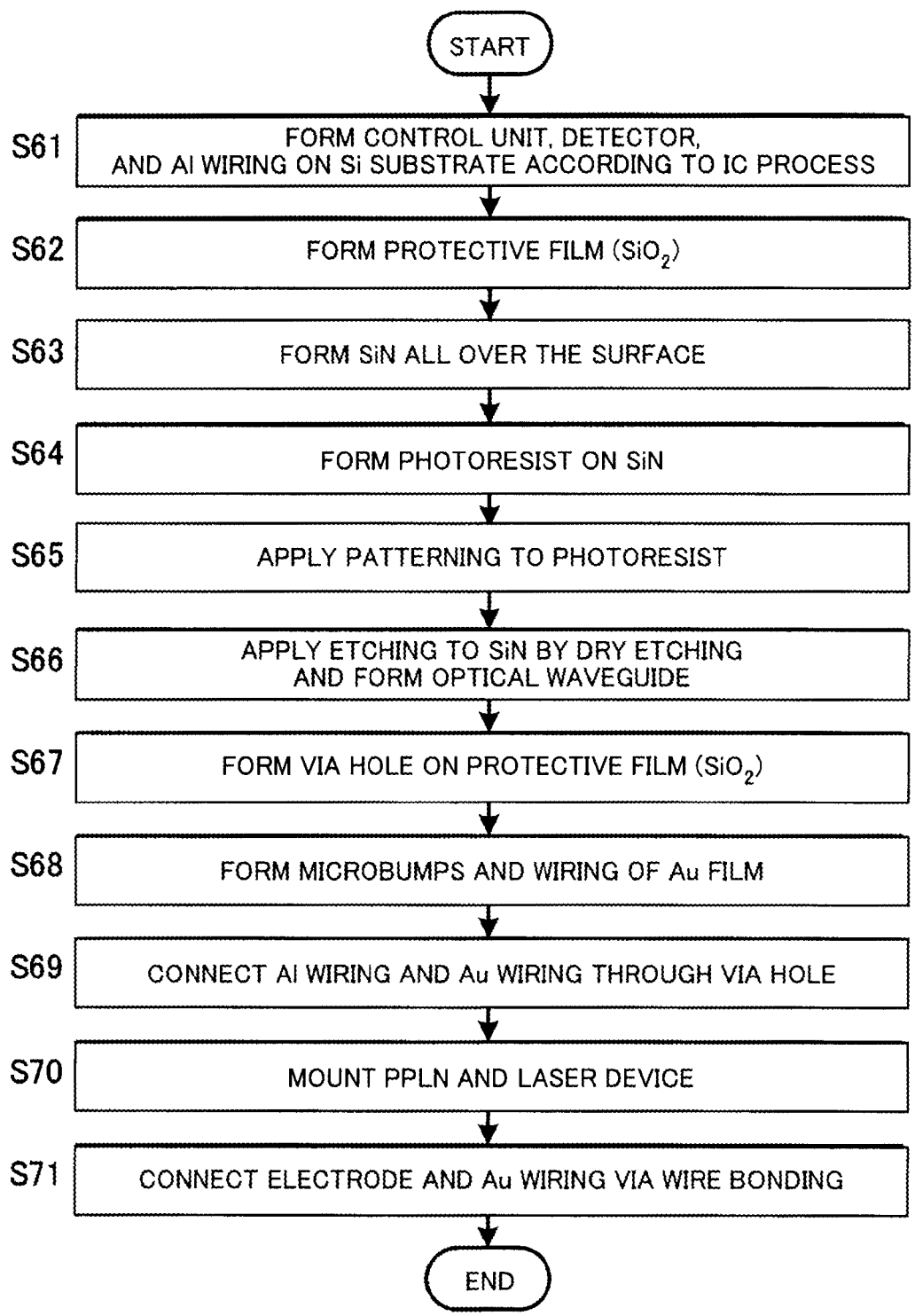
FIG. 58 is a flowchart for explaining a process procedure to make the detector and the control unit into the semiconductor substrate, in forming the optical system element and the electrical system element.
Figure 59:
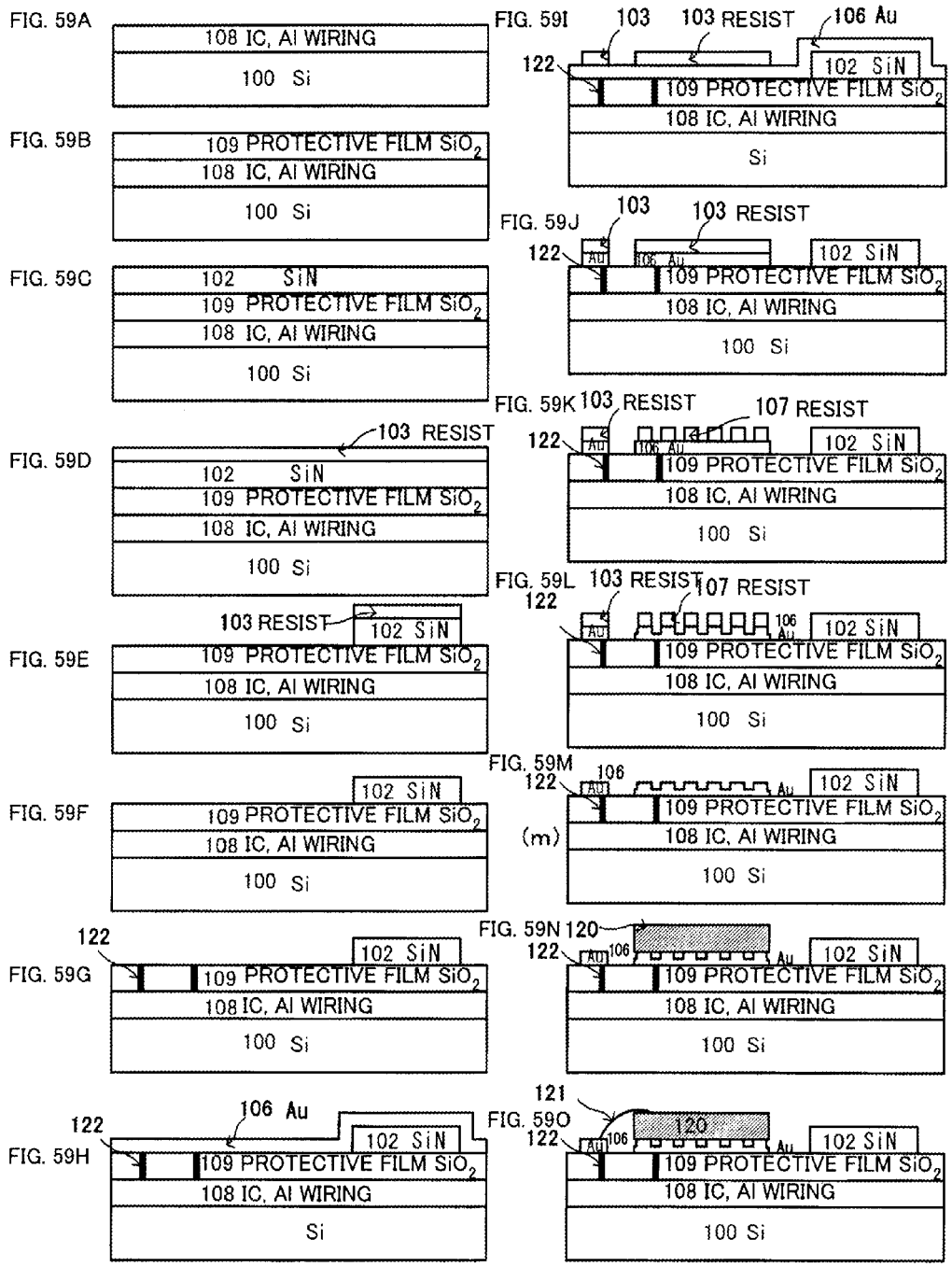
FIG. 59 schematically illustrates a process procedure to make the detector and the control unit into the semiconductor substrate, in forming the optical system element and the electrical system element.

With reference to FIGS. 58 to 63, an explanation will be made as to a process example for building the detector and the control unit into the semiconductor substrate, in forming the optical system element and the electrical system element. FIGS. 58 and 59 are respectively, a flowchart for explaining a procedure of the process and schematic illustrations for explaining the procedure; and figures from FIG. 60 to FIG. 63 are block diagrams showing respective procedure steps of the process.

Figure 60:
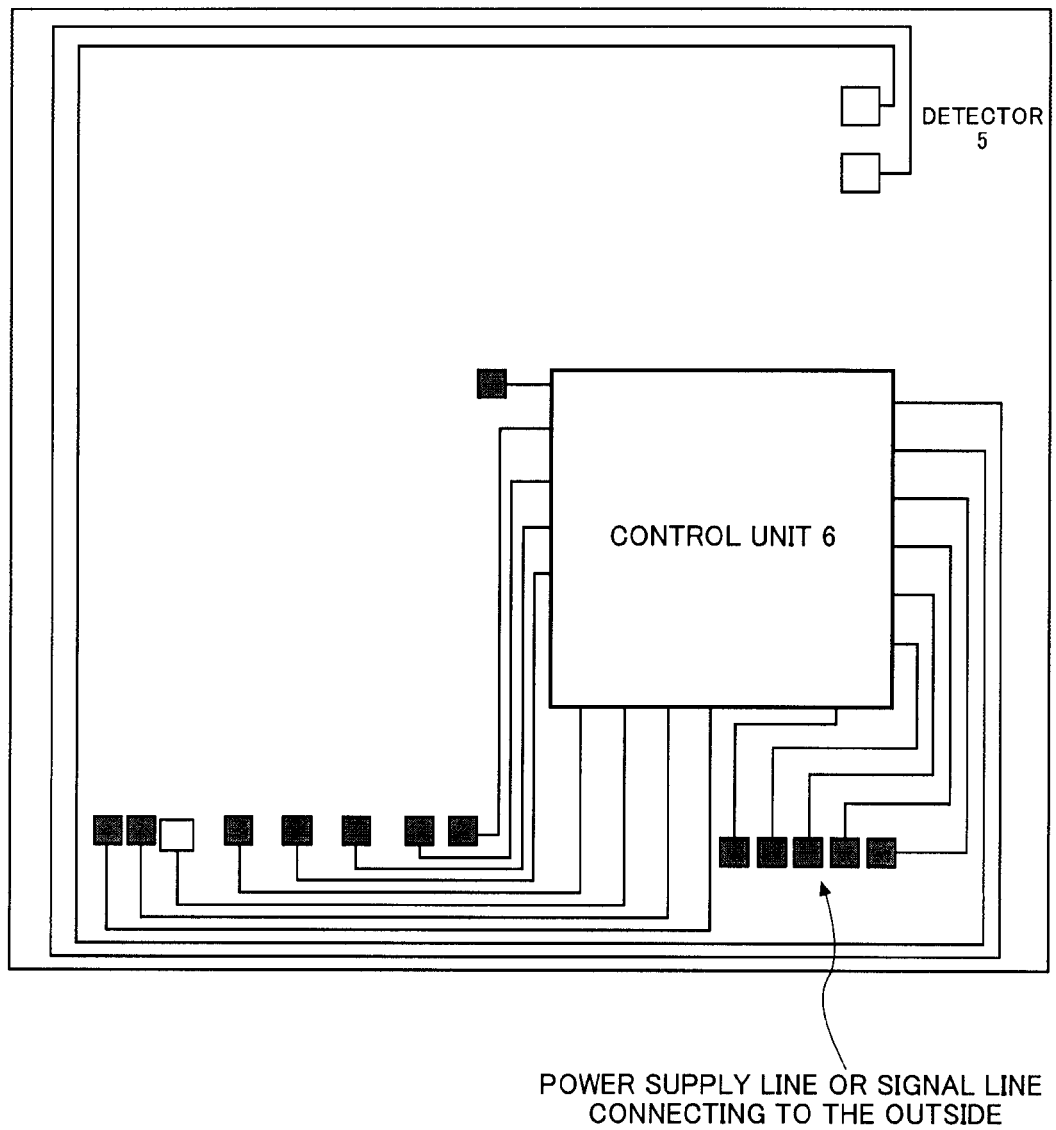
FIG. 60 is a block diagram showing each process procedure for making the detector and the control unit into the semiconductor substrate, in forming the optical system element and the electrical system element.

Firstly, in the steps from S61 to S66, the optical system element is formed. In the silicon substrate (Si substrate) 100, a circuit configuration such as the control unit and the detector, and an integrated circuit part 108 such as wiring are formed in the integrated circuit forming step (IC step). The wiring may be made of Al wiring, for instance (FIG. 59A). FIG. 60 illustrates the state where the detector 5, the control unit 6, and the wiring are formed within the semiconductor substrate. The wiring is used as a power wire or a signal line connecting to the outside (S61).

A protective film 109 is formed on the silicon substrate (Si substrate) 100, using an oxide silicon film (SiO$_2$ film). The protective film 109 is provided so as to avoid the situation that the integrated circuit part 108 formed in the integrated circuit forming step (IC step) is damaged in the step for forming the optical waveguide. The protective film 109 made of SiO$_2$ film may be formed using a plasma CVD film, and the film thickness is set to be around 1 μm (FIG. 59B) (S62). A silicon nitride film (SiN film) 102 is formed on the protective film 109 by plasma CVD. The film thickness of the SiN film 102 is set to be around 3 μm (FIG. 59C) (S63).

The SiN film 102 is coated with photoresist (S64), and a resist pattern is formed for making a pattern of the optical waveguide. In the photoresist patterning, for example, patterns of the waveguide type directional coupler 2, the pitch converter 3, and the optical waveguide 7 for linking the pitch converter 3 and the laser device 4, are formed (FIG. 59D) (S65). Using the resist pattern as a mask, dry etching is performed using plasma, the SiN film 102 is subjected to the etching, thereby forming the optical waveguide (FIG. 59D to FIG. 59F, and FIG. 61) (S66).

The protective film 109 establishes an electrically insulated state between the Al wiring and the electrode formed within the semiconductor substrate, and the wiring and the electrode of the Au film 106, which are formed on the protective film 109 in the subsequent steps. Therefore, in order to establish electrical connection therebetween, a via hole 122 is formed (S67). Formation of the via hole 122 may be performed, for instance, by forming an opening on the protective film 109, according to a resist pattern corresponding to the via hole pattern. By embedding a conductive layer within the via hole 122, electrical conduction is established via the protective film 109 (FIG. 59G) (S67).

Figure 61:
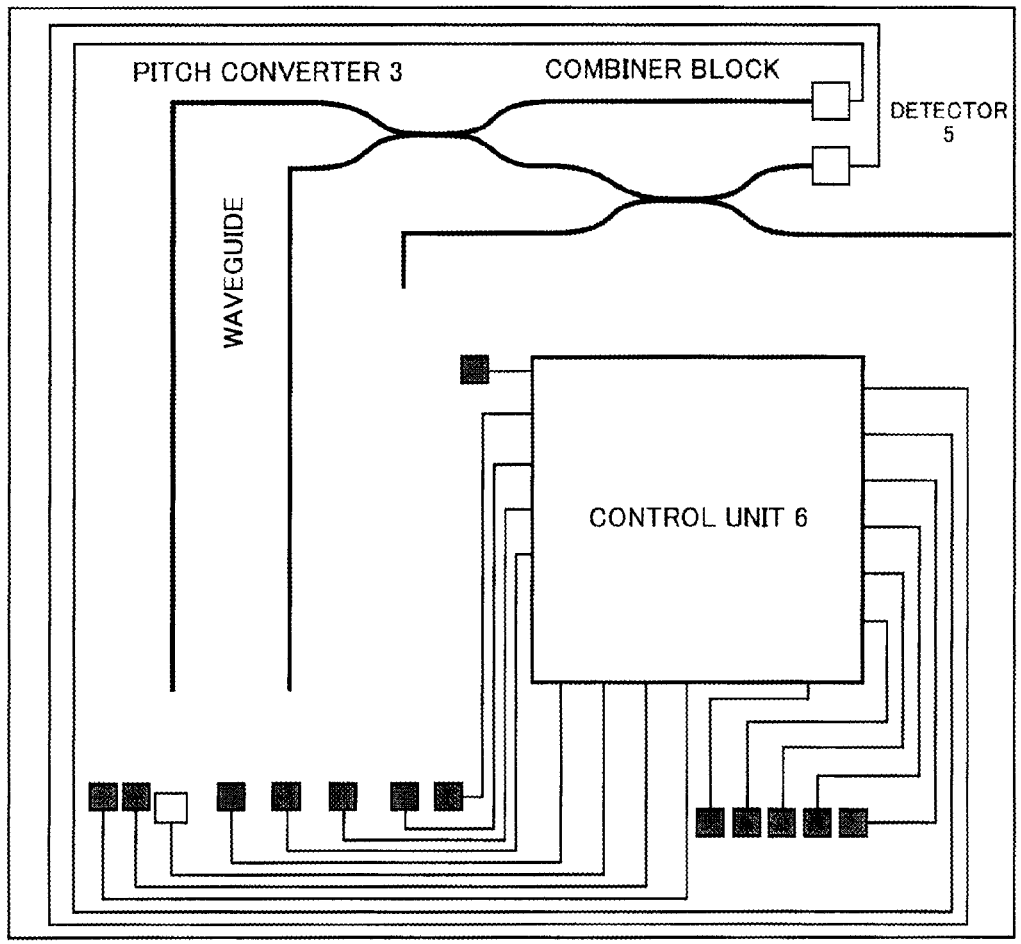
FIG. 61 is a block diagram showing each process procedure for making the detector and the control unit into the semiconductor substrate, in forming the optical system element and the electrical system element.

FIG. 61 illustrates the state that optical system element is formed, such as the waveguide type directional coupler 2, the pitch converter 3, and the optical waveguide 7, on the upper layer of the detector 5, the control unit 6, and the wiring, being found within the semiconductor substrate according to the steps above.

Next, in the steps of S68 and S69, the electrical system element is formed. In forming the electrical system element, there are formed, wiring using an Au film, an electrode for external connection, and an electrode for electrically connecting the mounted components such as the control unit. The electrode for electrically connecting the mounted components may be made of microbumps. In this step, after forming the Au film 106 via a Ti film or a Cr film on the Si substrate 100 (FIG. 59H), a resist film 103 is formed by patterning on the part which is required to be left as wiring or an electrode (FIG. 59I), etching is performed using the resist film 103 as a mask, the Au film 106 of the part not covered by the resist film 103 is removed to form the wiring and the electrode. On this occasion, the optical waveguide made of the SiO$_2$ film 102 remains (FIG. 59J).

Next, partially on the electrodes, where components are to be mounted, resist films 107 for the microbumps are formed. As for the part to be left as wiring, the resist film 103 is formed all over the Au film 106 (FIG. 59K).

Figure 62:
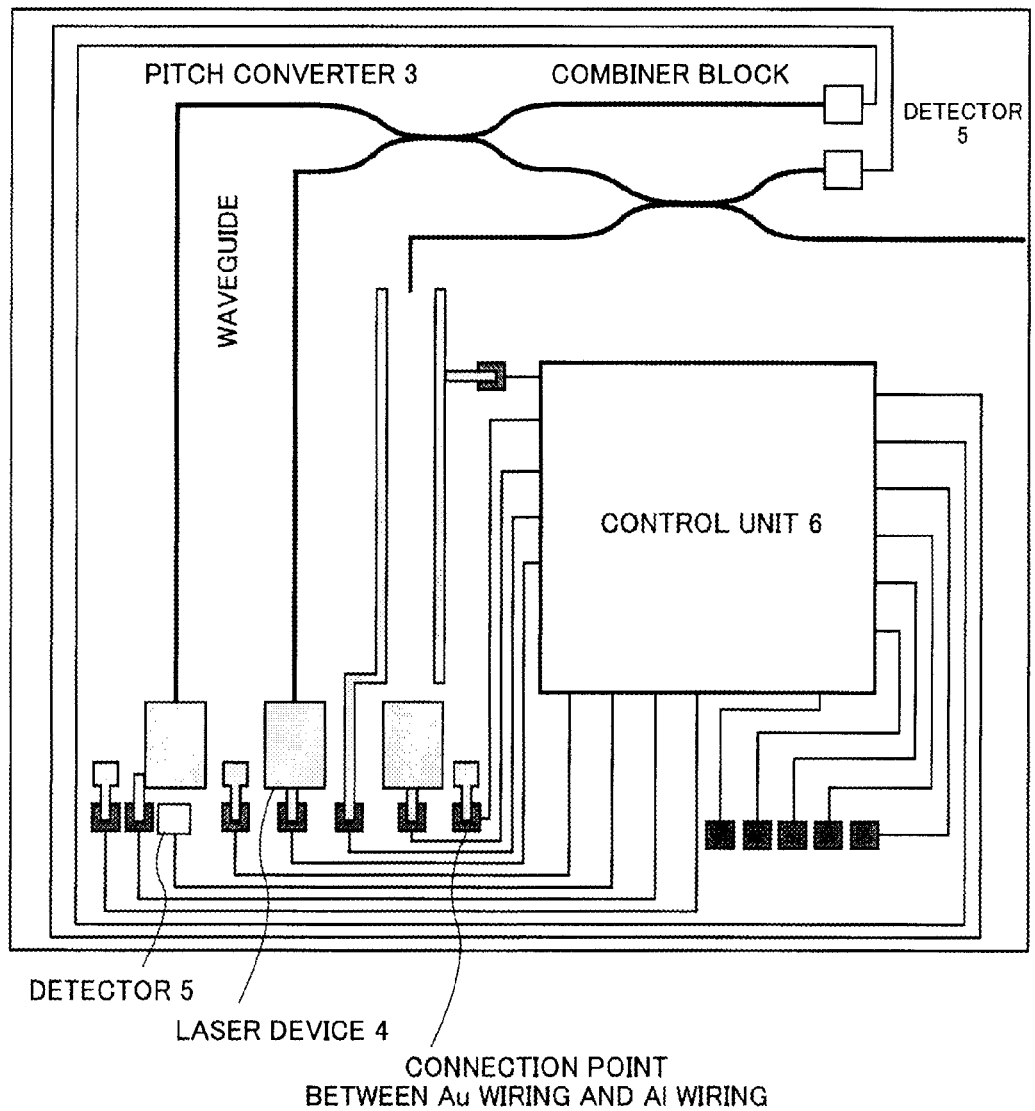
FIG. 62 is a block diagram showing each process procedure for making the detector and the control unit into the semiconductor substrate, in forming the optical system element and the electrical system element.

Thereafter, according to half-etching, projections and depressions with a predetermined depth are formed on the Au film 106 between the resist films 107 for the microbumps (FIG. 59L). These projections and depressions formed on the Au film 106 constitute the microbumps. Since the Au film 106 is continuous in the lower layer, it establishes conduction state as an electrode. On the other hand, since there are no microbumps being formed on the wiring side, a flat surface is formed. FIG. 62 illustrates the state where the electrical system elements such as the Au wiring and the electrodes are formed (FIG. 59M, FIG. 62) (S68).

The Au film 106 where the microbumps are formed constitutes joints of the mounted components, and the mounted components, such as the laser device and the control unit, are mounted on the joints. Joining via the microbumps is performed by surface activated bonding, and therefore normal-temperature joining is possible (FIG. 59N) (S70). Thereafter, Au wire bonding connects the electrodes with the wiring. It is to be noted that when the control unit is mounted, the Au film is formed on the aluminum pad while the IC of the control unit is in the bare-chip status, and it is flipped when mounting is performed (S71).

Figure 63:
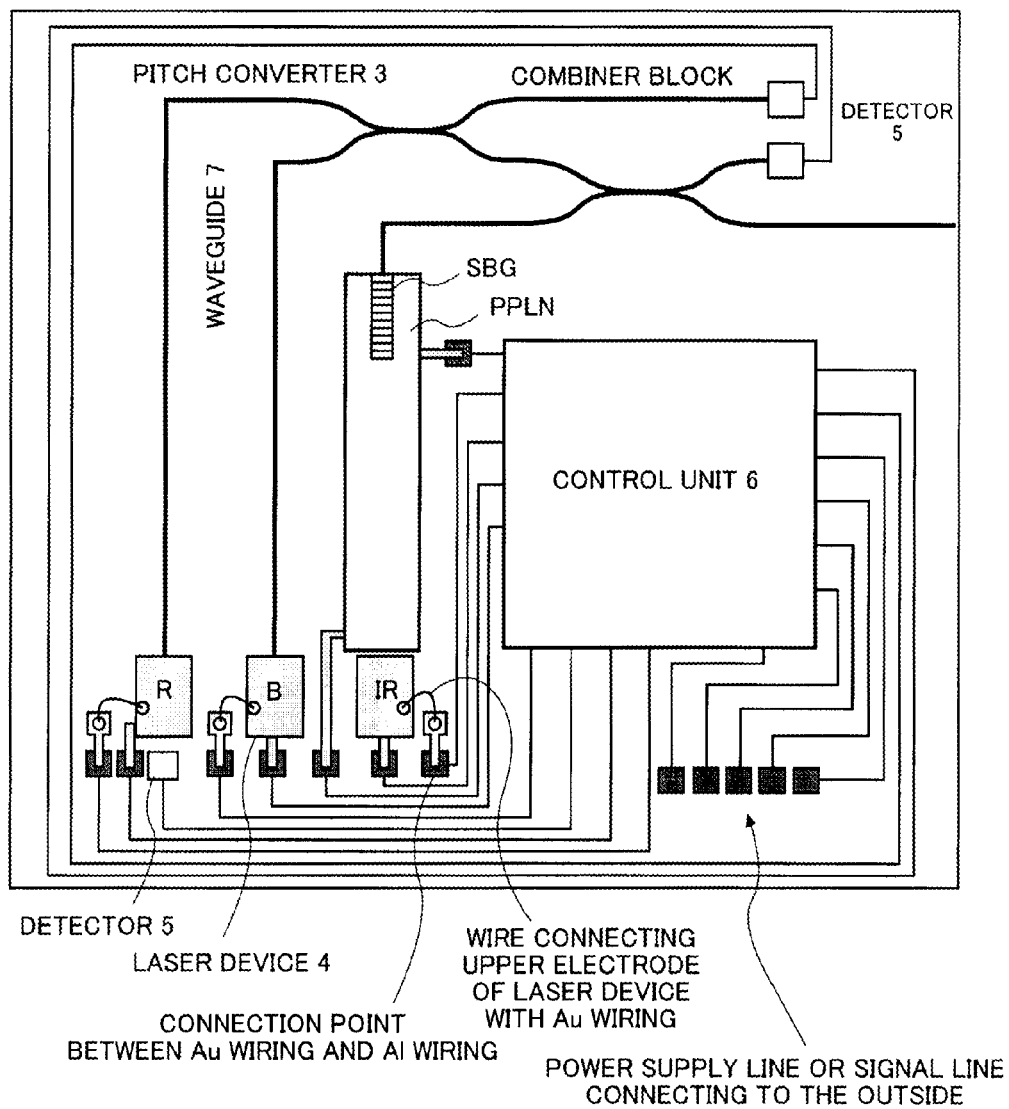
FIG. 63 is a block diagram showing each process procedure for making the detector and the control unit into the semiconductor substrate, in forming the optical system element and the electrical system element.

FIG. 63 illustrates the state that the mounted components such as the laser device 4, the detector 5, the control unit 6, the PPLN 4d, and the SGB 4e are mounted, and the upper electrode of the laser device 4 and the Au wiring are connected via the Au wire bonding (FIG. 59O, FIG. 63).

Next, with reference to FIG. 64, the SBG provided in the light source device of the present invention will be explained.

The SBG is a surface Bragg grating (SBG) for partially reflecting a fundamental wave of near-infrared LD, and it is provided for stabilizing the green light output from the SHG laser.

The SBG may be a configuration to be formed on the wavelength conversion device as the configuration examples shown in FIG. 19 to FIG. 21. Alternatively, it may be configured in such a manner as being formed on the optical waveguide.

FIG. 64 illustrates arrangements of the SBG. FIG. 64A illustrates a configuration where the SBG 4e is formed on the PPLN (wavelength conversion device) 4d; and figures from FIG. 64B to FIG. 64D illustrate configurations where the SBG 4e is formed on the optical waveguide 7.

FIG. 64B illustrates a configuration example where the SBG is formed on the optical waveguide 7 between the PPLN (wavelength conversion device) 4d and the curved waveguide 12; FIG. 64C illustrates a configuration example where the SBG is formed at the rear of the curved waveguide 12 on the light path; and FIG. 64D illustrates a configuration example where the SBG is formed on the curved waveguide 12.

When the SBG is formed on the optical waveguide, there are methods as the following; a method for forming a grating shape by etching, or the like, or a method for performing optical writing with the use of UV light, employing a material which reacts the UV light as a material of the optical waveguide, and making a difference in refraction index.

If the UV light writing is performed, a material whose refraction index is changed by the UV light, such as a Ge-doped $SiO_2$ film, is used to form the optical waveguide, and writing is performed directly on the optical waveguide according to the two beam interference method. The two beam interference method is a method for forming a pattern by causing interference between two wavelengths of UV laser.

Next, with reference to FIG. 65, an example for applying the light source device of the present invention to a projector will be explained.

Figure 65:
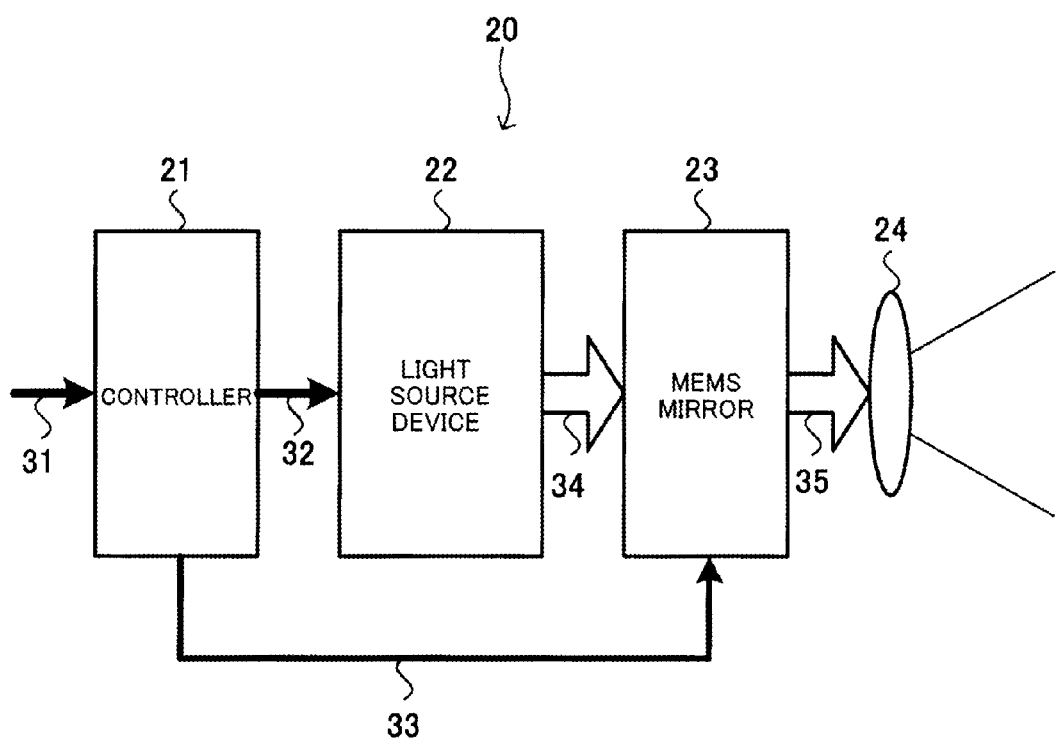
FIG. 65 illustrates a projector employing the light source device according to the present invention.

In the configuration example as shown in FIG. 65, the projector 20 is provided with a controller 21, a light source device 22, a deflector 23, and a projection lens 24, and image signals are converted into light flux to be projected on the screen, or the like.

The controller 21 obtains each of the wavelength components of RGB, for example, in units of pixel, based on the image signals being inputted, and forms a control signal for driving the laser device of the light source device 22. The laser device of the light source device 22 receives the control signal 32 from the controller 21, and emits the light having each of the RGB wavelengths. The light source device 22 combines the light having each of the RGB wavelengths and outputs the light flux 34.

The deflector 23 deflects the light flux 34 outputted from the light source device 22 and forms deflected light flux 35. The deflector 23 may be formed by an MEMS mirror or the like, for instance, and it deflects the light flux 34 into a predetermined direction, according to the control signal 33 from the controller 21, and forms the deflected light flux 35.

The circuit configuration described above is just an example, and it is not restricted to this example. Other circuit configuration may be employed to configure the detecting circuit.

What is claimed is:

1. A light source device comprising,
   a substrate,
   multiple laser devices having different wavelengths mounted on the substrate,
   multiple waveguides formed on the substrate, for guiding light waves respectively emitted from the laser devices,
   a multi-wavelength combiner formed on the substrate, having a waveguide type directional coupler for combining the light waves respectively guided by the waveguides,
   a detector for detecting light intensity of an outgoing wave from an output port, other than the output port for outputting combined waves from the waveguide type directional coupler, and a control unit having a drive circuit for driving each of the laser devices, wherein,
   the control unit receives as a feedback, the light intensity detected by the detector, and controls the laser devices.

2. The light source device according to claim 1, wherein,
   the multi-wavelength combiner comprises the waveguide type directional couplers being connected in multiple stages, for combining at least two incident waves,
   the waveguide type directional couplers on the respective stages combine multiple incident waves with different wavelengths, and
   the waveguide type directional coupler on the last stage combines the multiple incident waves being combined in the waveguide type directional coupler on each previous stage.

3. The light source device according to claim 2, wherein,
   the waveguide type directional coupler has wavelength selectivity based on a coupling section length of two waveguides arranged in parallel.

4. The light source device according to claim 3, wherein,
   the waveguide is formed by patterning a film placed on the substrate, the film being made of a material having an optical waveguiding property, and
   the waveguide type directional coupler allows two of the waveguides being subjected to the patterning, to be placed so that the two of the waveguides are adjacent to each other in parallel and being integrated, only for a length corresponding to the coupling section length.

5. The light source device according to claim 4, wherein,
   the waveguide is formed by patterning any one of the following: a silicon nitride film, a Ge doped silicon oxide film, and a resin film.

6. The light source device according to claim 3, wherein,
   the waveguide is a planar type waveguide obtained by forming a high refraction index region on the substrate, and
   the waveguide type directional coupler allows two cores to be placed so that the two cores are adjacent to each other in parallel and being integrated, only for a length corresponding to the coupling section length.

7. The light source device according to claim 3, wherein,
   the waveguide is a ridge type waveguide obtained by forming on the substrate, a ridge part having a different equivalent refractive index, and
   the waveguide type directional coupler allows two ridge parts to be placed so that the two ridge parts are adjacent to each other in parallel and being integrated, only for a length corresponding to the coupling section length.

8. The light source device according to claim 3, wherein,
   the waveguide is an optical fiber fixed on the substrate, and two optical fiber cores are placed so that the two optical cores are adjacent to each other in parallel and being integrated, only for a length corresponding to the coupling section length.

9. The light source device according to claim 1, comprising,
   a pitch converter for converting a pitch between the waveguides, from the pitch for arranging the multiple laser devices on the substrate, to the pitch between the waveguides of the waveguide type directional coupler.

10. The light source device according to claim 9, wherein, the pitch converter is a 90 degree bend converter for changing orientation of the waveguide, by 90 degrees.

11. The light source device according to claim 10, wherein, the substrate has a quadrilateral shape,
the multiple laser devices are mounted on one side of the quadrilateral shape, and
an outgoing end for outputting light combined by the multi-wavelength combiner is provided on another side being orthogonal to the side where the laser devices are mounted.

12. The light source device according to claim 1, wherein, The substrate is a semiconductor substrate, and a wiring formed on the semiconductor substrate connects electrically the laser devices and the control unit.

13. The light source device according to claim 12, wherein, the wiring is formed by patterning a metallic film formed on the semiconductor substrate.

14. The light source device according to claim 13, comprising a joint made of a metallic material, being formed together with the wiring, according to the patterning of the metallic film, wherein, the laser devices are connected to the joints.

15. The light source device according to claim 13, wherein, the metallic film is a film made of Au.

16. The light source device according to claim 12, wherein, the control unit is formed within the semiconductor substrate according to an integrated circuit forming process.

17. The light source device according to claim 12, wherein, an integrated circuit mounted on the semiconductor substrate constitutes the control unit.

18. The light source device according to claim 1, comprising,
an another detector for detecting the light intensity of the laser devices.

19. The light source device according to claim 1, comprising a wavelength conversion device for converting a wavelength of the light wave emitted from each of the laser devices, wherein,
the waveguide guides the light wave converted by the wavelength conversion device.

20. The light source device according to claim 1, wherein, the waveguides guide the light waves in the following wavelength ranges, respectively: the R wavelength range, G wavelength range, and B wavelength range.

* * * * *